United States Patent
King et al.

(10) Patent No.: US 12,125,190 B1
(45) Date of Patent: Oct. 22, 2024

(54) CONFORMANCE TESTING OF MANUFACTURED PARTS VIA NEURAL NETWORKS

(71) Applicants: SyBridge Technologies U.S. Inc., Southfield, MI (US); The Board of Trustees of the University of Illinois, Urbana, IL (US)

(72) Inventors: William Paul King, Urbana, IL (US); Sameh Tawfick, Urbana, IL (US); Miles Bimrose, Urbana, IL (US); Charles Wood, Itasca, IL (US); Davis McGregor, Itasca, IL (US)

(73) Assignees: Sybridge Technologies U.S. Inc., Southfield, MI (US); The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 18/629,281

(22) Filed: Apr. 8, 2024

(51) Int. Cl.
*G06T 7/00* (2017.01)

(52) U.S. Cl.
CPC .. *G06T 7/0004* (2013.01); *G06T 2207/10116* (2013.01); *G06T 2207/20084* (2013.01)

(58) Field of Classification Search
CPC ......... G06T 7/0004; G06T 2207/10116; G06T 2207/20084
See application file for complete search history.

(56) References Cited

U.S. PATENT DOCUMENTS

| | | | |
|---|---|---|---|
| 7,805,626 B2 | 9/2010 | Shipton | |
| 10,769,324 B2 | 9/2020 | Matusik | |
| 11,189,021 B2 | 11/2021 | Shah | |
| 11,302,016 B2 | 4/2022 | Takahashi | |
| 11,315,231 B2 * | 4/2022 | Lai | G06F 18/2413 |
| 11,379,856 B2 | 7/2022 | Withrow | |
| 11,433,613 B2 | 9/2022 | Desimone | |
| 11,443,192 B2 | 9/2022 | Mehr | |
| 11,636,191 B2 | 4/2023 | Withrow | |

(Continued)

FOREIGN PATENT DOCUMENTS

| | | |
|---|---|---|
| WO | 2023086464 A1 | 5/2023 |
| WO | 2023086466 A1 | 5/2023 |

OTHER PUBLICATIONS

Aronson, et al.. A novel method for linking between a 3D printer and printed objects using toolmark comparison techniques. J Forensic Sci. Nov. 2021;66(6):2405-2412. doi: 10.1111/1556-4029.14825. Epub Jul. 30, 2021. PMID: 34328220.

(Continued)

*Primary Examiner* — Ping Y Hsieh
(74) *Attorney, Agent, or Firm* — McDonnell Boehnen Hulbert & Berghoff LLP

(57) ABSTRACT

Various embodiments may involve obtaining an image of at least a section of a manufactured part; determining, based on executing a neural network on the image, that the manufactured part was not fabricated according to a specification for the manufactured part, wherein the neural network was trained to associate images of manufactured parts with corresponding indicators of specifications for the manufactured parts; and, in response to determining that the manufactured part was not fabricated according to the specification, generating an electronic alert indicating that the manufactured part was improperly fabricated.

20 Claims, 34 Drawing Sheets

(56) References Cited

U.S. PATENT DOCUMENTS

| | | | |
|---|---|---|---|
| 11,656,614 B2 | 5/2023 | Garvey | |
| 11,768,440 B2 | 9/2023 | Su | |
| 2008/0317329 A1* | 12/2008 | Shibuya | G06T 7/0004 |
| | | | 382/149 |
| 2018/0284744 A1 | 10/2018 | Cella | |
| 2018/0293721 A1* | 10/2018 | Gupta | G06N 3/045 |
| 2019/0096057 A1* | 3/2019 | Allen | G06T 7/0008 |
| 2020/0356718 A1 | 11/2020 | Chu | |
| 2022/0214666 A1 | 7/2022 | King | |
| 2022/0215133 A1 | 7/2022 | King | |
| 2022/0222797 A1* | 7/2022 | Elkayam | G06T 7/001 |
| 2022/0285227 A1* | 9/2022 | Benvegnu | H01L 21/30625 |
| 2022/0350174 A1 | 11/2022 | Fonte | |

OTHER PUBLICATIONS

Dachowicz, et al., Microstructure-Based Counterfeit Detection in Metal Part Manufacturing, The Journal of The Minerals, Metals & Materials Society (TMS), 2017, vol. 69, Issue 11.

Delmotte, et al., "Blind 3D-Printing Watermarking Using Moment Alignment and Surface Norm Distribution," in IEEE Transactions on Multimedia, vol. 23, pp. 3467-3482, 2021, doi: 10.1109/TMM. 2020.3025660.

Delmotte, et al., "Blind Watermarking for 3-D Printed Objects by Locally Modifying Layer Thickness," in IEEE Transactions on Multimedia, vol. 22, No. 11, pp. 2780-2791, Nov. 2020, doi: 10.1109/TMM.2019.2962306.

Erozan, et al., "Counterfeit Detection and Prevention in Additive Manufacturing Based on Unique Identification of Optical Fingerprints of Printed Structures," in IEEE Access, vol. 10, pp. 105910-105919, 2022, doi: 10.1109/ACCESS.2022.3209241.

Li, et al., PrinTracker: Fingerprinting 3D Printers using Commodity Scanners, CCS '18: Proceedings of the 2018 ACM SIGSAC Conference on Computer and Communications Security, Oct. 2018, pp. 1306-1323, https://doi.org/10.1145/3243734.3243735.

Pavlovich, et al., An exploratory study of topographical signatures within 3D fused deposition modelling using Polylactic Acid (PLA) filament, Forensic Science International, vol. 349, 2023, 111740, ISSN 0379-0738, https://doi.org/10.1016/j.forsciint.2023.111740.

Peng, et al., Source identification of 3D printed objects based on inherent equipment distortion, Computers & Security, vol. 82, 2019, pp. 173-183, ISSN 0167-4048, https://doi.org/10.1016/j.cose.2018. 12.015.

Shim, et al., 2021. SI3DP: Source Identification Challenges and Benchmark for Consumer-Level 3D Printer Forensics. In Proceedings of the 29th ACM International Conference on Multimedia (MM '21). Association for Computing Machinery, New York, NY, USA, 1721-1729. https://doi.org/10.1145/3474085.3475316.

Shim, et al., Improving Estimation of Layer Thickness and Identification of Slicer for 3D Printing Forensics. Sensors. 2023; 23(19):8250. https://doi.org/10.3390/s23198250.

Tsai, MJ., Yuadi, I. Digital forensics of microscopic images for printed source identification. Multimed Tools Appl 77, 8729-8758 (2018). https://doi.org/10.1007/s11042-017-4771-1.

Wigger, B., Meissner, T., Förste, A et al. Using unique surface patterns of injection moulded plastic components as an image based Physical Unclonable Function for secure component identification. Sci Rep 8, 4738 (2018). https://doi.org/10.1038/s41598-018-22876-8.

Wigger, et al., Robust and fast part traceability in a production chain exploiting inherent, individual surface patterns, Robotics and Computer-Integrated Manufacturing, vol. 63, 2020, 101925, ISSN 0736-5845, https://doi.org/10.1016/j.rcim.2019.101925.

Yan, et al., "A Verification Method of Industrial Metal Parts using Siamese Residual Network," 2021 IEEE 30th International Symposium on Industrial Electronics (ISIE), Kyoto, Japan, 2021, pp. 1-7, doi: 10.1109/ISIE45552.2021.9576308.

Yan, et al., "An IoT-Based Anti-Counterfeiting System Using Visual Features on QR Code," in IEEE Internet of Things Journal, vol. 8, No. 8, pp. 6789-6799, 15 Apr. 15, 2021, doi: 10.1109/JIOT.2020. 3035697.

Zheng, et al.. Forgery Detection for Anti-Counterfeiting Patterns Using Deep Single Classifier. Applied Sciences. 2023; 13(14):8101. https://doi.org/10.3390/app13148101.

\* cited by examiner

THE MANUFACTURED PART 106 CAN BE CURRENTLY IN-USE OR DEPLOYED
BY THE CUSTOMER FACILITY 1302;

THERE CAN BE A DEFECTIVE MANUFACTURED PART 1702 THAT IS KNOWN TO
HAVE FAILED IN THE CUSTOMER FACILITY 1302 OR THAT IS KNOWN TO
OTHERWISE BE UNSUITABLE FOR USE OR DEPLOYMENT

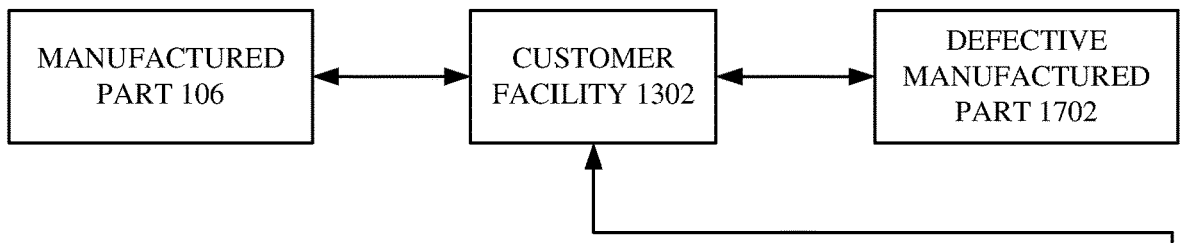

THE MANUFACTURED PART MANAGEMENT SYSTEM 102 CAN
BE QUERIED BY THE CUSTOMER FACILITY 1302 TO
DETERMINE WHETHER OR NOT THE MANUFACTURED PART
106 HAS THE SAME FABRICATION SOURCE (E.G., WAS MADE
BY THE SAME MANUFACTURING MACHINE OR ACCORDING
TO THE SAME PRODUCTION SPECIFICATIONS) AS THE
DEFECTIVE MANUFACTURED PART 1702;

IF SO, THE ELECTRONIC ALERT 206, WHICH CAN BE
TRANSMITTED TO THE CUSTOMER FACILITY 1302, CAN
INDICATE THAT THE MANUFACTURED PART 106 HAS THE
SAME FABRICATION SOURCE AS THE DEFECTIVE
MANUFACTURED PART 1702;

IN SOME CASES, THE ELECTRONIC ALERT 206 CAN FURTHER
INDICATE THAT THE MANUFACTURED PART 106 SHOULD
ACCORDINGLY BE NO LONGER USED OR SHOULD BE
SUBJECTED TO A RISK ANALYSIS, FAILURE ANALYSIS, OR
REMAINING-USEFUL-LIFE ANALYSIS

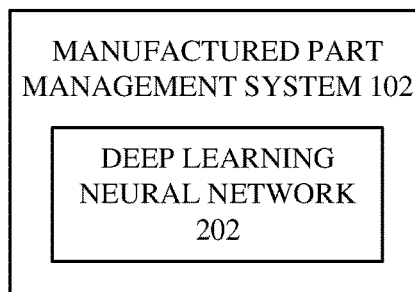

FIG. 17

THE MANUFACTURED PART 106 CAN BE DEPLETED OR OTHERWISE NO LONGER SUITABLE FOR USE OR OPERATION IN THE CUSTOMER FACILITY 1302;

THERE CAN BE A SPARE MANUFACTURED PART 1902 THAT IS PURPORTED OR ALLEGED TO BE A REPLACEMENT FOR THE MANUFACTURED PART 106

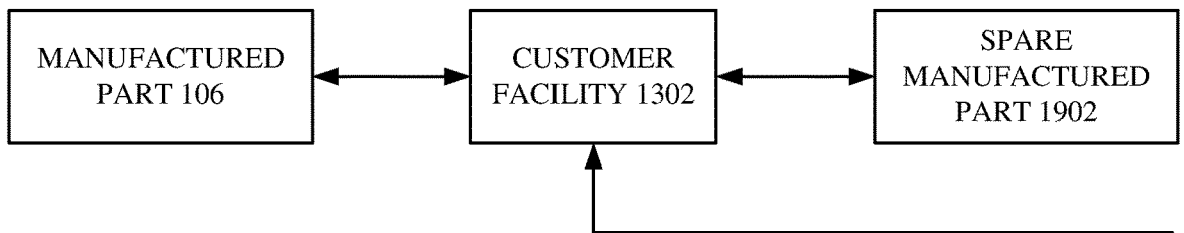

THE MANUFACTURED PART MANAGEMENT SYSTEM 102 CAN BE QUERIED BY THE CUSTOMER FACILITY 1302 TO DETERMINE WHETHER OR NOT THE SPARE MANUFACTURED PART 1902 HAS THE SAME FABRICATION SOURCE (E.G., WAS MADE BY THE SAME MANUFACTURING MACHINE OR ACCORDING TO THE SAME PRODUCTION SPECIFICATIONS) AS THE MANUFACTURED PART 106;

IF SO, THE ELECTRONIC ALERT 206, WHICH CAN BE TRANSMITTED TO THE CUSTOMER FACILITY 1302, CAN INDICATE THAT THE MANUFACTURED PART 106 IS COMPATIBLE WITH THE SPARE MANUFACTURED PART 1902 AND CAN THUS BE REPLACED BY THE SPARE MANUFACTURED PART 1902;

IF NOT, THE ELECTRONIC ALERT 206 CAN INSTEAD INDICATE THAT THE MANUFACTURED PART 106 IS NOT COMPATIBLE WITH THE SPARE MANUFACTURED PART 1902 AND THUS CANNOT BE REPLACED BY THE SPARE MANUFACTURED PART 1902

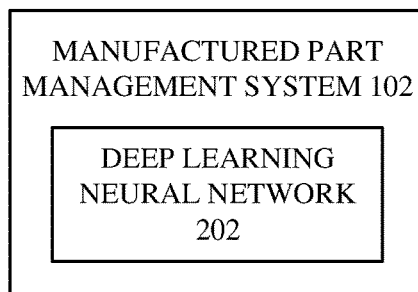

FIG. 19

CONFORMANCE TESTING OF MANUFACTURED PARTS VIA NEURAL NETWORKS

BACKGROUND

Existing techniques facilitate management, tracking, or testing of manufactured parts via strict part separation or via part marking. Unfortunately, such existing techniques are inefficient.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate management or tracking of manufactured parts via deep learning are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access an image of a manufactured part, wherein the manufactured part can be fabricated in a manufacturing facility comprising a plurality of manufacturing machines. In various aspects, the computer-executable components can comprise an analysis component that can infer, based on executing a deep learning neural network on the image, which of the plurality of manufacturing machines fabricated the manufactured part. In various instances, the analysis component can determine whether the inferred manufacturing machine matches an expected manufacturing machine that is supposed to fabricate the manufactured part. In various cases, the computer-executable components can comprise a result component that can generate, in response to a determination that the inferred manufacturing machine does not match the expected manufacturing machine, an electronic alert indicating that a production chain failure has occurred in the manufacturing facility.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access an image of a defective manufactured part, wherein the defective manufactured part can be fabricated in a manufacturing facility comprising a plurality of manufacturing machines. In various aspects, the computer-executable components can comprise an analysis component that can infer, based on executing a deep learning neural network on the image, which of the plurality of manufacturing machines fabricated the defective manufactured part. In various instances, the computer-executable components can comprise a result component that can generate an electronic alert indicating that the inferred manufacturing machine warrants inspection, servicing, or maintenance.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access, from a client device, an image of a returned manufactured part. In various aspects, the computer-executable components can comprise an analysis component that can infer, based on executing a deep learning neural network on the image, whether or not any of the plurality of manufacturing machines in the manufacturing facility fabricated the returned manufactured part. In various instances, the computer-executable components can comprise a result component that can generate, in response to a determination that none of the plurality of manufacturing machines in the manufacturing facility fabricated the returned manufactured part, an electronic alert indicating that the returned manufactured part is counterfeit.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access an image of a purchased manufactured part. In various aspects, the computer-executable components can comprise an analysis component that can infer, based on executing a deep learning neural network on the image, whether or not the purchased manufactured part was fabricated according to one or more expected production specifications. In various instances, the computer-executable components can comprise a result component that can generate, in response to a determination that the purchased manufactured part was not fabricated according to the one or more expected production specifications, an electronic alert indicating that the purchased manufactured part was improperly fabricated.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access an image of an in-use manufactured part. In various aspects, the computer-executable components can comprise an analysis component that can generate, based on executing a deep learning neural network on the image, a first fabrication signature embedding of the in-use manufactured part. In various instances, the analysis component can determine whether or not the first fabrication signature embedding of the in-use manufactured part is within a threshold distance of a second fabrication signature embedding of a known defective manufactured part. In various cases, the computer-executable components can comprise a result component that can generate, in response to a determination that the first fabrication signature embedding is within the threshold distance of the second fabrication signature embedding, an electronic alert that indicates that the in-use manufactured part was fabricated by a same manufacturing machine as the known defective manufactured part.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a first image of a depleted manufactured part and a second image of a spare manufactured part. In various aspects, the computer-executable components can comprise an analysis component that can generate, based on executing a deep learning neural network on the first image and on the second image, a first fabrication signature embedding of the depleted manufactured part and a second fabrication signature embedding of the spare manufactured part. In various instances, the analysis component can determine whether or not the first fabrication signature embedding of the depleted manufactured part is within a threshold distance of the second fabrication signature embedding of the spare manufactured part. In various cases, the computer-executable components can comprise a result component that can generate, in response to a determination that the first fabrication signature embedding is not within the threshold distance of the second fabrication signature embedding, an electronic alert that indicates that the spare manufactured part is not compatible with the depleted manufactured part.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can receive a query from a client device, wherein the query can comprise an image of a manufactured part. In various aspects, the computer-executable components can comprise an analysis component that can infer, based on executing a deep learning neural network on the image, a fabrication source of the manufactured part. In various instances, the computer-executable components can comprise a result component that can transmit, to the client device, an electronic notification indicating the fabrication source.

In various embodiments, any of the above-described systems can be implemented as computer-implemented methods or computer program products.

DESCRIPTION OF THE DRAWINGS

FIG. 17 illustrates an example, non-limiting block diagram showing how various embodiments described herein can be implemented customer-side to identify likely-to-fail parts.

FIG. 19 illustrates an example, non-limiting block diagram showing how various embodiments described herein can be implemented customer-side to identify suitable replacement parts.

DETAILED DESCRIPTION

Figure 1:
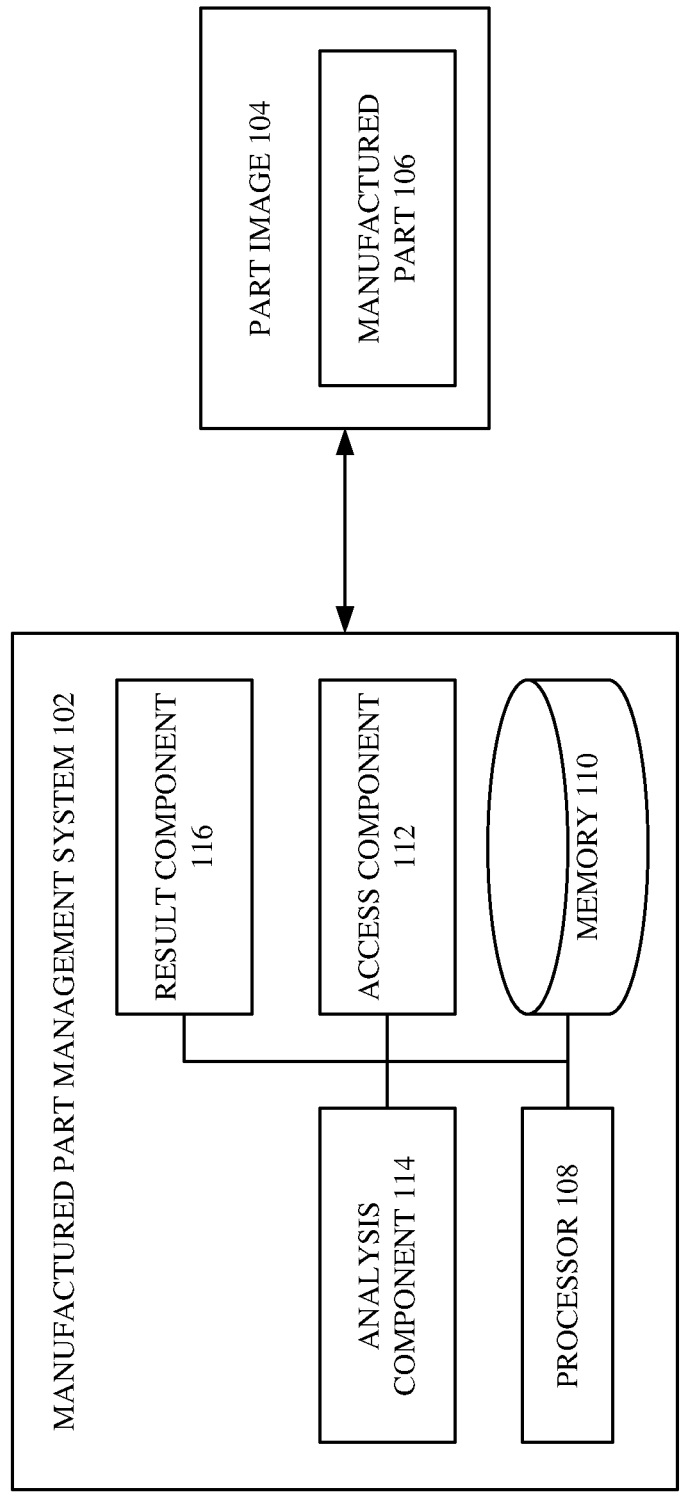
FIG. 1 illustrates a block diagram of an example, non-limiting system that can facilitate management or tracking of manufactured parts via deep learning in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A part can be any suitable tangible, structural, or physical product or portion thereof. Part manufacturing can be considered as an industrial field in which manufacturers produce, build, construct, or otherwise fabricate parts for customers. A manufacturer can be or control any suitable manufacturing facility or factory that can fabricate (e.g., via automated injection molding, via automated forging, via automated stamping) parts. In contrast, a customer can be any suitable client in a supply chain that is downstream of the manufacturer and that somehow utilizes the parts fabricated by the manufacturer. For instance, a customer can be or control an industrial facility or factory that relies on such parts for performance of its industrial operations. As another instance, a customer can be an end-retail-consumer of such parts.

In any case, the physical or chemical attributes, properties, or characteristics of a part (e.g., size of the part, shape of the part, weight of the part, appearance of the part, surface finish of the part) can depend upon how the part was manufactured or fabricated. In particular, such physical or chemical attributes, properties, or characteristics can depend upon the specific equipment that was used to make the part or upon the specific configurable settings or operating parameters of such specific equipment. Accordingly, parts manufactured or fabricated using different equipment or equipment settings can have or otherwise exhibit different physical or chemical attributes, properties, or characteristics. Indeed, even parts that are of the same nominal design (e.g., that are intended or desired to be identical replicas or duplicates of each other) and that are fabricated by the same type of manufacturing equipment as each other can nevertheless have or exhibit at least slight (e.g., unnoticeable to the naked eye) physical or chemical differences, if those parts are manufactured or fabricated via distinct pieces of manufacturing equipment or via distinct manufacturing equipment settings. In other words, a part can be considered as bearing a unique fingerprint of whatever manufacturing equipment fabricated it.

As an illustrative example, suppose that there are two distinct manufacturing machines that are of the same type as each other (e.g., that are both automated injection molders, that both are additive manufacturing printers, that both are computer-numerically controlled (CNC) machines, that are both automated forgers, that are both automated stampers): a manufacturing machine A and a manufacturing machine B. Furthermore, suppose that there is a part design C (e.g., formatted as a computer-aided design file such as a SolidWorks® file or an AutoCAD® file or alternatively described in a two-dimensional drawing) that is to be fulfilled. The manufacturing machine A can automatically construct a part D according to the part design C, and the manufacturing machine B can automatically construct a part E according to the part design C. Because the part D and the part E are both fabricated according to the part design C by the same type of manufacturing machine, it can be desired or intended for the part D and the part E to be identical to each other. However, because the part D and the part E are constructed by distinct or separate manufacturing machines, the part D and the part E will be non-identical to each other. For instance, the part D and the part E can have slightly different dimensions or masses (e.g., such differences can be measured on the order of micrometers or milligrams). As another instance, the part D and the part E can have slightly different surface finishes (e.g., slightly different colors, textures, or roughness measures). In some cases, such non-identicalness between the part D and the part E can be caused by the manufacturing machine A utilizing different configuration settings or operating parameters than the manufacturing machine B (e.g., utilizing different injection speeds, different screw rotation speeds, different mold opening or closing speeds, different pressure holding times, or different cooling times). However, in other cases, the manufacturing machine A and the manufacturing machine B can utilize the same configuration settings or operating parameters as each other, and the non-identicalness between the part D and the part E can be caused by inherent structural differences between the manufacturing machine A and the manufacturing machine B (e.g., the manufacturing machine A might have slightly different physical tolerances or might be calibrated slightly differently than the manufacturing machine B). In any case, the part D can be considered as having unique physical or chemical attributes, properties, or characteristics that are linked to the idiosyncrasies of the manufacturing machine A, and the part E can be considered as having unique physical or chemical attributes, properties, or characteristics that are linked to the idiosyncrasies of the manufacturing machine B. In other words, the part D can be considered as bearing the unique fabrication fingerprint of the manufacturing machine A, and the part E can be considered as instead bearing the unique fabrication fingerprint of the manufacturing machine B.

Now, in practice, a manufacturing facility can comprise multiple pieces of manufacturing equipment that are of the same type (e.g., can comprise multiple injection molders). In such case, because parts fabricated by distinct pieces of equipment can bear distinct physical or chemical fingerprints, it can be desired to continually or continuously trace, track, or determine which specific parts in the manufacturing facility were fabricated by which specific pieces of manufacturing equipment. Such tracing, tracking, or determination, which can be referred to as production management of manufactured parts, can be considered as helpful or useful for quality assurance purposes within the manufacturing facility.

Unfortunately, existing techniques for facilitating management or tracking of manufactured parts are ineffective or disadvantageous.

Some existing techniques facilitate management or tracking of manufactured parts by following strict part separation protocols within the manufacturing facility. In other words, such existing techniques attempt to keep (e.g., via assembly line dividers or production floor compartmentalization) the parts fabricated by any given manufacturing machine in the manufacturing facility completely separated or isolated from any parts fabricated by any other manufacturing machines in the manufacturing facility. Accordingly, when given a part, the location of the part within the manufacturing facility can be considered as indicating which manufacturing machine fabricated the given part. However, such existing techniques are burdensome, and it has been found that such existing techniques often do not guarantee one hundred percent part separation in practice, even when rigorously or exactingly implemented.

Other existing techniques facilitate management or tracking of manufactured parts via physical part markings. In particular, for any given part, such other existing techniques physically affix to the given part a mark (e.g., a serial number or bar code) that indicates which specific manufacturing machine fabricated the given part. In some cases, the mark can take the form of a paper or plastic tag or label that can be tied or adhered to the given part. In other cases, the mark can be directly printed onto the given part via ink or laser engraving. In other cases, the mark can be transferred from a tool onto a part using a molding or stamping process. Regardless of the type of mark or process of making the mark, physical part marking has various disadvantages. Specifically, in practice, marks that take the form of paper or plastic tags or labels have been found to often peel off or otherwise get lost. Additionally, directly printed or engraved or molded marks simply cannot be implemented for certain parts (e.g., some parts can be too small, intricate, sensitive, or fragile to have legible marks printed or engraved on them). In some cases, there may be cosmetic reasons that limit the ability to create a mark directly onto a part. In some cases, the cost of creating a label or using a label tracking system prohibits their use or implementation.

Accordingly, systems or techniques that can facilitate improved management or tracking of manufactured parts can be desirable.

Various embodiments described herein can address one or more of these technical problems. One or more embodiments described herein can include systems, computer-implemented methods, apparatus, or computer program products that can facilitate management or tracking of manufactured parts via deep learning. In other words, the inventors of various embodiments described herein devised various techniques that enable or allow manufactured parts to be managed or tracked (e.g., to determine which specific manufacturing machines fabricated with specific parts) without suffering the shortcomings of existing techniques, by leveraging deep learning. In particular, the present inventors realized that, although the unique fabrication fingerprint imparted onto a part fabricated by a manufacturing machine often cannot easily or readily be noticed by the naked eye, such unique fabrication fingerprint can nevertheless be visually perceptible to computing devices (e.g., since computing devices can granularly consider individual pixels or voxels and thus can detect or evaluate even incredibly minute or subtle visual details). Accordingly, for any given part, various embodiments described herein can involve obtaining an image of the given part and executing a deep learning neural network on the image.

The features present in an image may be associated with the mechanical, electrical, or chemical properties of the part or material. Surface roughness and texture, the presence of defects, patterns of color, and other observable attributes of the image can be representative of the chemical composition, microstructure, presence of defects, as well as their size, shape and distribution, and other aspects of a part or material that affect its properties. The properties may include mechanical properties such as the modulus, strength, toughness, fatigue life, or density. The properties may include chemical properties such as reactivity, chemical composition, hydrophobicity, or chemical affinity. The properties may include electrical or electronic properties such as impedance, capacitance, semiconductor behavior, or magnetic properties. The properties may include thermal properties such as thermal conductivity, specific heat capacity, glass transition temperature, melting temperature, or latent heat. Thus the deep learning neural network may be used to predict the properties of a part or material from an image.

In various aspects, a fabrication source of the given part (e.g., which specific manufacturing machine fabricated the given part, which specific operating parameters that specific manufacturing machine used to fabricate the given part) can be inferred based on such execution. In some instances, the deep learning neural network can be configured or trained as a classifier that can explicitly determine the fabrication source of the given part. In other instances, the deep learning neural network can instead be configured or trained as an encoder that can generate an embedding for the given part, and the fabrication source can be inferred or estimated by comparing that embedding to the embeddings of known or referential parts. Accordingly, the fabrication source of the given part can be determined, without having to rely upon strict part separation protocols, and without having to affix a physical mark (e.g., tag, label, engraved serial number) to the given part. Thus, various embodiments described herein can be considered as improving management or tracking of manufactured parts, without suffering the pitfalls of existing techniques.

Various embodiments described herein can be considered as a computerized tool (e.g., any suitable combination of computer-executable hardware or computer-executable software) that can facilitate management or tracking of manufactured parts via deep learning. In various aspects, such computerized tool can comprise an access component, an analysis component, or a result component.

In various embodiments, there can be a part image. In various aspects, the part image can be an image exhibiting any suitable format, size, or dimensionality (e.g., can be a two-dimensional pixel array, can be a three-dimensional voxel array). In various instances, the part image can be generated or captured by any suitable imaging modality (e.g., visible spectrum camera, a two-dimensional or three-dimensional scanner, X-ray scanner, or spectroscope). In various cases, the part image can visually depict or illustrate a manufactured part. In various aspects, the part image can visually illustrate an entirety or less than an entirety of the manufactured part. In various instances, the manufactured part can be any suitable part having any suitable size, shape, dimensions, or material composition and that was fabricated via any suitable fabrication or manufacturing techniques (e.g., casting, extrusion, 3D printing, injection molding). However, it can be the case that how or where the manufactured part was fabricated is unknown.

The part images may have high resolution, low resolution, or have a mixture of different resolutions. For example, the image may have pixel size or voxel size of 1 mm, 0.1 mm, 0.01 mm, or 0.001 mm. Other sizes are also possible including sizes that are larger than 1 mm and smaller than 0.001 mm. The image may have different resolutions in different parts of the image. An image may have one section in which the pixels are of one size and may have another section where the pixels are of a different size.

The image may consist of many pixels or voxels or may consist of a small number of pixels or voxels. For example, the image may consist of an array of 100×100 pixels, 240×240 pixels, 1000×1000 pixels, or 1,000,000×1,000,000. Other image sizes are also possible. The image may have an equal number of pixels or voxels in each dimension, or may have different numbers or voxels in each dimension. For example, an image may have a size of 100×500 pixels, 3×24 pixels, 1×200 pixels, or other values. In another example, a three-dimensional image may have a size of 100×500×100 voxels. The pixels may be arranged in a square, or a rectangle, or some other shape. The pixels or voxels may be evenly spaced or have uneven spacing. For example, the pixels or voxels may be 0.1 mm in size in one dimension and 0.01 mm in size in another dimension.

The image may be obtained or stored at one resolution and then all or part of the image will be converted to a lower resolution. Similarly, the image may be obtained or stored at one image size and then all or part of the image will be converted to a different image size. An image may be cropped. Two or more images may be merged to form a larger image. Two or more images may be merged, after which the merged image or part of the merged image may be converted into a lower resolution. It is also possible that a low-resolution image may be converted into a higher resolution image, for example using machine learning or artificial intelligence methods that can predict aspects of the high-resolution image.

An image may be divided into separate images. For example, an image that has 100×100 pixels may be divided into 10 images that each have size 10×100 pixels. In another example, an image that has 100×100 pixels may be divided into 100 images that each have size 10×10 pixels. The image may also be sampled in a way that extracts sub-images that are taken from any location of the original image. For example, starting with an image that has 100×100 pixels, it is possible to generate many sub-images of size 10×10 pixels or 20×20 pixels or 30×50 pixels. These sub-images may or may not share pixels in common. The sub-images may be of different sizes or resolutions.

The image may be collected as a three-dimensional information object represented by voxels or point clouds or other three-dimensional images or structures. There are various file formats and information objects that can be used to represent three-dimensional image data, for example a mesh representation, a standard tessellation language (STL) representation, a portable document format (PDF), an OBJ file, or other formats known for describing three-dimensional data. The three-dimensional structure may be converted into one or more two-dimensional images. There are different ways for converting three-dimensional images into two-dimensional images, for example by creating two-dimensional image slices from three-dimensional images. The surface of the three-dimensional image may be flattened, stretched, unrolled, or otherwise converted into a two-dimensional image. One dimensional images are also possible, for example a single row of pixels or voxels may be extracted from a two-dimensional or three-dimensional image.

The deep machine learning methods may benefit from training or testing on images at different resolution, different image size, or of mixed resolution or mixed image size. For example, a user may collect a high resolution image that is then converted to one or more other images that have lower resolution or mixed resolution. The converted images may be the same size or a different size compared to the original image. For example, the original, high-resolution image of a part may consist of an array of 1000×1000 pixels with a pixel spacing of 0.01 mm. The image may be divided into two or more sub-images. Some of the sub-images may be modified to have lower resolution than the original image. Some or all of the sub-images may be filtered, processed, or down sampled. The deep machine learning model may be trained or tested using the sub-images, where the sub-images have resolution, size, shape, or pixel spacing that may be different from the original image. The sub-images may themselves be divided into yet more sub-images which can then be further analyzed and processed using the methods described herein or methods known to those skilled in the art. The deep machine learning model may be trained or tested using images at different levels of resolution, different levels of magnification, different sizes, different number of pixels, or different shapes. For example, a deep machine learning model may divide an image into sub-images that are each at a different resolution and size. Some images may be in color while other images may be black and white or greyscale. There may be advantages to shifting, filtering, or otherwise modifying the color scale present in an image. Each pixel or set of pixels may have a multi-channel color scale.

The deep machine learning model may be trained to recognize surface texture, roughness, microscopic or macroscopic two-dimensional or three-dimensional shapes, or patterns that appear in the image in form of layers, regular or repeated artifacts, or shapes that can be represented by mathematical functions such as a Fourier series. The layers, texture, roughness, or regular or repeated features may be different in different portions of the part or different portions of the image. Some features may have regular or repeated features at different length scales, for example there may be one feature that repeats or forms a pattern with characteristic length scale 0.1 mm and another feature that repeats or forms a pattern with characteristic length scale 0.01 mm. Both types of features may appear in an image.

Some manufacturing methods create features and shapes on a part surface that have repeating features or patterns; other manufacturing methods create features and shapes on a part surface that are not obviously repeating but contain patterns and information that can be recognized with deep machine learning methods. Some manufacturing methods create features and shapes on a part surface that have both repeating aspects and non-repeating aspects. Some manufacturing methods distort the geometric features in a specific way such circular geometries, corners, or straight edges. The deep machine learning model can be trained to recognize repeating features and patterns, features and patterns that are not repeating, geometric features, or combinations thereof.

Some parts may be marked with a label that may be text, bar code, QR code, or other type of shape or feature that can be used to identify the part. The label may be fabricated into the native material of the part or may be attached after the part is fabricated. The deep machine learning model may be used to recognize the label. The presence of the label need not interfere with the function that the deep machine learning method performs to recognize and interpret the native roughness, textures, or patterns that appear in the part. The label recognition and analysis may occur in parallel with or separate from the recognition and analysis of the native surface features. In some cases, the label may indicate that part was fabricated on a particular machine, in a particular factory, from a particular material, or using a particular manufacturing process setting. The part designer may choose to label the part with an overt label that contains correct information about the machine, factory, process, or material. Alternatively, the part designer or manufacturer may choose to label the part with an overt label that contains false or misleading information. For example, the label may falsely indicate that that part was made using Machine A while in truth the part was made using Machine B. Such methods may allow for the detection of counterfeit parts by using the deep machine learning method to determine the true part origin.

For parts that may be marked with a label or are unlabeled, the deep learning model may be used as a replacement for data storage. The images or other data representation of the part can be used to train the model and then can either be discarded or stored in more economical cold storage. During training, the model learns and stores a representation of the part in the internal weights, activation functions, or other trainable modules and parameters of the model. The model can effectively learn a representation for data far exceeding the size of the model. During inference, the model effectively searches the training data to classify a part into the metadata categories or latent space for unsupervised models. In this way, the deep learning model can replace the storage and search of conventional databases that may be used to track labeled parts.

Other embodiments may be used to determine manufacturing origin or the authenticity of microelectronics components and systems. In certain applications, it is desirable to know the manufacturer, location of origin, country of origin, or process used to make a microelectronic device. For example, some microelectronic devices are certified for certain applications because they have stability, durability, longevity, accuracy, or precision. In some cases, there are laws or regulations that restrict certain microelectronics from being used in certain applications or from being transported between certain countries. In some applications, the microelectronics used are required to come from certain countries or certain manufacturers.

Microelectronic devices are typically packaged in ceramic, polymer, or metal packaging. The package may have been surface texture, roughness, irregularities, or tolerances that are unique to the machine, factory, material, or manufacturing process settings that were used to make the package. Thus, an image of the package may allow for prediction of these attributes by analyzing an image of the package using a deep learning neural network. Microelectronics packages are typically labelled with text or graphics that indicate the manufacturer or origin or other information that indicates the authenticity of the microelectronics contained in the package. Sometimes the label may be missing and there is a need for other means to determine the device origin. In some cases, the package may be labeled with incorrect or misleading information about the microelectronics origin, either for nefarious purposes or through negligence.

Microelectronic devices can be inspected before they are packaged or if they are removed from the package. The manufacturing processes used to fabricate microelectronic devices include photolithography, electron beam lithography, etching, and deposition of metals, ceramics, glasses, and other materials. The manufacturing machinery and processes used for microelectronics has imperfections and unique characteristics that can be used to determine the machine, process, material, or manufacturing process parameters used to make the microelectronic devices. Thus the deep learning neural network described herein may be used for determining these manufacturing attributes of microelectronic devices. Microelectronic devices can also be inspected using X-Ray, ultrasonic measurements, lasers, or other imaging modes that can see what is inside the packaging. Thus it is possible to measure microelectronic devices using one of these methods to determine its manufacturing origin or to perform authentication.

Microelectronics and microelectronic packages are typically assembled onto circuit boards. The equipment that performs this assembly also has unique characteristics that affects the arrangement of devices and packages in an electronics assembly. The microelectronic devices maybe attached to the circuit board with solder, which has unique characteristics from the equipment and process used to fabricate the solder connection. Indeed, any arrangement of electronic or mechanical devices in an assembly will have characteristics of the method of assembly and equipment used for assembly. It is possible to collect one or more images of the assembly. The images may be analyzed by the deep learning neural network to determine the manufacturing equipment, material, assembly method, or manufacturing process parameters used to manufacture the assembly or any of its components.

Some embodiments may be used to monitor production of additively manufactured components and ensure their quality and consistency. A challenge for additive manufacturing is that the part material and part structure are made at the same time, as opposed to other forms of manufacturing where the material is made first and then shaped into a structure. For additive manufacturing, it is important to characterize the materials and parts produced by a particular machine and process to ensure that they are consistent, have the desired mechanical properties, have the desired composition, and have the desired geometry. A machine, process, or material and be qualified by first printing a set of parts that are evaluated with mechanical property testing, microstructural analysis, or other measurements. When a production process is underway, additional parts can be made to ensure that the machine, process, or material is consistent over time. The embodiments may be used as part of such qualification or monitoring. For example, parts or materials that are known to meet the requirements of an application may be used to train a deep learning neural network. The trained network can then be used to evaluate additional parts to determine whether the additional parts meet the requirements of an application. For example, it may be known that certain parts have mechanical strength, microstructure, or material composition that is desired. New parts may be tested to determine if they meet expected requirements for mechanical strength, microstructure, or material composition. The deep learning neural network may also be used to determine if materials process settings or materials feedstock are as expected or different than expected. The deep learning neural network may also be used in an unsupervised manner, for example by analyzing many parts that were produced and classifying the parts by composition, feedstock, process parameters, or other measurable attributes. The deep learning neural network may be integrated into a comprehensive approach to part quality or a factory control system. For example, the image capture and interpretation may be one step performed in a production process, where the image or its analysis is stored in a database alongside other production information.

In various cases, it can be desired to determine how or where the manufactured part was fabricated. As a non-limiting example, a manufacturing facility comprising multiple manufacturing machines can have fabricated the manufactured part, and an owner, operator, or technician associated with the manufacturing facility can desire to determine, for quality assurance or factory management purposes, which specific manufacturing machine in the manufacturing facility fabricated the manufactured part. As another non-limiting example, the manufactured part can be known to have a defect, and the owner, operator, or technician associated with the manufacturing facility can desire to determine which specific manufacturing machine in the manufacturing facility is responsible for causing the defect. As yet another non-limiting example, the manufactured part can be returned to the manufacturing facility by a purported customer, and the owner, operator, or technician associated with the manufacturing facility can desire to determine whether the manufactured part really was fabricated by any of the manufacturing machines of the manufacturing facility, so as to ferret out counterfeiting. As even another non-limiting example, a customer can have purchased the manufactured part from the manufacturing facility, and the customer can desire to verify whether or not the manufacturing facility utilized proper or agreed-upon fabrication techniques to fabricate the manufactured part. As still another non-limiting example, the manufactured part can be known to have a defect, and the customer can desire to determine which other manufactured parts in its possession were fabricated in the same place or manner as the manufactured part, so as to pre-emptively identify parts that might have that same defect. As another non-limiting example, the manufactured part can be depleted or otherwise ready for replacement, and the customer can desire to determine which other manufactured parts in its possession were fabricated in the same place or manner as the manufactured part, so as to identify compatible replacements for the manufactured part.

In any case, the computerized tool can determine how or where the manufactured part was fabricated, as described herein.

In various embodiments, the access component of the computerized tool can electronically receive or otherwise electronically access the part image. In various aspects, the access component can electronically retrieve the part image from any suitable centralized or decentralized data structures (e.g., graph data structures, relational data structures, hybrid data structures), whether remote from or local to the access component. For instance, the access component can retrieve the part image from whatever imaging modality captured or generated the part image. In any case, the access component can electronically obtain or access the part image, such that the access component can act as a conduit by which or through which other components of the computerized tool can electronically interact with (e.g., read, write, edit, copy, manipulate) the part image.

In various embodiments, the analysis component of the computerized tool can store, maintain, control, or otherwise access a deep learning neural network. In various aspects, the deep learning neural network can exhibit any suitable internal architecture. For example, the deep learning neural network can include any suitable numbers of any suitable types of layers (e.g., input layer, one or more hidden layers, output layer, any of which can be convolutional layers, dense layers, non-linearity layers, long short-term memory (LSTM) layers, pooling layers, batch normalization layers, or padding layers). As another example, the deep learning neural network can include any suitable numbers of neurons in various layers (e.g., different layers can have the same or different numbers of neurons as each other). As yet another example, the deep learning neural network can include any suitable activation functions (e.g., softmax, sigmoid, hyperbolic tangent, rectified linear unit) in various neurons (e.g., different neurons can have the same or different activation functions as each other). As still another example, the deep learning neural network can include any suitable interneuron connections or interlayer connections (e.g., forward connections, skip connections, recurrent connections).

Regardless of its specific internal architecture, the deep learning neural network can be configured to operate on inputted images. Accordingly, in various instances, the analysis component can execute the deep learning neural network on the part image. In various cases, the analysis component can leverage such execution so as to at least partially determine a fabrication source of the manufactured part depicted in the part image (e.g., so as to determine which specific manufacturing machine of which specific manufacturing facility fabricated the manufactured part; or so as to determine what specific operating parameters were used to fabricate the manufactured part).

In some embodiments, the deep learning neural network can be configured as a classifier. In such cases, the analysis component can execute the deep learning neural network on the part image, and such execution can cause the deep learning neural network to produce a fabrication source classification label. More specifically, the analysis component can feed the part image to an input layer of the deep learning neural network. In various aspects, the part image can complete a forward pass through one or more hidden layers of the deep learning neural network. In various instances, an output layer of the deep learning neural network can compute the fabrication source classification label, based on activation maps or feature maps provided by the one or more hidden layers.

In various cases, the fabrication source classification label can be considered as any suitable electronic data that explicitly specifies or indicates any suitable information pertaining to the fabrication of the manufactured part.

As a non-limiting example, the fabrication source classification label can explicitly specify or indicate in which one of two or more defined geographic locations (e.g., which continent of two or more defined continents, which country of two or more defined countries, which state or province of two or more defined states or provinces, or which city of two or more defined cities) the manufactured part is predicted or inferred to have been fabricated. Indeed, it is possible for parts that are fabricated in different geographic regions or locations to possess, exhibit, or otherwise express unique physical or chemical qualities. Such unique physical or chemical qualities can be visually manifested or perceptible. Accordingly, the deep learning neural network can classify the manufactured part as having been fabricated in one of the two or more defined geographic locations, based on whatever physical or chemical qualities of the manufactured part are depicted in the part image.

As another non-limiting example, the fabrication source classification label can explicitly specify or indicate in which one of two or more defined manufacturing facilities the manufactured part is predicted or inferred to have been fabricated. After all, just as above, it is possible for parts that are fabricated in different factories to possess, exhibit, or otherwise express unique physical or chemical qualities. Such unique physical or chemical qualities can be visually manifested or perceptible. So, the deep learning neural network can classify the manufactured part as having been fabricated in one of the two or more defined manufacturing facilities, based on whatever physical or chemical qualities of the manufactured part are depicted in the part image.

As even another non-limiting example, the fabrication source classification label can explicitly specify or indicate by which one of two or more defined manufacturing machines within a specific manufacturing facility the manufactured part is predicted or inferred to have been fabricated. Again, just as above, it is possible for parts that are fabricated by different pieces of equipment (e.g., even if such different pieces of equipment belong to the same type, such as different injection molders) to possess, exhibit, or otherwise express unique physical or chemical qualities. Such unique physical or chemical qualities can be visually manifested or perceptible. Thus, the deep learning neural network can classify the manufactured part as having been fabricated by one of the two or more defined manufacturing machines, based on whatever physical or chemical qualities of the manufactured part are depicted in the part image.

As even another non-limiting example, the fabrication source classification label can explicitly specify or indicate which values, categories, or settings of various defined operating parameters of a specific manufacturing machine the manufactured part is predicted or inferred to have been fabricated according to. Once more, just as above, it is possible for parts that are fabricated by the same piece of equipment but according to different operating parameters (e.g., different injection speeds, different temperatures, different tool speeds, different hold times, different maximum pressures) to possess, exhibit, or otherwise express unique physical or chemical qualities. Such unique physical or chemical qualities can be visually manifested or perceptible. Thus, the deep learning neural network can classify the manufactured part as having been fabricated according to specific values, categories, or settings of the various defined operating parameters, based on whatever physical or chemical qualities of the manufactured part are depicted in the part image.

In other embodiments, rather than being configured as a classifier, the deep learning neural network can instead be configured as an encoder. In such cases, the analysis component can execute the deep learning neural network on the part image, and such execution can cause the deep learning neural network to produce a fabrication signature embedding. More specifically, the analysis component can feed the part image to an input layer of the deep learning neural network. In various aspects, the part image can complete a forward pass through one or more hidden layers of the deep learning neural network. In various instances, an output layer of the deep learning neural network can compute the fabrication signature embedding, based on activation maps or feature maps provided by the one or more hidden layers.

In various cases, the fabrication signature embedding can be considered as a dimensionally-reduced numerical representation of the part image. In other words, the fabrication signature embedding can be considered as a latent vector comprising fewer (e.g., in some cases, many orders of magnitude fewer) numerical elements than the part image but that nevertheless captures or encapsulates (e.g., albeit in hidden, obscure, or unclear fashion) whatever unique physical or chemical attributes, properties, or characteristics of the manufactured part are visually depicted or illustrated in the part image. In still other words, the manufactured part can have been fabricated by any given manufacturing machine in any given manufacturing facility in any given geographic location utilizing any given operating parameters; such fabrication can have left a unique, visually-perceptible fingerprint on the manufactured part; and the fabrication signature embedding can be considered as a latent, numerical representation of that unique, visually-perceptible fingerprint.

In various aspects, the analysis component can leverage the fabrication signature embedding to infer or estimate how or where the manufactured part was fabricated.

In some instances, such leveraging can involve comparing the fabrication signature embedding to that of a reference part. As a non-limiting example, suppose that the reference part is known to have a particular fabrication source (e.g., to have been fabricated in a particular geographic location, in a particular manufacturing facility, by a particular manufacturing machine, or via particular operating parameters). In various cases, the analysis component can execute the deep learning neural network on an image of that reference part, thereby yielding a fabrication signature embedding for that reference part. Accordingly, the analysis component can compare (e.g., via Euclidean distance, via cosine similarity) the fabrication signature embedding of the manufactured part to the fabrication signature embedding of that reference part. If those fabrication signature embeddings are not within any suitable threshold margin of similarity, the analysis component can conclude that the manufactured part does not have the same fabrication source as that reference part (e.g., can conclude that the manufactured part was not fabricated in the same geographic location, in the same manufacturing facility, by the same manufacturing machine, or via the same operating parameters as that reference part). In contrast, if those fabrication signature embeddings are within any suitable threshold margin of similarity, the analysis component can instead conclude that the manufactured part has the same fabrication source as that reference part (e.g., can conclude that the manufactured part was fabricated in the same geographic location, in the same manufacturing facility, by the same manufacturing machine, or via the same operating parameters as that reference part).

Note that such embedding comparison can provide useful information regarding the manufactured part, even if the reference part does not have a known fabrication source. For instance, suppose that that it is not known in what geographic location, in what manufacturing facility, by what manufacturing machine, or via what operating parameters the reference part was fabricated. Now, if the fabrication signature embedding of the manufactured part is within any suitable threshold level of similarity of the fabrication signature embedding of the reference part, then the analysis component can conclude that the manufactured part and the reference part have the same, albeit unknown, fabrication source. If the reference part in such case is known to be of acceptable or sufficient build quality, then the analysis component can conclude that the manufactured part is likely to also be of acceptable or sufficient build quality (e.g., due to having been fabricated in the same unknown place or in the same unknown manner as the reference part). Instead, if the reference part in such case is known to be of unacceptable or insufficient build quality, then the analysis component can conclude that the manufactured part is likely to also be of unacceptable or insufficient build quality (e.g., due to having been fabricated in the same unknown place or in the same unknown manner as the reference part).

Although the above discussion pertains to comparing the fabrication signature embedding of the manufactured part with that of a single reference part, this is a mere non-limiting example for ease of explanation. In other embodiments, the analysis component can instead compare the fabrication signature embedding of the manufactured part with those of multiple reference parts. Indeed, in some aspects, the analysis component can electronically store, maintain, control, or otherwise access a database comprising a multitude of images of reference parts. In various instances, the analysis component can execute the deep learning neural network on each of those multitude of images, thereby yielding a respectively corresponding multitude of fabrication signature embeddings. In various cases, the analysis component can apply any suitable clustering technique (e.g., centroid-based clustering, density-based clustering, distribution-based clustering, hierarchical clustering) to such multitude of fabrication signature embeddings, thereby yielding a set of fabrication signature clusters. In various aspects, each fabrication signature cluster can be considered as representing a respective or unique fabrication source (e.g., a respective or unique geographic location, a respective or unique manufacturing facility, a respective or unique manufacturing machine, or a respective or unique combination of operating parameters), even if not explicitly known. In various instances, the analysis component can identify which of such set of fabrication signature clusters the fabrication signature embedding of the manufactured part is closest to, and the manufactured part can thus be considered as having been fabricated by whatever fabrication source is represented by that identified cluster.

In various embodiments, the result component of the computerized tool can electronically generate an electronic alert that indicates, or is otherwise based on, whatever fabrication source information pertaining to the manufactured part is determined or inferred by the analysis component. In some aspects, the result component can electronically transmit the electronic alert to any suitable computing device. As a non-limiting example, the result component can transmit the electronic alert to whatever computing device supplied the part image. In other aspects, the result component can electronically render the electronic alert on any suitable electronic display (e.g., computer screen, computer monitor).

Now, consider various use-case scenarios in which the computerized tool can be implemented.

In some scenarios, the computerized tool can be owned, operated, or otherwise maintained by a manufacturing facility and can be leveraged by the manufacturing facility to perform production management or tracking. In particular, the manufacturing facility can comprise a plurality of manufacturing machines. In various instances, an owner, operator, or technician of the manufacturing facility can believe or expect that the manufactured part was fabricated by a specific one of the plurality of manufacturing machines using specific operating parameters. In various cases, the owner, operator, or technician can verify this belief or expectation by querying the computerized tool. Indeed, the part image depicting the manufactured part can be made available to the computerized tool, and the computerized tool can identify, via execution of the deep learning neural network, whether the manufactured part actually was fabricated by the specific manufacturing machine using the specific operating parameters. If so, the electronic alert generated by the computerized tool can indicate that the manufactured part was fabricated as expected and that the manufacturing facility has thus not experienced a production chain failure (e.g., has not experienced impermissible part mixing). If not (e.g., if the manufactured part was not fabricated by the specific manufacturing machine; or if the manufactured part was fabricated by the specific manufacturing machine but not using the specific operating parameters), the electronic alert generated by the computerized tool can instead indicate that the manufactured part was not fabricated as expected and that the manufacturing facility has thus experienced a production chain failure (e.g., has experienced impermissible part mixing).

In other scenarios, the computerized tool can be owned, operated, or otherwise maintained by the manufacturing facility and can be leveraged by the manufacturing facility to identify malfunctioning ones of the plurality of manufacturing machines. In particular, the owner, operator, or technician of the manufacturing facility can deem that the manufactured part is defective, damaged, or otherwise poorly constructed. In various aspects, the owner, operator, or technician can determine which of the plurality of manufacturing machines is responsible for such defect, damage, or poor construction, by querying the computerized tool. Indeed, the part image depicting the manufactured part can be made available to the computerized tool, and the computerized tool can identify, via execution of the deep learning neural network, which one of the plurality of manufacturing machines fabricated the manufactured part. In various instances, the electronic alert generated by the computerized tool can indicate that the identified manufacturing machine is responsible for the defect, damage, or poor construction of the manufactured part and can accordingly recommend that the identified manufacturing machine be serviced, inspected, or repaired. In some cases, the computerized tool can (e.g., via the result component) electronically schedule such servicing, inspection, or repair for the identified manufacturing machine.

In yet other scenarios, the computerized tool can be owned, operated, or otherwise maintained by the manufacturing facility and can be leveraged by the manufacturing facility to ferret out fraud or counterfeiting. In particular, the manufactured part can be returned to the manufacturing facility by a customer asserting, alleging, or purporting that the manufactured part was fabricated by the manufacturing facility and requesting a discount or refund for the manufactured part. In various aspects, the owner, operator, or technician of the manufacturing facility can determine whether the manufactured part was actually fabricated by any of the plurality of manufacturing machines in the manufacturing facility, by querying the computerized tool. Indeed, the part image depicting the manufactured part can be made available to the computerized tool, and the computerized tool can identify, via execution of the deep learning neural network, which one, if any, of the plurality of manufacturing machines fabricated the manufactured part. If the computerized tool determines that one of the plurality of manufacturing machines really did fabricate the manufactured part, the electronic alert generated by the computerized tool can indicate that the manufactured part is authentic and can recommend that the customer's request for a discount or refund be honored or processed. On the other hand, if the computerized tool instead determines that none of the plurality of manufacturing machines fabricated the manufactured part, the electronic alert generated by the computerized tool can instead indicate that the manufactured part is counterfeit and can recommend that the customer's request for a discount or refund not be honored or processed.

In even other scenarios, the computerized tool can be owned, operated, or otherwise maintained by a customer facility and can be leveraged by the customer facility to perform supply chain verification or compliance checking. In particular, an owner, operator, or technician of the customer facility can have purchased the manufactured part from the manufacturing facility. Moreover, the owner, operator, or technician of the customer facility can believe or expect that the manufactured part was fabricated in accordance with one or more particular production specifications (e.g., can believe or expect that the manufactured part was fabricated by a specific one of the plurality of manufacturing machines of the manufacturing facility using specific operating parameters). In various cases, the owner, operator, or technician of the customer facility can verify this belief or expectation by querying the computerized tool. Indeed, the part image depicting the manufactured part can be made available to the computerized tool, and the computerized tool can identify, via execution of the deep learning neural network, whether the manufactured part actually was fabricated in accordance with the one or more particular production specifications (e.g., actually was fabricated by the specific manufacturing machine using the specific operating parameters). If so, the electronic alert generated by the computerized tool can indicate that the manufactured part was fabricated properly or otherwise as agreed-upon by the manufacturing facility. If not (e.g., if the manufactured part was not fabricated by the specific manufacturing machine; or if the manufactured part was fabricated by the specific manufacturing machine but not using the specific operating parameters), the electronic alert generated by the computerized tool can instead indicate that the manufactured part was fabricated improperly or otherwise not as agreed-upon by the manufacturing facility.

In still other scenarios, the computerized tool can be owned, operated, or otherwise maintained by the customer facility and can be leveraged by the customer facility to search for parts currently being utilized by the customer facility but which are likely to fail or be defective. In particular, the manufactured part can be currently in-use or currently deployed within the customer facility. Moreover, there can be another part that is known by the owner, operator, or technician of the customer facility to have failed or to be defective. In various cases, the owner, operator, or technician of the customer facility can determine whether or not the manufactured part is likely to fail or be defective in the same way as the another part, by querying the computerized tool. Indeed, the part image depicting the manufactured part can be made available to the computerized tool, another image depicting the another part can also be made available to the computerized tool, and the computerized tool can determine, via execution of the deep learning neural network on the part image and on the another image, whether the manufactured part and the another part have the same (or otherwise similar) fabrication source as each other (e.g., whether they were fabricated in the same geographic location as each other; whether they were fabricated in the same manufacturing facility as each other; whether they were fabricated by the same manufacturing machine as each other, or whether they were fabricated according to the same operating parameters as each other). If not, the electronic alert generated by the computerized tool can indicate that the manufactured part is not likely to fail or be defective in the same way as the another part. If so, the electronic alert generated by the computerized tool can instead indicate that the manufactured part is likely to fail or be defective in the same way as the another part. In such case, the electronic alert can further recommend that the manufactured part be no longer used, be no longer deployed, or be subjected to a risk analysis.

In some scenarios, the computerized tool can be owned, operated, or otherwise maintained by the customer facility and can be leveraged by the customer facility to verify compatibility between parts. In particular, the manufactured part can be currently depleted or otherwise no longer suitable for service or deployment. Moreover, there can be another part that is expected or believed by the owner, operator, or technician of the customer facility to be an appropriate replacement for the manufactured part. In various cases, the owner, operator, or technician of the customer facility can verify this belief or expectation, by querying the computerized tool. Indeed, the part image depicting the manufactured part can be made available to the computerized tool, another image depicting the another part can also be made available to the computerized tool, and the computerized tool can determine, via execution of the deep learning neural network on the part image and on the another image, whether the manufactured part and the another part have the same (or otherwise similar) fabrication source as each other (e.g., whether they were fabricated in the same geographic location as each other; whether they were fabricated in the same manufacturing facility as each other; whether they were fabricated by the same manufacturing machine as each other, or whether they were fabricated according to the same operating parameters as each other). If so, the electronic alert generated by the computerized tool can indicate that the manufactured part can be properly replaced by the another manufactured part. If not, the electronic alert generated by the computerized tool can instead indicate that the manufactured part cannot be properly replaced by the another manufactured part.

In yet other scenarios, the computerized tool can be maintained in a cloud-computing environment and can be considered as offering a fabrication source identification service to third-parties. In such cases, the computerized tool can be queried by any suitable computing devices (e.g., computing devices associated with manufacturing facilities, computing devices associated with customer facilities, or even computing devices associated with retail-consumers). In various aspects, any given computing device can transmit to the computerized tool the part image depicting the manufactured part. In various instances, the computerized tool can determine (e.g., via any suitable credential checking techniques) whether or not the given computing device has permission, authorization, or a license to query the computerized tool. If not, the computerized tool can ignore the part image (or can return to the given computing device an error message). If so, the computerized tool can instead determine, by executing the deep learning neural network on the part image, a fabrication source of the manufactured part. In various cases, the computerized tool can return to the given computing device the electronic notification, which can indicate the fabrication source of the manufactured part.

In this way, the computerized tool can be considered as leveraging deep learning so as to facilitate management or tracking of fabrication sources of manufactured parts.

In order for the fabrication source determinations produced by the analysis component of the computerized tool to be accurate or reliable, the deep learning neural network can first undergo training. Accordingly, the computerized tool can comprise a training component which can train the deep learning neural network on a training dataset comprising training part images. In situations where the deep learning neural network is configured as a classifier, the training dataset can comprise ground-truth classification labels corresponding to the training part images, and the training component can train the deep learning neural network in supervised fashion. In situations where the deep learning neural network is instead configured as an encoder, the training dataset can lack or omit ground-truth classification labels, and the training component can train the deep learning neural network in unsupervised fashion (e.g., in an encoder-decoder pipeline, otherwise known as an autoencoder pipeline).

Various embodiments described herein can be employed to use hardware or software to solve problems that are highly technical in nature (e.g., to facilitate management or tracking of manufactured parts via deep learning), that are not abstract and that cannot be performed as a set of mental acts by a human. Further, some of the processes performed can be performed by a specialized computer (e.g., deep learning neural network) for carrying out defined acts related to part manufacturing.

As a non-limiting example, such defined acts can include: accessing, by a device operatively coupled to a processor, an image of a manufactured part, wherein the manufactured part is fabricated in a manufacturing facility comprising a plurality of manufacturing machines; inferring, by the device and based on executing a deep learning neural network on the image, which of the plurality of manufacturing machines fabricated the manufactured part; determining, by the device, whether or not the inferred manufacturing machine matches an expected manufacturing machine that is supposed to fabricate the manufactured part; and generating, by the device and in response to a determination that the inferred manufacturing machine does not match the expected manufacturing machine, an electronic alert indicating that a production chain failure has occurred in the manufacturing facility.

As another non-limiting example, such defined acts can include: accessing, by a device operatively coupled to a processor, an image of a defective manufactured part, wherein the defective manufactured part is fabricated in a manufacturing facility comprising a plurality of manufacturing machines; inferring, by the device and based on executing a deep learning neural network on the image, which of the plurality of manufacturing machines fabricated the defective manufactured part; and generating, by the device, an electronic alert indicating that the inferred manufacturing machine warrants inspection, servicing, or maintenance.

As yet another non-limiting example, such defined acts can include: accessing, by a device operatively coupled to a processor and from a client device, an image of a returned manufactured part, wherein the client device requests that the returned manufactured part be discounted or refunded; inferring, by the device and based on executing a deep learning neural network on the image, whether or not any of a plurality of manufacturing machines in a manufacturing facility fabricated the returned manufactured part; and generating, by the device and in response to a determination that none of the plurality of manufacturing machines in the manufacturing facility fabricated the returned manufactured part, an electronic alert indicating that the returned manufactured part is counterfeit.

As even another non-limiting example, such defined acts can include: accessing, by a device operatively coupled to a processor, an image of a purchased manufactured part; inferring, by the device and based on executing a deep learning neural network on the image, whether or not the purchased manufactured part was fabricated according to one or more expected production specifications; and generating, by the device and in response to a determination that the purchased manufactured part was not fabricated according to the one or more expected production specifications, an electronic alert indicating that the purchased manufactured part was improperly fabricated.

As still another non-limiting example, such defined acts can include: accessing, by a device operatively coupled to a processor, an image of an in-use manufactured part; generating, by the device and based on executing a deep learning neural network on the image, a first fabrication signature embedding of the in-use manufactured part; determining, by the device, whether or not the first fabrication signature embedding of the in-use manufactured part is within a threshold distance of a second fabrication signature embedding of a known defective manufactured part; and generating, by the device and in response to a determination that the first fabrication signature embedding is within the threshold distance of the second fabrication signature embedding, an electronic alert that indicates that the in-use manufactured part was fabricated by a same manufacturing machine as the known defective manufactured part.

As another non-limiting example, such defined acts can include: accessing, by a device operatively coupled to a processor, a first image of a depleted manufactured part and a second image of a spare manufactured part; generating, by the device and based on executing a deep learning neural network on the first image and on the second image, a first fabrication signature embedding of the depleted manufactured part and a second fabrication signature embedding of the spare manufactured part; determining, by the device, whether or not the first fabrication signature embedding of the depleted manufactured part is within a threshold distance of the second fabrication signature embedding of the spare manufactured part; and generating, by the device and in response to a determination that the first fabrication signature embedding is not within the threshold distance of the second fabrication signature embedding, an electronic alert that indicates that the spare manufactured part is not compatible with the depleted manufactured part.

As yet another non-limiting example, such defined acts can include: receiving, by a cloud server operatively coupled to a processor, a query from a client device, wherein the query comprises an image of a manufactured part; inferring, by the cloud server and based on executing a deep learning neural network on the image, a fabrication source of the manufactured part; and transmitting, by the cloud server and to the client device, an electronic notification indicating the fabrication source.

Such defined acts are not performed manually by humans. Indeed, neither the human mind nor a human with pen and paper can electronically determine, via executing a deep learning neural network on an image that depicts a specific manufactured part, a fabrication source of that specific manufactured part (e.g., a country, state, city, or factory of origin of that specific manufactured part; a specific piece of equipment that fabricated that specific manufactured part; or specific operating parameters that were used to fabricate that specific manufactured part). Indeed, a deep learning neural network (e.g., a classifier, an encoder) is an inherently-computerized construct that simply cannot be meaningfully implemented, trained, or executed in any way by the human mind without computers. Furthermore, classification labels and embedding vectors are also inherently-computerized constructs that simply cannot be meaningfully implemented outside of a computing environment. Accordingly, a computerized tool that can perform fabrication source management or tracking of manufactured parts by leveraging a deep learning neural network is likewise inherently-computerized and cannot be implemented in any sensible, practical, or reasonable way without computers.

Moreover, various embodiments described herein integrate into a practical application various teachings relating to management or tracking of manufactured parts via deep learning. As explained above, some existing techniques facilitate management or tracking of manufactured parts via strict part separation. Unfortunately, such existing techniques are burdensome and often fail to achieve one hundred percent part separation even when rigorously implemented. Also as explained above, other existing techniques facilitate management or tracking of manufactured parts via markings that are physically affixed to parts (e.g., serial numbers or bar codes that are printed on tags or labels that are tied or adhered to parts; or serial numbers or bar codes that are printed or engraved directly onto parts). Unfortunately, such other existing techniques do not work with certain types of parts (e.g., do not work with parts that are too small, too intricate, or too fragile). Accordingly, existing techniques for facilitating management or tracking of manufactured parts can be considered as suffering from various technical problems.

Various embodiments described herein address one or more of these technical problems. In particular, various embodiments described herein can involve training a deep learning neural network to classify, quantify, or otherwise capture fabrication source information of any given manufactured part, based upon an image (e.g., a visible spectrum photograph, a two-dimensional or three-dimensional scan, an X-ray scanned image, three-dimensional point cloud or information object, a spectroscope scanned image) of that given manufactured part. Indeed, the present inventors recognized that that given manufactured part can have unique physical or chemical attributes, properties, or characteristics that depend upon or that are otherwise caused by the idiosyncrasies of whatever manufacturing machine fabricated that given manufactured part, and the present inventors further recognized that such unique physical or chemical attributes, properties, or characteristics can often be subtly visually perceptible (e.g., not necessarily to the naked eye, but to computers). In other words, that given manufactured part can be considered as being imbued with a unique, visible fingerprint of whatever manufacturing machine fabricated it. Note that such unique, visible fingerprint is not equivalent to a purposeful part marking. Indeed, such unique, visible fingerprint is not a serial number or a bar code. Instead, such unique, visible fingerprint is one or more visually-detectable physical or chemical features (e.g., subtle yet unique surface textures or roughness patterns, subtle yet unique warping patterns, subtle yet unique surface hues) of the given manufactured part that are uniquely caused by whatever equipment fabricates the given manufactured part and that occur no matter the size, intricacy, or fragility of the given manufactured part. As described herein, the deep learning neural network can be trained to detect or otherwise encapsulate such unique, visible fingerprint. In other words, the deep learning neural network can be leveraged so as to infer or predict a fabrication source of the given manufactured part, even in the absence of strict part separation, and even in the absence of a purposeful part marking. Accordingly, various embodiments described herein do not suffer the shortcomings or disadvantages of existing techniques. For at least these reasons, various embodiments described herein certainly constitute concrete and tangible technical improvements in the field of part manufacturing, and such embodiments therefore clearly qualify as useful and practical applications of computers.

Furthermore, various embodiments described herein can control real-world tangible devices based on the disclosed teachings. For example, various embodiments described herein can electronically train or execute real-world deep learning neural networks so as to determine how or where real-world manufactured parts were fabricated.

Thus, these embodiments are suitable for analyzing machine, process, location, material, or other manufacturing parameters for both high volume and low volume production. For example, the embodiments can be used when the manufacturing batch size is 50 parts, 500 parts, 5000, parts, or five million parts. Other volumes are also possible. The embodiments can be used to analyze machine, process, location, material, or other manufacturing parameters when the production rate is low or high. Some types of manufacturing produce parts at a low rate and other types of manufacturing produce parts at a high rate. For example, fused deposition modeling (FDM) additive manufacturing may produce parts at a rate of one to ten parts per hour. In contrast, powder-based or resin-based additive manufacturing may produce parts at a rate of 10 to 100 parts an hour or more. The production rate is a manufacturing process parameter that can be analyzed, predicted, or classified using the embodiments.

It should be appreciated that the herein figures and description provide non-limiting examples of various embodiments and are not necessarily drawn to scale.

FIG. 1 illustrates a block diagram of an example, non-limiting system 100 that can facilitate management or tracking of manufactured parts via deep learning in accordance with one or more embodiments described herein. As shown, a manufactured part management system 102 can be electronically integrated, via any suitable wired or wireless electronic connection, with a part image 104.

In various embodiments, the part image 104 can be any suitable image exhibiting any suitable format, size, or dimensionality. As a non-limiting example, the part image 104 can be an x-by-y array of pixels, for any suitable positive integers x and y. As another non-limiting example, the part image 104 can be an x-by-y-by-z array of voxels, for any suitable positive integers x, y, and z. In various aspects, the part image 104 can be captured or otherwise generated by any suitable imaging modality. As a non-limiting example, the part image 104 can be captured or generated by any suitable visible spectrum camera, in which case the part image 104 can be considered as a visible spectrum photograph. As another non-limiting example, the part image 104 can be captured or generated by any suitable medical imaging scanner (e.g., a computed tomography (CT) scanner, an X-ray scanner, a magnetic resonance imaging (MRI) scanner, an ultrasound scanner, a positron emission tomography (PET) scanner, a nuclear medicine (NM) scanner), in which case the part image 104 can be considered as a medical scanned image (e.g., a CT scanned image, an X-ray scanned image, an MRI scanned image, an ultrasound scanned image, a PET scanned image, an NM scanned image). As yet another non-limiting example, the part image 104 can be captured or generated by any suitable spectroscope, in which case the part image 104 can be considered as a spectroscopic scanned image. In various instances, the part image 104 can have undergone any suitable types of post-processing techniques. As a non-limiting example, the part image 104 can have undergone image resolution enhancement. As another non-limiting example, the part image 104 can have undergone image denoising. As yet another non-limiting example, the part image 104 can have undergone image reconstruction (e.g., filtered back projection).

In any case, the part image 104 can visually depict or visually illustrate a manufactured part 106. In various aspects, the manufactured part 106 can be any suitable part (e.g., any suitable tangible or physical structure, thing, or object) that can exhibit any suitable shape, any suitable dimensions (e.g., length, width, height, thickness, radius of curvature), or any suitable material composition (e.g., composed of copper, composed of steel, composed of plastic, composed of wood, composed of wax). In various instances, the manufactured part 106 can be or can have been fabricated according to any suitable automated manufacturing techniques. As some non-limiting examples, the manufactured part 106 can be or can have been fabricated by: automated additive manufacturing; automated computer numerically controlled machining; automated injection molding; automated rotational molding; automated casting; automated extrusion; automated forging; automated stamping; automated vacuum forming; automated bending; automated cutting; automated polishing; automated brazing; automated milling; automated grinding; automated broaching; automated welding; automated riveting; automated painting; automated dying; automated weaving; automated braiding; automated gluing; automated annealing; automated heat treating; or automated chemical treating.

In various aspects, the part image 104 can depict or illustrate an entirety of the manufactured part 106, such that no substantial portion of the manufactured part 106 is hidden in the part image 104 or otherwise extends beyond the boundary or frame of the part image 104. As some non-limiting examples, the part image 104 can show: a full front view of the manufactured part 106; a full top view of the manufactured part 106; a full side view of the manufactured part 106; a full isometric or perspective view of the manufactured part 106; or any suitable combination thereof.

In other aspects, however, the part image 104 can instead depict or illustrate less than an entirety of the manufactured part 106, such that one or more substantial portions of the manufactured part 106 are hidden in the part image 104 or otherwise extend beyond the boundary or frame of the part image 104. As a non-limiting example, the part image 104 can show a zoomed-in view of a machined surface or a machined edge of the manufactured part 106.

In various instances, whether or not the part image 104 depicts or illustrates the entirety of the manufactured part 106 can depend upon the manufactured part 106 itself. As a non-limiting example, suppose that the manufactured part 106 is a substantially two-dimensional object. In other words, suppose that the manufactured part 106 has non-zero measurements along all three principal axes of three-dimensional space (e.g., has a non-zero length, a non-zero width, and a non-zero depth), but suppose that one of those non-zero measurements is several times smaller than the other non-zero measurements (e.g., a plate-like part can have a thickness that is many times smaller than its length or width). In such case, it can be convenient or practicable for the part image 104 to show the entirety of the manufactured part 106 (e.g., the only portion of the manufactured part 106 that is hidden in the part image 104 can be that which extends along the many-times-smaller principal axis). As another non-limiting example, suppose that the manufactured part 106 is a substantially three-dimensional object. In other words, suppose that the manufactured part 106 has non-zero measurements along all three principal axes of three-dimensional space (e.g., has a non-zero length, a non-zero width, and a non-zero depth), and suppose that none of those non-zero measurements is several times smaller than the other non-zero measurements. In such case, it can be convenient or practicable for the part image 104 to show less than the entirety of the manufactured part 106 (e.g., the manufactured part 106 can substantially or meaningfully extend along all three principal axes, and thus at least some substantial or meaningful portion of the manufactured part 106 can be hidden in the part image 104).

In various other instances, whether or not the part image 104 depicts or illustrates the entirety of the manufactured part 106 can depend upon whether the manufactured part 106 is currently being used or deployed. As a non-limiting example, suppose that the manufactured part 106 is currently installed within a larger apparatus. In such case, less than the entirety of the manufactured part 106 can be accessible or viewable by whatever imaging modality captures or generates the part image 104 (e.g., a bolt can be currently fastening two or more constituent pieces of an apparatus together; in such case, the head of the bolt can be visible, but the shank or threaded length of the bolt can be not visible). As another non-limiting example, suppose that the manufactured part 106 is instead not currently installed within a larger apparatus. In such case, the entirety of the manufactured part 106 can be accessible or viewable by whatever imaging modality captures or generates the part image 104 (e.g., if a bolt is not currently fastening two or more constituent pieces of an apparatus together, all substantial portions of the bolt can be visible, such as the head, the shank, or the threaded length).

In any case, it can be desired to determine or verify a fabrication source of the manufactured part 106. As described herein, the manufactured part management system 102 can facilitate such determination or verification.

In various embodiments, the manufactured part management system 102 can comprise a processor 108 (e.g., computer processing unit, microprocessor) and a non-transitory computer-readable memory 110 that is operably or operatively or communicatively connected or coupled to the processor 108. The non-transitory computer-readable memory 110 can store computer-executable instructions which, upon execution by the processor 108, can cause the processor 108 or other components of the manufactured part management system 102 (e.g., access component 112, analysis component 114, result component 116) to perform one or more acts. In various embodiments, the non-transitory computer-readable memory 110 can store computer-executable components (e.g., access component 112, analysis component 114, result component 116), and the processor 108 can execute the computer-executable components.

In various embodiments, the manufactured part management system 102 can comprise an access component 112. In various aspects, the access component 112 can electronically receive or otherwise electronically access the part image 104. In various instances, the access component 112 can electronically retrieve the part image 104 directly from whichever imaging modality generated or captured the part image 104. However, in other instances, the access component 112 can electronically retrieve the part image 104 from any other computing devices (not shown), such as centralized or decentralized intermediary data structures. In any case, the access component 112 can electronically obtain or access the part image 104, such that other components of the manufactured part management system 102 can electronically interact (e.g., by proxy) with the part image 104.

In various embodiments, the manufactured part management system 102 can comprise an analysis component 114. In various aspects, the analysis component 114 can, as described herein, determine or infer a fabrication source of the manufactured part 106, by executing a deep learning neural network on the part image 104.

In various embodiments, the manufactured part management system 102 can comprise a result component 116. In various instances, the result component 116 can, as described herein, generate an electronic alert, based on the fabrication source determined or inferred by the analysis component 114.

Figure 2:
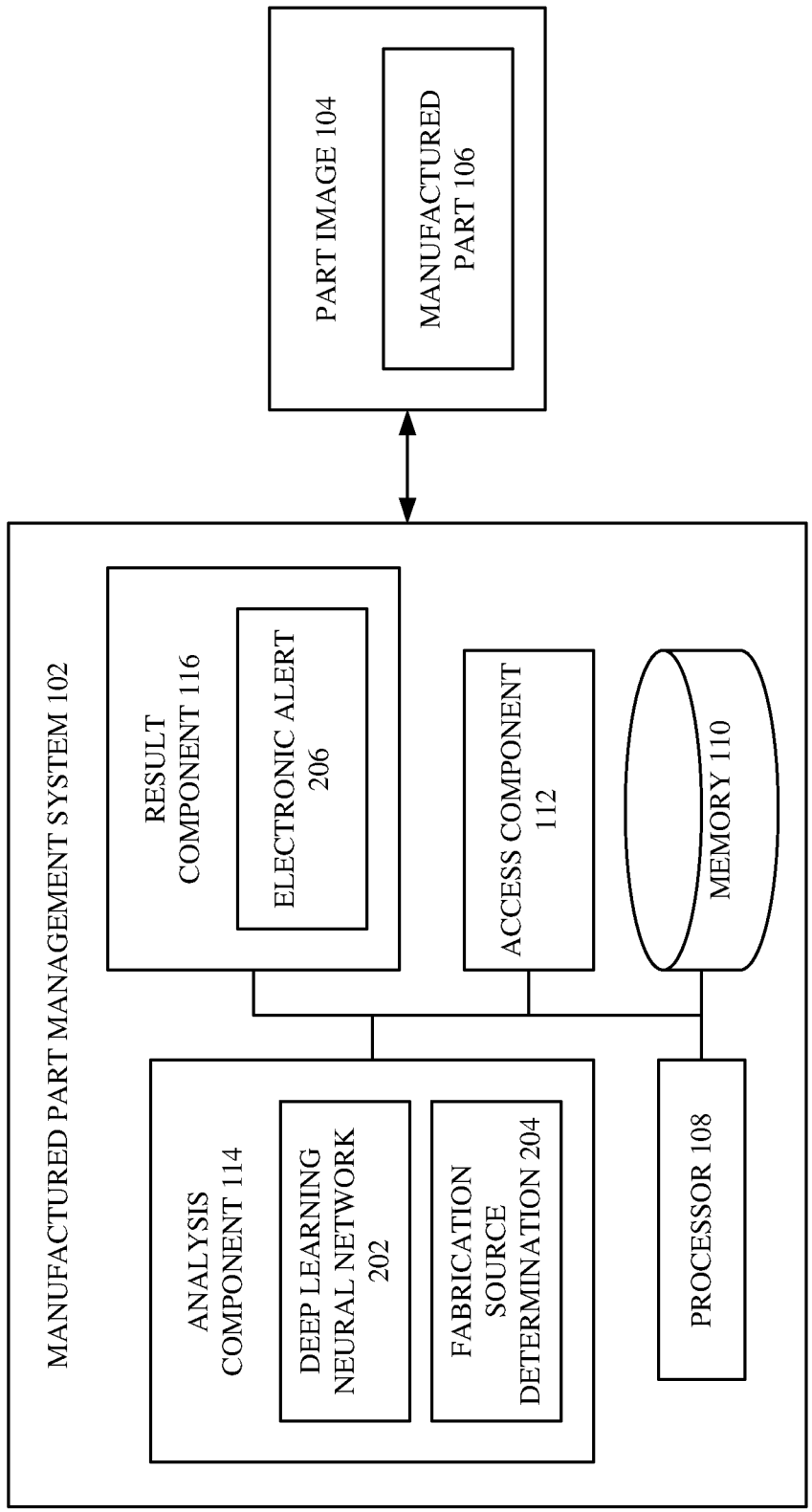
FIG. 2 illustrates a block diagram of an example, non-limiting system including a deep learning neural network, a fabrication source determination, and an electronic alert that can facilitate management or tracking of manufactured parts via deep learning in accordance with one or more embodiments described herein.

FIG. 2 illustrates a block diagram of an example, non-limiting system 200 including a deep learning neural network, a fabrication source determination, and an electronic alert that can facilitate management or tracking of manufactured parts via deep learning in accordance with one or more embodiments described herein. As shown, the system 200 can, in some cases, comprise the same components as the system 100, and can further comprise a deep learning neural network 202, a fabrication source determination 204, and an electronic alert 206.

In various embodiments, the analysis component 114 can electronically store, electronically maintain, electronically control, or otherwise electronically access the deep learning neural network 202. In various aspects, the deep learning neural network 202 can be any suitable artificial neural network that can have or otherwise exhibit any suitable internal architecture. For instance, the deep learning neural network 202 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As even another example, any of such input layer, one or more hidden layers, or output layer can be long short-term memory (LSTM) layers, whose learnable or trainable parameters can be input-state weight matrices or hidden-state weight matrices. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of its internal architecture, the deep learning neural network 202 can be configured to receive inputted images and to produce as output data pertinent to fabrication sources of whatever parts are illustrated in those inputted images. Accordingly, the analysis component 114 can, in various instances, execute the deep learning neural network 202 on the part image 104, and the analysis component 114 can leverage such execution to generate the fabrication source determination 204. In various cases, the fabrication source determination 204 can be any suitable electronic data (e.g., can be one or more scalars, one or more vectors, one or more matrices, one or more tensors, one or more character strings, or any suitable combination thereof) that indicates at least some information regarding the fabrication source of the part image 104 (e.g., regarding where or how the manufactured part 106 was fabricated).

In various aspects, the result component 116 can electronically generate the electronic alert 206, based on the fabrication source determination 204. In various instances, the electronic alert 206 can be any suitable electronic message or electronic notification that specifies, conveys, or is otherwise based on the fabrication source determination 204. In some cases, the result component 116 can electronically transmit the electronic alert 206 to any suitable computing device. In other cases, the result component 116 can electronically render the electronic alert 206 on any suitable computer display, computer screen, or computer monitor.

Various non-limiting aspects are described with respect to FIGS. 3-6.

Figure 3:
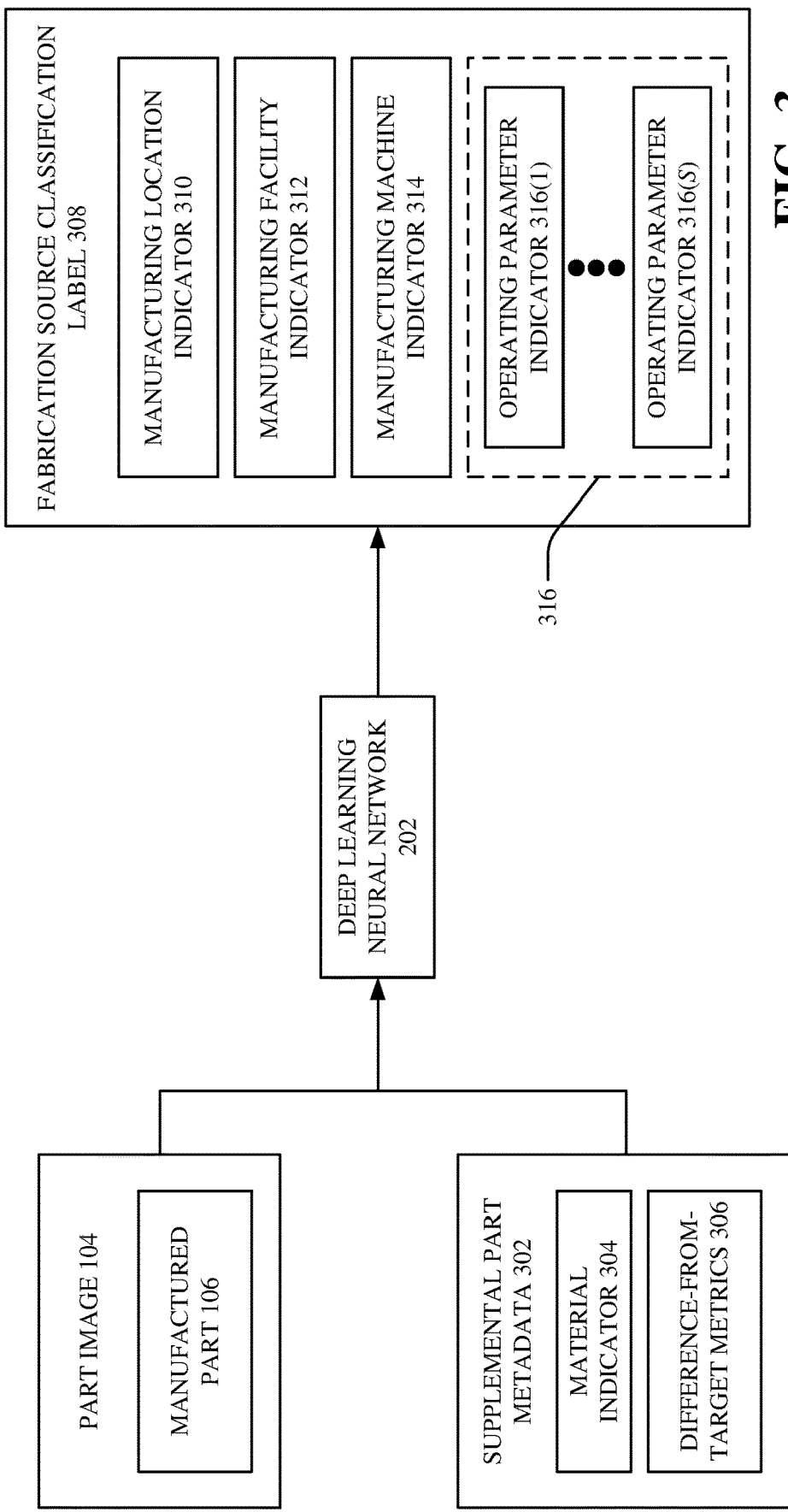
FIG. 3 illustrates an example, non-limiting block diagram showing how a deep learning neural network can be leveraged to infer fabrication sources via generation of classification labels in accordance with one or more embodiments described herein.

FIG. 3 illustrates an example, non-limiting block diagram 300 showing how the deep learning neural network 202 can be leveraged to infer fabrication sources via generation of classification labels in accordance with one or more embodiments described herein.

In various embodiments, the deep learning neural network 202 can be configured as a classifier. In such cases, the deep learning neural network 202 can be configured to receive inputted images and to produce as output classification labels explicitly indicating the fabrication sources of whatever parts are illustrated in those inputted images. Accordingly, the analysis component 114 can electronically execute the deep learning neural network 202 on the part image 104, and such execution can cause the deep learning neural network 202 to produce a fabrication source classification label 308. More specifically, the analysis component 114 can feed the part image 104 to an input layer of the deep learning neural network 202, the part image 104 can complete a forward pass through one or more hidden layers of the deep learning neural network 202, and an output layer of the deep learning neural network 202 can calculate the fabrication source classification label 308, based on activation maps or feature maps produced by the one or more hidden layers of the deep learning neural network 202.

Note that, in some aspects, the part image 104 can be accompanied by supplemental part metadata 302. In various cases, the supplemental part metadata 302 can comprise any suitable metadata that is known to correspond to the manufactured part 106. For instance, the supplemental part metadata 302 can comprise a material indicator 304. In various aspects, the material indicator 304 can be any suitable electronic data (e.g., can be one or more scalars, one or more vectors, one or more matrices, one or more tensors, one or more character strings, or any suitable combination thereof) that can indicate, convey, specify, or otherwise represent a known material composition of the manufactured part 106. As another instance, the supplemental part metadata 302 can comprise one or more difference-from-target metrics 306. In various aspects, the one or more difference-from-target metrics 306 can be any suitable electronic data (e.g., can be one or more scalars, one or more vectors, one or more matrices, one or more tensors, one or more character strings, or any suitable combination thereof) that can indicate, convey, specify, or otherwise represent known differences between actual measurements of the manufactured part 106 and target measurements of the manufactured part 106. As some non-limiting examples, the one or more difference-from-target metrics 306 can include: an absolute difference or a percentage difference between an actual length of the manufactured part 106 and a target, intended, or nominal length of the manufactured part 106; an absolute difference or a percentage difference between an actual width of the manufactured part 106 and a target, intended, or nominal width of the manufactured part 106; an absolute difference or a percentage difference between an actual height of the manufactured part 106 and a target, intended, or nominal height of the manufactured part 106; an absolute difference or a percentage difference between an actual thickness of the manufactured part 106 and a target, intended, or nominal thickness of the manufactured part 106; an absolute difference or a percentage difference between an actual radius of curvature of the manufactured part 106 and a target, intended, or nominal radius of curvature of the manufactured part 106; or an absolute difference or a percentage difference between an actual mass of the manufactured part 106 and a target, intended, or nominal mass of the manufactured part 106.

In cases where the supplemental part metadata 302 is implemented, the analysis component 114 can concatenate the part image 104 and the supplemental part metadata 302 together and can feed such concatenation to an input layer of the deep learning neural network 202; such concatenation can complete a forward pass through one or more hidden layers of the deep learning neural network 202, and an output layer of the deep learning neural network 202 can calculate the fabrication source classification label 308, based on activation maps or feature maps produced by the one or more hidden layers of the deep learning neural network 202.

In various aspects, the fabrication source classification label 308 can comprise a manufacturing location indicator 310. In various instances, the manufacturing location indicator 310 can be any suitable electronic data (e.g., can be one or more scalars, one or more vectors, one or more matrices, one or more tensors, one or more character strings, or any suitable combination thereof) that can indicate, specify, convey, or otherwise represent a geographic location (e.g., a country, a state or province, a city) in which the deep learning neural network 202 infers or predicts that the manufactured part 106 was fabricated. In various cases, the manufacturing location indicator 310 can take on one of two or more possible or defined classes that respectively correspond to two or more possible or defined geographic locations (e.g., two or more possible or defined countries, two or more possible or defined states, two or more possible or defined cities). In various aspects, the particular class indicated by the manufacturing location indicator 310 can be considered as being whichever one of those two or more possible or defined geographic locations the deep learning neural network 202 believes the manufactured part 106 was fabricated in. Indeed, the manufactured part 106 can have distinct physical or chemical attributes (e.g., subtle texture or roughness patterns, subtle structural warping patterns) that uniquely correspond to whatever geographic location from which the manufactured part 106 originates, and such distinct physical or chemical attributes can be visually manifested in the part image 104. Thus, the deep learning neural network 202 can detect such distinct physical or chemical attributes in the part image 104 and can generate the manufacturing location indicator 310 accordingly. Note that, in some cases, the manufacturing location indicator 310 can possibly be assigned an uncertain class, meaning that the deep learning neural network 202 is unsure what geographic location the manufactured part 106 was fabricated in.

In various instances, the fabrication source classification label 308 can comprise a manufacturing facility indicator 312. In various cases, the manufacturing facility indicator 312 can be any suitable electronic data (e.g., can be one or more scalars, one or more vectors, one or more matrices, one or more tensors, one or more character strings, or any suitable combination thereof) that can indicate, specify, convey, or otherwise represent a manufacturing facility (e.g., a specific factory) in which the deep learning neural network 202 infers or predicts that the manufactured part 106 was fabricated. In various aspects, the manufacturing facility indicator 312 can take on one of two or more possible or defined classes that respectively correspond to two or more possible or defined manufacturing facilities (e.g., two or more possible or defined factories). In various instances, the particular class indicated by the manufacturing facility indicator 312 can be considered as being whichever one of those two or more possible or defined manufacturing facilities the deep learning neural network 202 believes the manufactured part 106 was fabricated in. Indeed, the manufactured part 106 can have distinct physical or chemical attributes that uniquely correspond to whichever manufacturing facility from which the manufactured part 106 originates, and such distinct physical or chemical attributes can be visually manifested in the part image 104. So, the deep learning neural network 202 can detect such distinct physical or chemical attributes in the part image 104 and can generate the manufacturing facility indicator 312 accordingly. Note that, in some cases, the manufacturing facility indicator 312 can possibly be assigned an uncertain class, meaning that the deep learning neural network 202 is unsure what manufacturing facility the manufactured part 106 was fabricated in.

In various aspects, the fabrication source classification label 308 can comprise a manufacturing machine indicator 314. In various instances, the manufacturing machine indicator 314 can be any suitable electronic data (e.g., can be one or more scalars, one or more vectors, one or more matrices, one or more tensors, one or more character strings, or any suitable combination thereof) that can indicate, specify, convey, or otherwise represent a manufacturing machine (e.g., a first automated injection molder, a second automated injection molder, a first automated forger, a second automated forger, a first automated 3D printer, a second automated 3D printer) which the deep learning neural network 202 infers or predicts fabricated the manufactured part 106. In various cases, the manufacturing machine indicator 314 can take on one of two or more possible or defined classes that respectively correspond to two or more possible or defined manufacturing machines. In various aspects, the particular class indicated by the manufacturing machine indicator 314 can be considered as being whichever one of those two or more possible or defined manufacturing machines the deep learning neural network 202 believes fabricated the manufactured part 106. Indeed, the manufactured part 106 can have distinct physical or chemical attributes that uniquely correspond to whatever manufacturing machine that made the manufactured part 106, and such distinct physical or chemical attributes can be visually manifested in the part image 104. Thus, the deep learning neural network 202 can detect such distinct physical or chemical attributes in the part image 104 and can generate the manufacturing machine indicator 314 accordingly. Note that, in some cases, the manufacturing machine indicator 314 can possibly be assigned an uncertain class, meaning that the deep learning neural network 202 is unsure what manufacturing machine fabricated the manufactured part 106.

In various instances, the fabrication source classification label 308 can comprise a set of operating parameter indicators 316. In various cases, the set of operating parameter indicators 316 can comprise s indicators, for any suitable positive integer s: an operating parameter indicator 316(1) to an operating parameter indicator 316($s$). In various aspects, each of the set of operating parameter indicators 316(1) can be any suitable electronic data (e.g., can be one or more scalars, one or more vectors, one or more matrices, one or more tensors, one or more character strings, or any suitable combination thereof) that can indicate, specify, convey, or otherwise represent a value or setting of a respective operating parameter (e.g., injection speed, rotation speed, curing temperature, annealing temperature, pressurization time, holding time, opening speed, closing speed, applied voltage, applied current) that the deep learning neural network 202 infers or predicts was utilized to fabricate the manufactured part 106. As a non-limiting example, the operating parameter indicator 316(1) can indicate what specific value or setting (e.g., from two or more possible or defined values or settings) the deep learning neural network 202 believes that a first operating parameter (e.g., injection speed) of a manufacturing machine was set to in order to fabricate the manufactured part 106. As another non-limiting example, the operating parameter indicator 316($s$) can indicate what specific value or setting (e.g., from two or more possible or defined values or settings) the deep learning neural network 202 believes that an s-th operating parameter (e.g., curing temperature) of a manufacturing machine was set to in order to fabricate the manufactured part 106. Indeed, the manufactured part 106 can have distinct physical or chemical attributes that uniquely correspond to whatever operating parameters were used to fabricate the manufactured part 106, and such distinct physical or chemical attributes can be visually manifested in the part image 104. Therefore, the deep learning neural network 202 can detect such distinct physical or chemical attributes in the part image 104 and can generate the set of operating parameter indicators 316 accordingly. Note that, in some cases, any of the set of operating parameter indicators 316 can possibly be assigned an uncertain class, meaning that the deep learning neural network 202 is unsure what specific operating parameter value or setting was used to fabricate the manufactured part 106.

In any case, the fabrication source classification label 308 can be considered as explicitly specifying the predicted or inferred fabrication source of the manufactured part 106 (e.g., as explicitly specifying where or how the manufactured part 106 was fabricated). In various aspects, the electronic alert 206 can comprise any or all of the fabrication source classification label 308.

Figure 4:
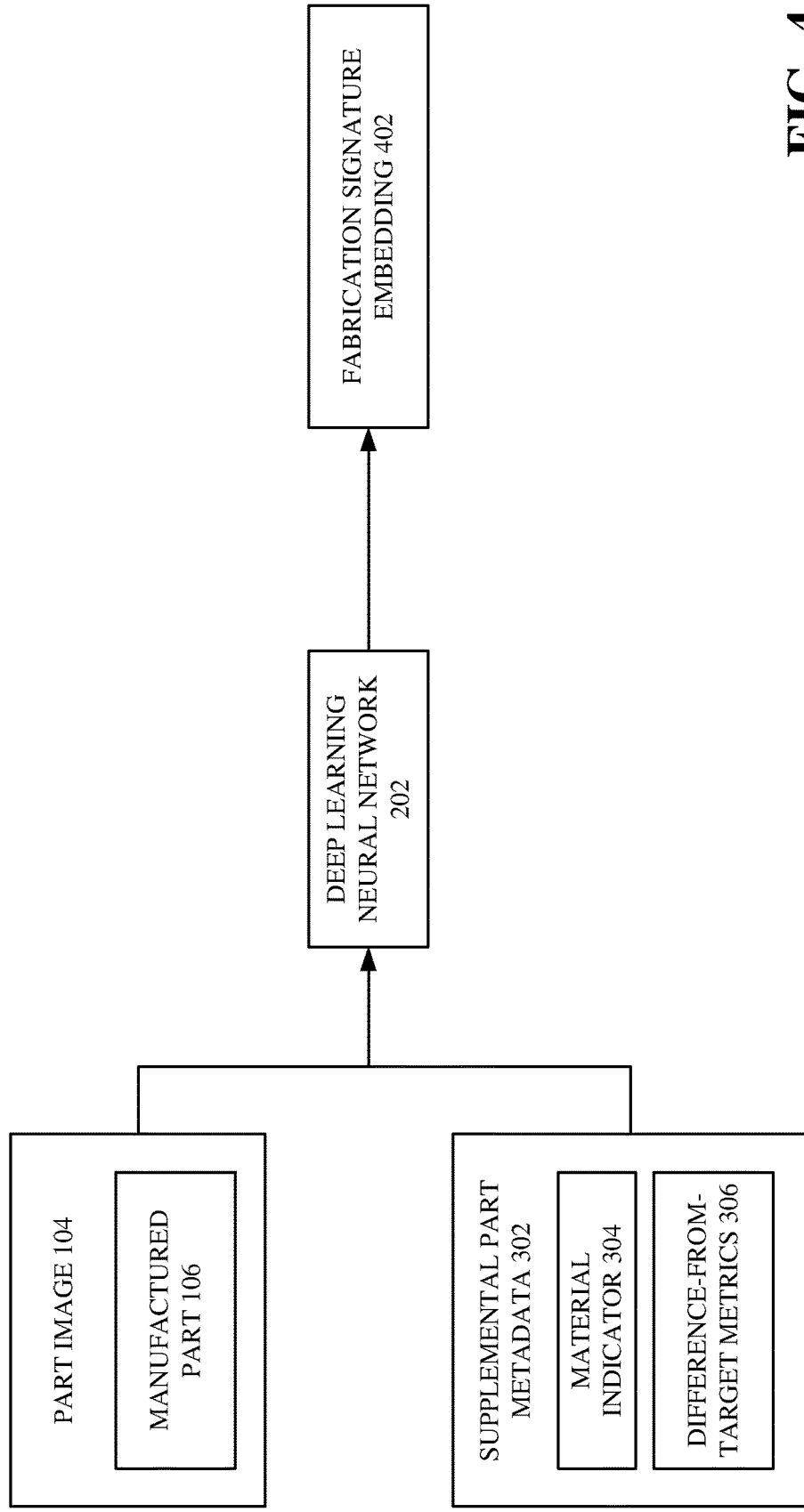
FIGS. 4-6 illustrate example, non-limiting block diagrams showing how a deep learning neural network can be leveraged to infer fabrication sources via generation of fabrication signature embeddings in accordance with one or more embodiments described herein.
Figure 5:
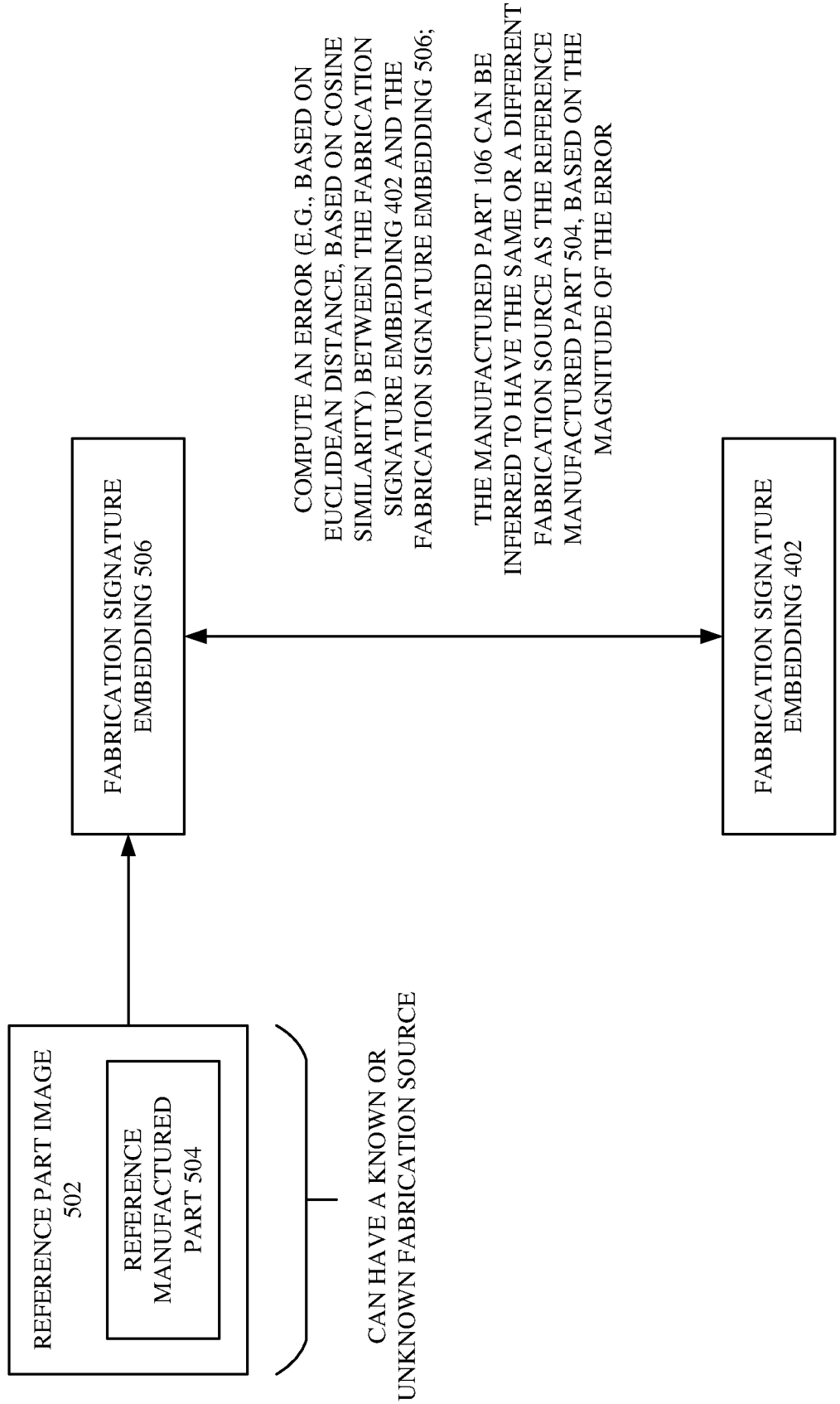
Figure 6:
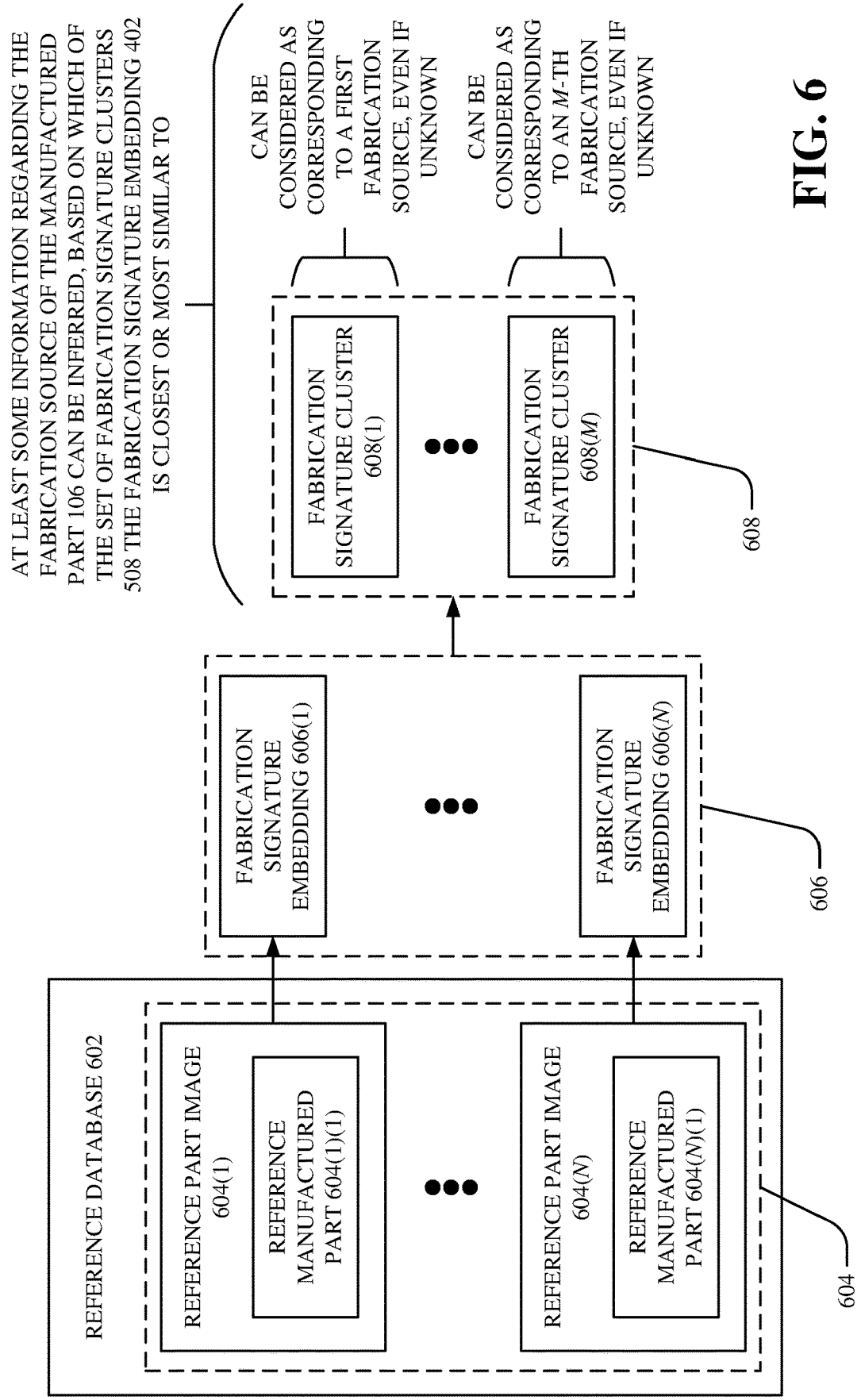

Now, consider FIGS. 4-6. FIGS. 4-6 illustrate example, non-limiting block diagrams 400, 500, and 600 showing how the deep learning neural network 202 can be leveraged to infer fabrication sources via generation of fabrication signature embeddings in accordance with one or more embodiments described herein.

First, consider FIG. 4. In various embodiments, rather than being configured as a classifier, the deep learning neural network 202 can instead be configured as an encoder. In such cases, the deep learning neural network 202 can be configured to receive inputted images and to produce as output embeddings that implicitly (as opposed to explicitly) capture or represent the fabrication sources of whatever parts are illustrated in those inputted images. Accordingly, the analysis component 114 can electronically execute the deep learning neural network 202 on the part image 104 (concatenated with the supplemental part metadata 302, if applicable), and such execution can cause the deep learning neural network 202 to produce a fabrication signature embedding 402. More specifically, the analysis component 114 can feed the part image 104 (concatenated with the supplemental part metadata 302, if applicable) to an input layer of the deep learning neural network 202, the part image 104 (concatenated with the supplemental part metadata 302, if applicable) can complete a forward pass through one or more hidden layers of the deep learning neural network 202, and an output layer of the deep learning neural network 202 can calculate the fabrication signature embedding 402, based on activation maps or feature maps produced by the one or more hidden layers of the deep learning neural network 202.

In various aspects, the fabrication signature embedding 402 can be one or more scalars, one or more vectors, one or more matrices, one or more tensors, or any suitable combination thereof that can have a smaller dimensionality (e.g., in some cases, one or more orders of magnitude smaller) than the part image 104 but that can nevertheless capture or represent whatever unique or distinct physical or chemical attributes of the manufactured part 106 are visually manifested in the part image 104. For instance, suppose that the part image 104 comprises tens of thousands, hundreds of thousands, or even millions of pixels or voxels. In such case, the fabrication signature embedding 402 can, in contrast, be a vector having merely tens, dozens, or hundreds of numerical elements. In any case, despite such reduced dimensionality, the fabrication signature embedding 402 can nevertheless represent, convey, or otherwise capture (e.g., albeit in an obscure, hidden, or not readily-apparent fashion) at least some of whatever substantive content (e.g., the unique or distinct physical or chemical attributes of the manufactured part 106) is illustrated in the part image 104. In other words, the fabrication signature embedding 402 can be considered as a latent vector representation of the part image 104.

In various aspects, the fabrication signature embedding 402 can, by itself, not convey the fabrication source of the manufactured part 106 (e.g., the fabrication signature embedding 402 can be a latent, and thus not readily interpretable, representation of the unique physical or chemical attributes of the manufactured part 106). However, the analysis component 114 can nevertheless leverage the fabrication signature embedding 402 to determine, estimate, or infer information regarding the fabrication source of the manufactured part 106. Indeed, in some cases, the analysis component 114 can determine or estimate information about the fabrication source of the manufactured part 106, by comparing the fabrication signature embedding 402 to that of a reference part, as described with respect to FIG. 5. In other cases, the analysis component 114 can determine or estimate information about the fabrication source of the manufactured part 106, by comparing the fabrication signature embedding 402 to those of a multitude of reference parts, as described with respect to FIG. 6.

Consider FIG. 5. In various embodiments, there can be a reference part image 502. In various aspects, the reference part image 502 can have the same format, size, or dimensionality as the part image 104 (e.g., if the part image 104 is an x-by-y pixel array, the reference part image 502 can likewise be an x-by-y pixel array; if the part image 104 is an x-by-y-by-z voxel array, the reference part image 502 can likewise be an x-by-y-by-z voxel array). In various instances, the reference part image 502 can depict or illustrate a reference manufactured part 504, where the reference manufactured part 504 can be any suitable part that can exhibit any suitable shape, any suitable dimensions, or any suitable material composition. In some cases, the reference manufactured part 504 can have a known fabrication source (e.g., it can be known specifically where or specifically how the reference manufactured part 504 was fabricated). In other cases, however, the reference manufactured part 504 can have an unknown fabrication source (e.g., it can be not known specifically where or specifically how the reference manufactured part 504 was fabricated).

In various aspects, the analysis component 114 can execute the deep learning neural network 202 on the reference part image 502 (as well as on any supplemental metadata pertaining to the reference manufactured part 504, if applicable), and such execution can cause the deep learning neural network 202 to produce a fabrication signature embedding 506. In various instances, the fabrication signature embedding 506 can have the same format, size, or dimensionality as the fabrication signature embedding 402, and the fabrication signature embedding 506 can be considered as implicitly capturing or representing whatever unique or distinct physical or chemical attributes of the reference manufactured part 504 are visually manifested in the reference part image 502.

In various cases, the analysis component 114 can electronically computer an error between the fabrication signature embedding 506 and the fabrication signature embedding 402. As a non-limiting example, the error can be equal to or otherwise based on a Euclidean distance between the fabrication signature embedding 506 and the fabrication signature embedding 402. As another non-limiting example, the error can be equal to or otherwise based on a complement or reciprocal of a cosine similarity between the fabrication signature embedding 506 and the fabrication signature embedding 402. As yet another non-limiting example, the error can be equal to or otherwise based on a mean absolute error (MAE) between the fabrication signature embedding 506 and the fabrication signature embedding 402. As still another non-limiting example, the error can be equal to or otherwise based on a mean squared error (MSE) between the fabrication signature embedding 506 and the fabrication signature embedding 402. As even another non-limiting example, the error can be equal to or otherwise based on a cross-entropy error between the fabrication signature embedding 506 and the fabrication signature embedding 402. In any case, the magnitude of the error can be considered as indicating how similar or dissimilar the fabrication signature embedding 402 is to the fabrication signature embedding 506. In other words, the magnitude of the error can be considered as indicating how similar or how dissimilar the unique physical or chemical attributes of the manufactured part 106 are to those of the reference manufactured part 504. In still other words, the magnitude of the error can be considered as indicating how similar or how dissimilar the fabrication source of the manufactured part 106 is to that of the reference manufactured part 504.

As a non-limiting example, suppose that the error is above any suitable threshold margin. In such case, the analysis component 114 can conclude that the manufactured part 106 has a different or unrelated fabrication source (e.g., made in different geographic location, made in different manufacturing facility, made by different manufacturing machine, made via different operating parameter settings) than the reference manufactured part 504.

In contrast, suppose that the error is instead below any suitable threshold margin. In such case, the analysis component 114 can conclude that the manufactured part 106 has a same, similar, or otherwise related fabrication source (e.g., made in same or similar geographic location, made in same or similar manufacturing facility, made by same or similar manufacturing machine, made via same or similar operating parameter settings) as the reference manufactured part 504. Note that, if the reference manufactured part 504 has a known fabrication source, then the error being below the threshold margin can be considered as directly identifying the fabrication source of the manufactured part 106. However, note that, even if the reference manufactured part 504 has an unknown fabrication source, the error being below the threshold margin can nevertheless be considered as providing useful information regarding the fabrication source of the manufactured part 106. Indeed, if the reference manufactured part 504 is known to be of acceptable build quality, and if the error is below the threshold margin, then the analysis component 114 can conclude that the manufactured part 106 is likely to also be of acceptable build quality (e.g., after all, the error being below the threshold margin can indicate that the manufactured part 106 has the same or similar fabrication source as the reference manufactured part 504). Conversely, if the reference manufactured part 504 is known to be of unacceptable build quality, and if the error is below the threshold margin, then the analysis component 114 can conclude that the manufactured part 106 is likely to also be of unacceptable build quality.

Now, consider FIG. 6. In various embodiments, there can be a reference database 602. In various aspects, the reference database 602 can comprise a set of reference part images 604. In various instances, the set of reference part images 604 can comprise n images, for any suitable positive integer n: a reference part image 604(1) to a reference part image 604(n). In various cases, each of the set of reference part images 604 can depict or illustrate (entirely or less than entirely) a respective reference manufactured part. As a non-limiting example, the reference part image 604(1) can depict or illustrate a reference manufactured part 604(1)(1). As another non-limiting example, the reference part image 604(n) can depict or illustrate a reference manufactured part 604(n)(1).

In various aspects, the analysis component 114 can execute the deep learning neural network 202 on each of the set of reference part images 604, thereby yielding a set of fabrication signature embeddings 606. For instance, the analysis component 114 can execute the deep learning neural network 202 on the reference part image 604(1), which can cause the deep learning neural network 202 to produce a fabrication signature embedding 606(1), where the fabrication signature embedding 606(1) can implicitly capture or represent how or where the reference manufactured part 604(1)(1) was fabricated. Likewise, the analysis component 114 can execute the deep learning neural network 202 on the reference part image 604(n), which can cause the deep learning neural network 202 to produce a fabrication signature embedding 606(n), where the fabrication signature embedding 606(n) can implicitly capture or represent how or where the reference manufactured part 604(n)(1) was fabricated.

Now, in various aspects, the analysis component 114 can apply any suitable clustering techniques to the set of fabrication signature embeddings 606, thereby yielding a set of fabrication signature clusters 608. As a non-limiting example, the analysis component 114 can apply any suitable centroid-based clustering technique (e.g., k-means clustering) to the set of fabrication signature embeddings 606 to produce the set of fabrication signature clusters 608. As another non-limiting example, the analysis component 114 can apply any suitable density-based clustering technique (e.g., density-based spatial clustering of applications with noise (DBSCAN)) to the set of fabrication signature embeddings 606 to produce the set of fabrication signature clusters 608. As still another non-limiting example, the analysis component 114 can apply any suitable distribution-based clustering technique (e.g., Gaussian mixture modeling) to the set of fabrication signature embeddings 606 to produce the set of fabrication signature clusters 608. As even another non-limiting example, the analysis component 114 can apply any suitable hierarchical-based clustering technique (e.g., hierarchical agglomerative clustering (HAC)) to the set of fabrication signature embeddings 606 to produce the set of fabrication signature clusters 608.

In various instances, the set of fabrication signature clusters 608 can comprise m clusters, for any suitable positive integer m<n: a fabrication signature cluster 608(1) to a fabrication signature cluster 608(m). In various cases, each of the set of fabrication signature clusters 608 can be considered as implicitly representing or corresponding to a respective fabrication source (e.g., a respective geographic location, a respective manufacturing factory, a respective manufacturing machine, one or more respective operating parameter settings). As a non-limiting example, the fabrication signature cluster 608(1) can be considered as corresponding to a first fabrication source, whether known or unknown. In other words, whatever reference manufactured parts whose fabrication signature embeddings belong to the fabrication signature cluster 608(1) can be considered as having been made in or according to the same fabrication source as each other. As another non-limiting example, the fabrication signature cluster 608(m) can be considered as corresponding to an m-th fabrication source, whether known or unknown. So, whatever reference manufactured parts whose fabrication signature embeddings belong to the fabrication signature cluster 608(m) can be considered as having been made in or according to the same fabrication source as each other.

In various aspects, the analysis component 114 can infer or estimate at least some information regarding the fabrication source of the manufactured part 106, by comparing (e.g., via Euclidean distance, via cosine similarity, via MAE, via MSE, via cross-entropy) the fabrication signature embedding 402 to the set of fabrication signature clusters 608. In particular, the analysis component 114 can identify which of the set of fabrication signature clusters 608 the fabrication signature embedding 402 is closest or most similar to, and the analysis component 114 can accordingly conclude that the manufactured part 106 has the same or similar fabrication source as whatever reference manufactured parts whose fabrication signature embeddings belong to that identified cluster.

Accordingly, regardless of whether the deep learning neural network 202 is configured as a classifier or instead as an encoder, the analysis component 114 can generate the fabrication source determination 204, based on executing the deep learning neural network 202 on the part image 104.

Now, various embodiments described herein can be implemented in any suitable use-case scenarios, non-limiting examples of which are described with respect to FIGS. 7-20.

Figure 7:
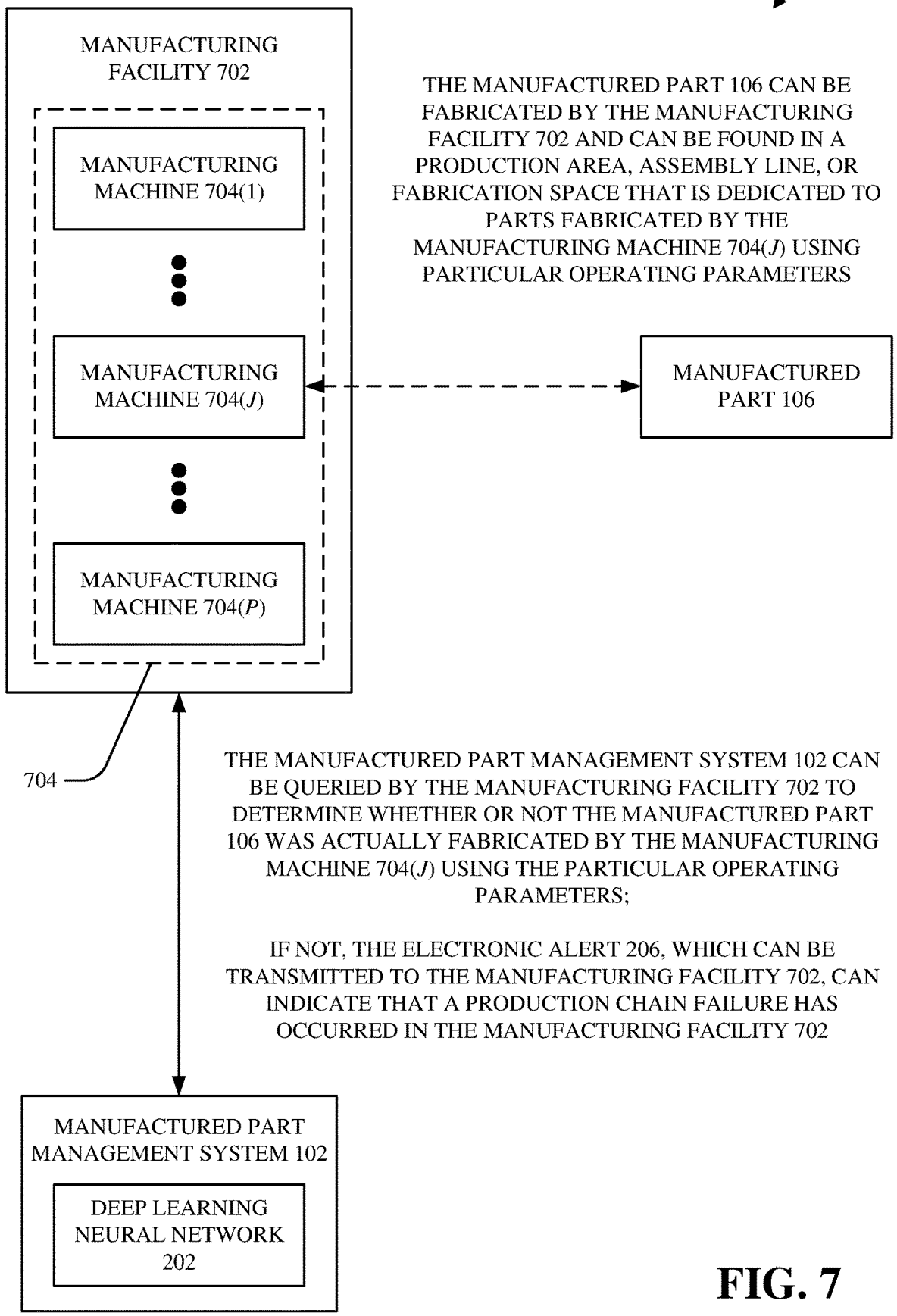
FIG. 7 illustrates an example, non-limiting block diagram showing how various embodiments described herein can be implemented manufacturing-side to detect production chain failures.

FIG. 7 illustrates an example, non-limiting block diagram 700 showing how various embodiments described herein can be implemented manufacturing-side to detect production chain failures.

In various embodiments, there can be a manufacturing facility 702. In various aspects, the manufacturing facility 702 can be any industrial factory that can comprise a plurality of manufacturing machines 704. In various instances, the plurality of manufacturing machines 704 can comprise p machines, for any suitable positive integer p: a manufacturing machine 704(1) to a manufacturing machine 704(p). In various cases, any of the plurality of manufacturing machines 704 can be any suitable type of automated equipment that can fabricate any suitable parts. As some non-limiting examples, any of the plurality of manufacturing machines 704 can be: an automated 3D printer; an automated computer numerically controlled machining device; an automated injection molder; an automated rotational molder; an automated caster; an automated extruder; an automated forger; an automated stamper; an automated vacuum former;

an automated bender; an automated cutter; an automated polisher; an automated brazer; an automated miller; an automated grinder; an automated broacher; an automated welder; an automated riveter; an automated painter; an automated dyer; an automated weaver; an automated braider; an automated gluer; an automated annealer; an automated heat treater; or an automated chemical treater.

In various aspects, the manufactured part management system 102 can be owned by, operated by, or otherwise associated with the manufacturing facility 702. Accordingly, the manufactured part management system 102 can be leveraged to perform production checking or quality assurance for the manufacturing facility 702.

For instance, suppose that the manufactured part 106 is known to have been fabricated by the manufacturing facility 702. Furthermore, suppose that the manufactured part 106 is expected or believed to have been fabricated by a manufacturing machine 704(j) using one or more particular operating parameters (e.g., using a particular injection speed, using a particular curing temperature), for any suitable positive integer j≤p. As a non-limiting example, the manufactured part 106 can be found in a production area, assembly line, or fabrication space of the manufacturing facility 702 that is dedicated to parts fabricated by the manufacturing machine 704(j) using the one or more particular operating parameters.

In various cases, the manufactured part management system 102 can be leveraged to determine whether or not the manufactured part 106 really was fabricated by the manufacturing machine 704(j) using the particular operating parameters. In situations where the deep learning neural network 202 is configured as a classifier, the fabrication source classification label 308 can directly or explicitly indicate (e.g., via the manufacturing machine indicator 314 and the set of operating parameter indicators 316) whether or not the manufactured part 106 was actually fabricated by the manufacturing machine 704(j) using the one or more particular operating parameters. In other situations where the deep learning neural network 202 is instead configured as an encoder, the fabrication signature embedding 402 can be compared to one or more fabrication signature embeddings of reference manufactured parts that are known to have been fabricated by the manufacturing machine 704(j) using the one or more particular operating parameters, and the degree of similarity or dissimilarity between the fabrication signature embedding 402 and those one or more other embeddings can indicate whether or not the manufactured part 106 was fabricated by the manufacturing machine 704(*j*) using the one or more particular operating parameters.

If the manufactured part management system 102 (e.g., via the analysis component 114) determines that the manufactured part 106 was indeed fabricated by the manufacturing machine 704(*j*) using the one or more particular operating parameters, the electronic alert 206, which can be transmitted to any suitable computing device of the manufacturing facility 702, can indicate that the manufactured part 106 was fabricated as expected and that the manufacturing facility 702 has thus not experienced a production chain failure (e.g., has not experienced part mixing).

In contrast, if the manufactured part management system 102 (e.g., via the analysis component 114) determines that the manufactured part 106 was not fabricated by the manufacturing machine 704(*j*) using the one or more particular operating parameters, the electronic alert 206 can indicate that the manufactured part 106 was not fabricated as expected and that the manufacturing facility 702 has thus experienced a production chain failure (e.g., has experienced part mixing).

Figure 8:
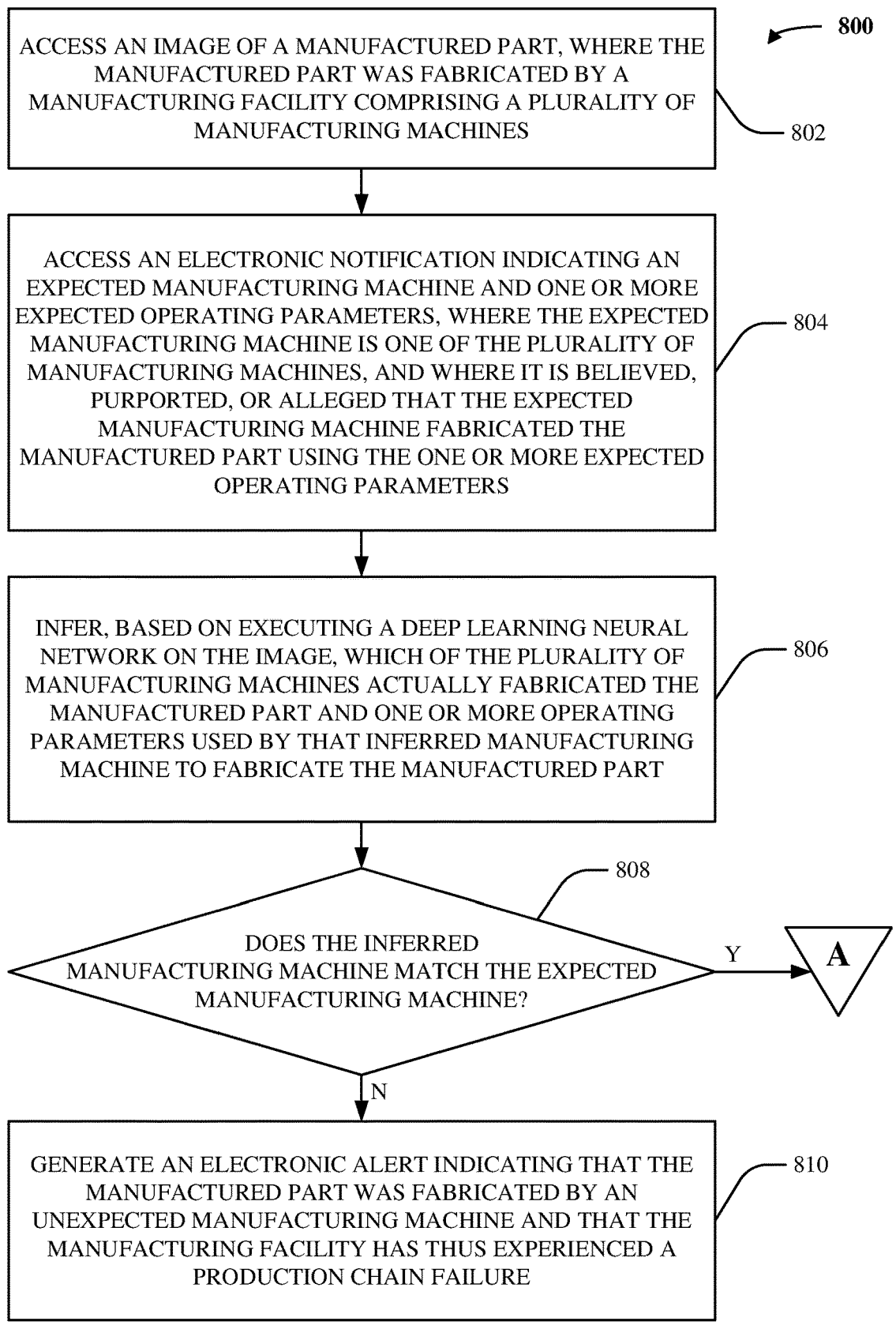
FIGS. 8-9 illustrate flow diagrams of example, non-limiting computer-implemented methods that can facilitate manufacturing-side detection of production chain failures.
Figure 9:
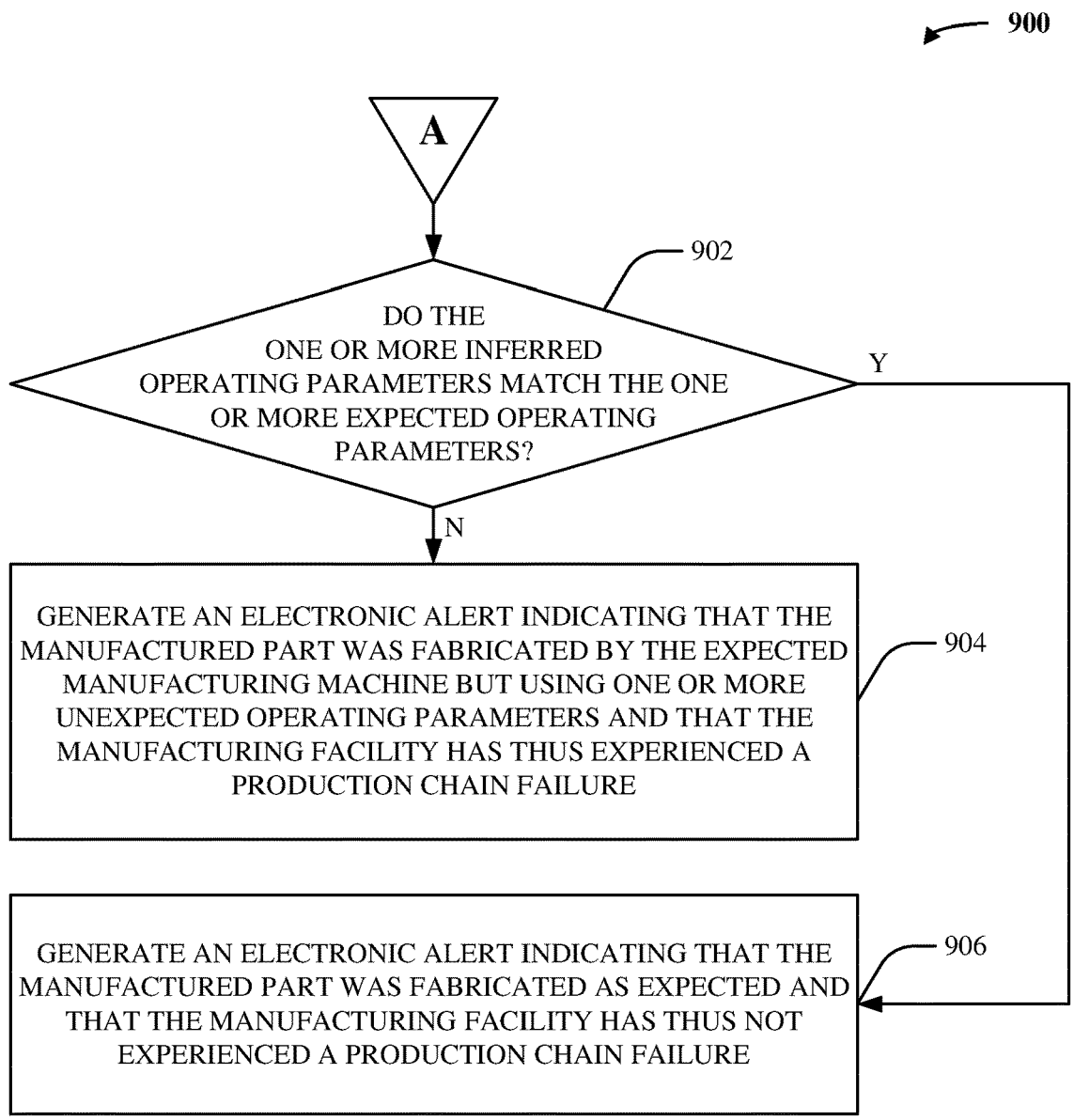

FIGS. 8-9 illustrate flow diagrams of example, non-limiting computer-implemented methods 800 and 900 that can facilitate manufacturing-side detection of production chain failures. In various cases, the manufactured part management system 102 can facilitate the computer-implemented methods 800 or 900.

First, consider FIG. 8. In various embodiments, act 802 can include accessing, by a device (e.g., via 112) operatively coupled to a processor (e.g., 108), an image (e.g., 104) of a manufactured part (e.g., 106). In various cases, the manufactured part can be or can have been fabricated by a manufacturing facility (e.g., 702) comprising a plurality of manufacturing machines (e.g., 704).

In various aspects, act 804 can include accessing, by the device (e.g., via 112), an electronic notification (e.g., provided by a computing device of 702) indicating an expected manufacturing machine (e.g., 704(*j*)) and one or more expected operating parameters. In various cases, the expected manufacturing machine can be one of the plurality of manufacturing machines, and it can be believed, asserted, purported, or otherwise alleged that the expected manufacturing machine fabricated the manufactured part using the one or more expected operating parameters.

In various instances, act 806 can include inferring, by the device (e.g., via 114) and based on executing a deep learning neural network (e.g., 202) on the image, which of the plurality of manufacturing machines actually fabricated the manufactured part (e.g., indicated by 314) and one or more operating parameters used by that inferred manufacturing machine to fabricate the manufactured part (e.g., indicated by 316).

In various cases, act 808 can include determining, by the device (e.g., via 114), whether the inferred manufacturing machine matches (e.g., is the same as) the expected manufacturing machine. If not, the computer-implemented method 800 can proceed to act 810. If so, the computer-implemented method 800 can instead proceed to act 902 of the computer-implemented method 900.

In various aspects, act 810 can include generating, by the device (e.g., via 116), an electronic alert (e.g., 206) indicating that the manufactured part was fabricated by an unexpected manufacturing machine and that the manufacturing facility has thus experienced a production chain failure.

Now, consider FIG. 9. In various embodiments, act 902 can include determining, by the device (e.g., via 114), whether the one or more inferred operating parameters match the one or more expected operating parameters. If not, the computer-implemented method 900 can proceed to act 904. If so, the computer-implemented method 900 can instead proceed to act 906.

In various aspects, act 904 can include generating, by the device (e.g., via 116), an electronic alert (e.g., 206) indicating that the manufactured part was fabricated by the expected manufacturing machine but using one or more unexpected operating parameters and that the manufacturing facility has thus experienced a production chain failure.

In various instances, act 906 can include generating, by the device (e.g., via 116), an electronic alert (e.g., 206) indicating that the manufactured part was fabricated as expected and that the manufacturing facility has thus not experienced a production chain failure.

Figure 10:
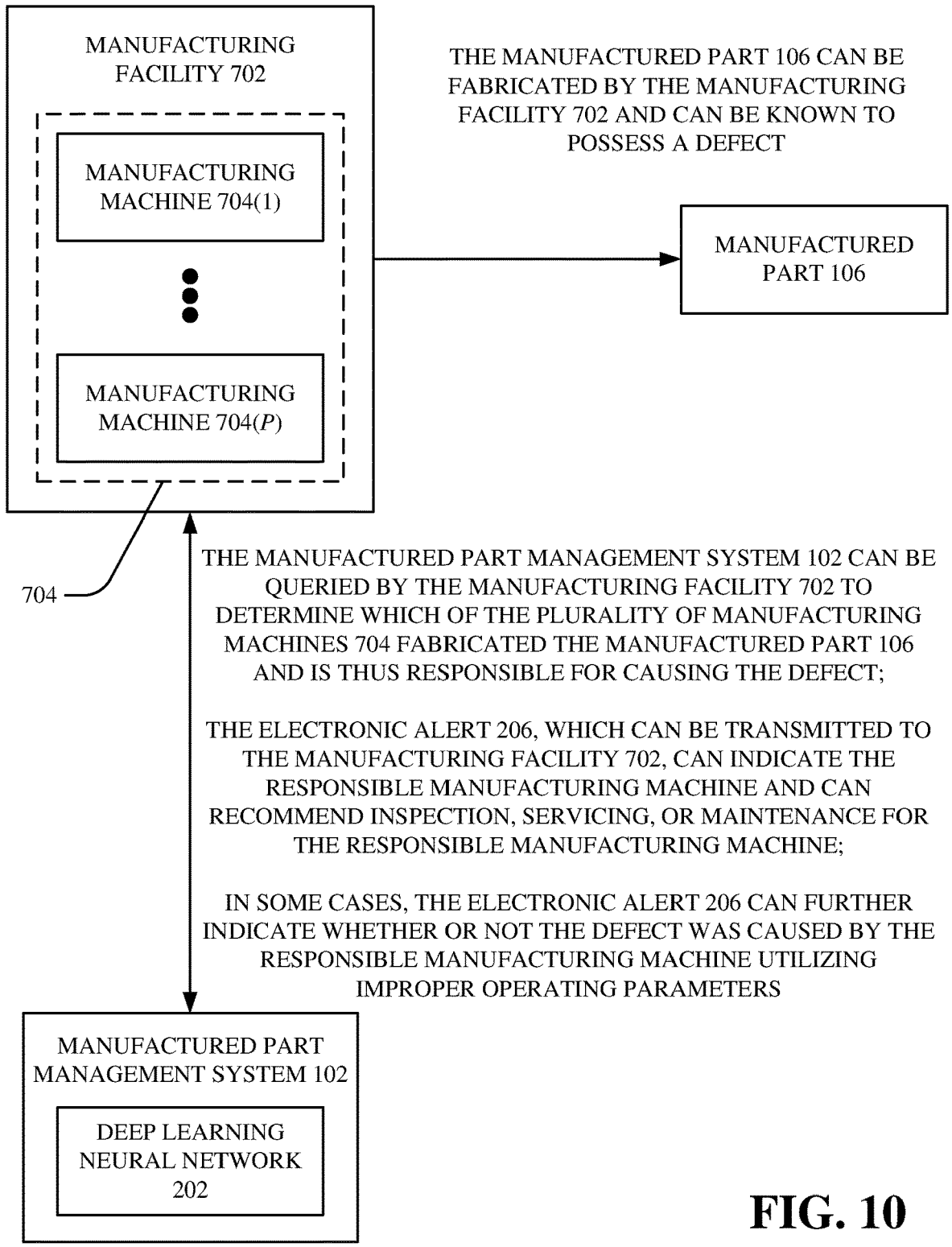
FIG. 10 illustrates an example, non-limiting block diagram showing how various embodiments described herein can be implemented manufacturing-side to identify machines responsible for fabricating defective parts.

FIG. 10 illustrates an example, non-limiting block diagram 1000 showing how various embodiments described herein can be implemented manufacturing-side to identify machines responsible for fabricating defective parts.

In various aspects, as mentioned above, the manufacturing facility 702 can comprise the plurality of manufacturing machines 704, and the manufactured part management system 102 can be owned by, operated by, or otherwise associated with the manufacturing facility 702. Accordingly, in various instances, the manufactured part management system 102 can be leveraged to identify malfunctioning manufacturing machines for the manufacturing facility 702.

For instance, suppose that the manufactured part 106 is known to have been fabricated by the manufacturing facility 702. Furthermore, suppose that the manufactured part 106 is known to possess a defect. As a non-limiting example, the manufactured part 106 can have or exhibit a crack that it is not supposed or designed to have. As another non-limiting example, the manufactured part 106 can have or exhibit a gouge that it is not supposed or designed to have. As yet another non-limiting example, the manufactured part 106 can have or exhibit a region of excessive material build-up. As even another non-limiting example, the manufactured part 106 can have or exhibit a region with insufficient material build-up.

In various cases, the manufactured part management system 102 can be leveraged to determine which one of the plurality of manufacturing machines 704 fabricated the manufactured part 106 and thus is responsible for creating the defect. In situations where the deep learning neural network 202 is configured as a classifier, the fabrication source classification label 308 can directly or explicitly indicate (e.g., via the manufacturing machine indicator 314) which of the plurality of manufacturing machines 704 actually fabricated the manufactured part 106. In other situations where the deep learning neural network 202 is instead configured as an encoder, the fabrication signature embedding 402 can be compared to fabrication signature embeddings of reference manufactured parts that are known to have been fabricated by respective ones of the plurality of manufacturing machines 704, and the degrees of similarity or dissimilarity between the fabrication signature embedding 402 and those other embeddings can indicate which one of the plurality of manufacturing machines 704 actually fabricated the manufactured part 106.

In various cases, the electronic alert 206, which can be transmitted to any suitable computing device of the manufacturing facility 702, can indicate the identified one of the plurality of manufacturing machines 704 that fabricated the manufactured part 106, and such identified manufacturing machine can be considered as being responsible for creating the defect. Accordingly, in various aspects, the electronic alert 206 can recommend or suggest that the identified/ responsible manufacturing machine undergo inspection, servicing, or maintenance.

In some instances, the manufactured part management system 102 can identify not just the responsible manufacturing machine, but can also identify (e.g., via 316) one or more operating parameters utilized by the responsible manufacturing machine to fabricate the manufactured part 106. If those one or more identified operating parameters are not as expected, the electronic alert 206 can further indicate that the responsible manufacturing machine likely created the defect by implementing improper operating parameters.

Figure 11:
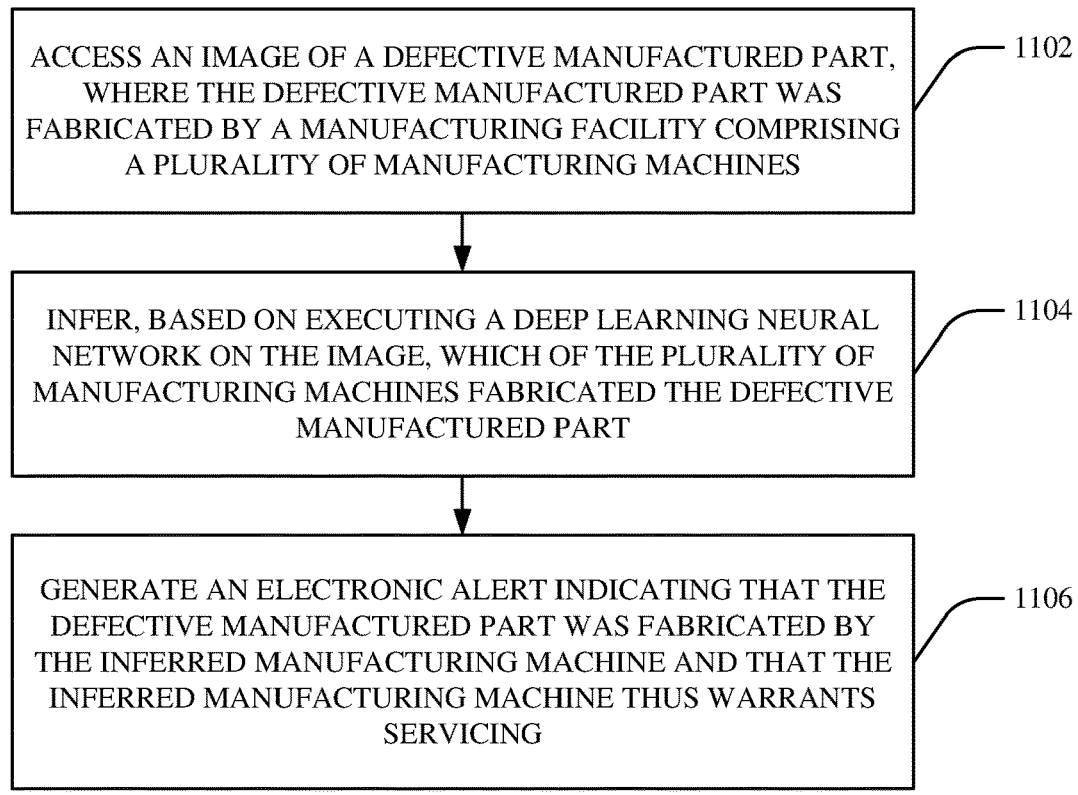
FIGS. 11-12 illustrate flow diagrams of example, non-limiting computer-implemented methods that can facilitate manufacturing-side identification of machines responsible for fabricating defective parts.
Figure 12:
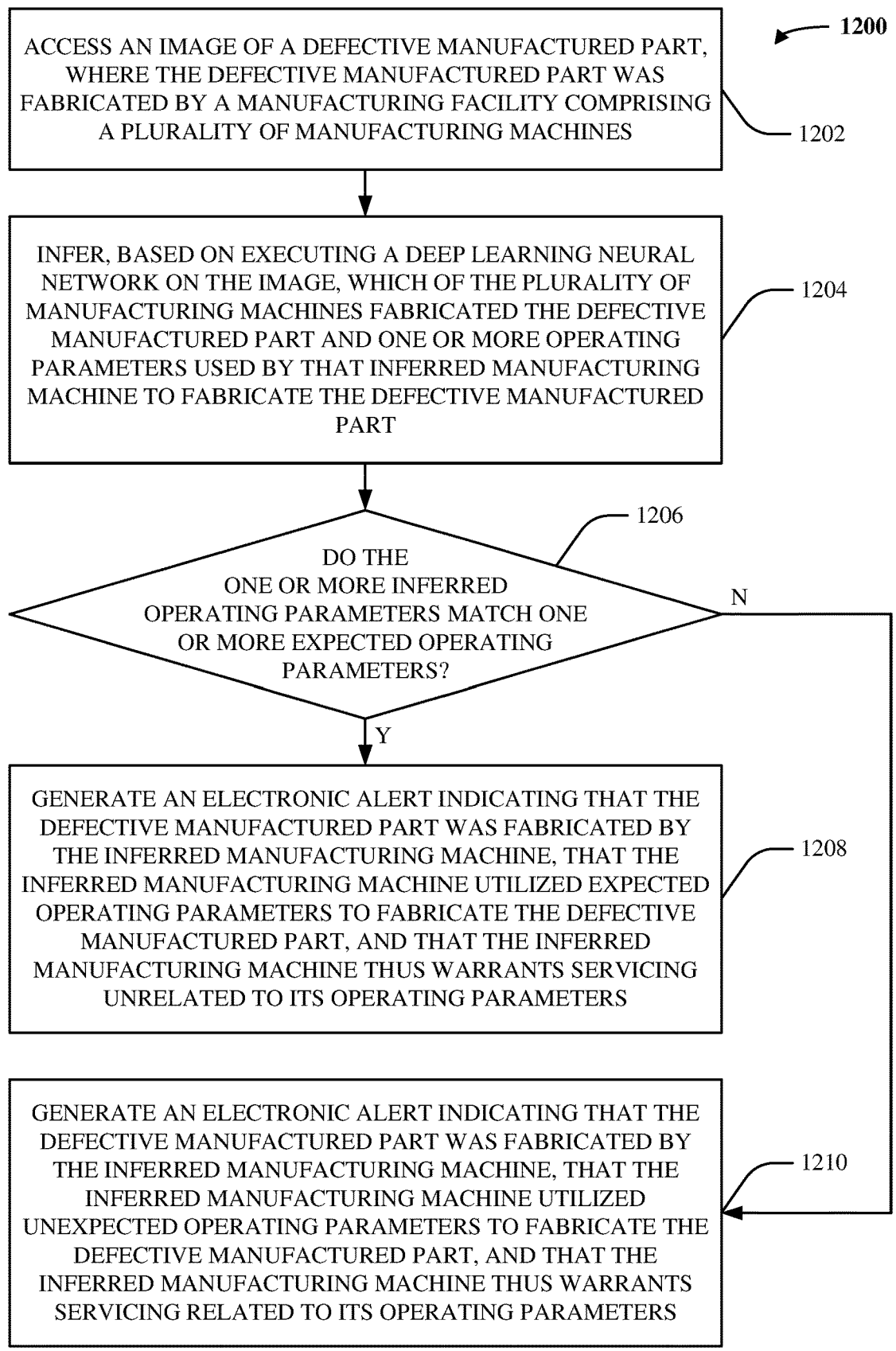

FIGS. 11-12 illustrate flow diagrams of example, non-limiting computer-implemented methods 1100 and 1200 that can facilitate manufacturing-side identification of machines responsible for fabricating defective parts. In various cases, the manufactured part management system 102 can facilitate the computer-implemented method 1100 or 1200.

First, consider FIG. 11. In various embodiments, act 1102 can include accessing, by a device (e.g., via 112) operatively coupled to a processor (e.g., 108), an image (e.g., 104) of a defective manufactured part (e.g., 106). In various cases, the defective manufactured part can be or can have been fabricated by a manufacturing facility (e.g., 702) comprising a plurality of manufacturing machines (e.g., 704).

In various aspects, act 1104 can include inferring, by the device (e.g., via 114) and based on executing a deep learning neural network (e.g., 202) on the image, which of the plurality of manufacturing machines fabricated the defective manufactured part (e.g., can be indicated by 314 or derived from 402).

In various instances, act 1106 can include generating, by the device (e.g., via 116), an electronic alert (e.g., 206) indicating that the defective manufactured part was fabricated by the inferred manufacturing machine and that the inferred manufacturing machine thus warrants servicing or repair.

Now, consider FIG. 12. In various embodiments, act 1202 can include accessing, by a device (e.g., via 112) operatively coupled to a processor (e.g., 108), an image (e.g., 104) of a defective manufactured part (e.g., 106). In various cases, the defective manufactured part can be or can have been fabricated by a manufacturing facility (e.g., 702) comprising a plurality of manufacturing machines (e.g., 704).

In various aspects, act 1204 can include inferring, by the device (e.g., via 114) and based on executing a deep learning neural network (e.g., 202) on the image, which of the plurality of manufacturing machines fabricated the defective manufactured part (e.g., can be indicated by 314) and one or more operating parameters used by that inferred manufacturing machine to fabricate the manufactured part (e.g., can be indicated by 316).

In various instances, act 1206 can include determining, by the device (e.g., via 114), whether the one or more inferred operating parameters match one or more expected operating parameters. If so, the computer-implemented method 1200 can proceed to act 1208. If not, the computer-implemented method 1200 can instead proceed to act 1210.

In various cases, act 1208 can include generating, by the device (e.g., via 116), an electronic alert (e.g., 206) indicating that the defective manufactured part was fabricated by the inferred manufacturing machine, that the inferred manufacturing machine utilized expected operating parameters to fabricate the defective manufactured part, and that the inferred manufacturing machine thus warrants servicing or repair that is unrelated to its operating parameters. In other words, the electronic alert can be considered as indicating that the defective manufactured part was not rendered defective because of or due to the operating parameters of the inferred manufacturing machine.

In various cases, act 1208 can include generating, by the device (e.g., via 116), an electronic alert (e.g., 206) indicating that the defective manufactured part was fabricated by the inferred manufacturing machine, that the inferred manufacturing machine utilized unexpected operating parameters to fabricate the defective manufactured part, and that the inferred manufacturing machine thus warrants servicing or repair that is related to its operating parameters. In other words, the electronic alert can be considered as indicating that the defective manufactured part might have been rendered defective because of or due to the operating parameters of the inferred manufacturing machine.

Figure 13:
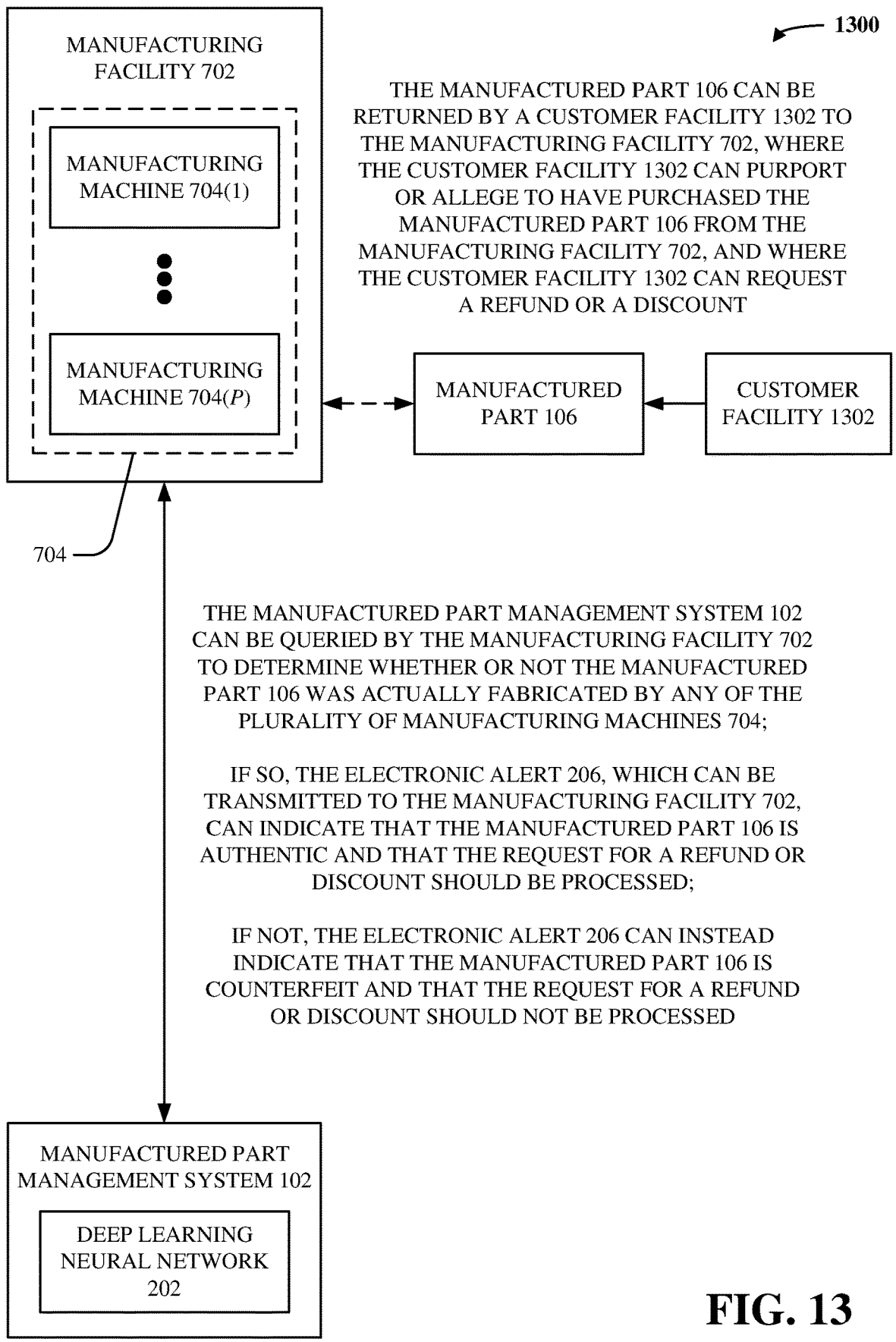
FIG. 13 illustrates an example, non-limiting block diagram showing how various embodiments described herein can be implemented manufacturing-side to detect counterfeit parts.

FIG. 13 illustrates an example, non-limiting block diagram 1300 showing how various embodiments described herein can be implemented manufacturing-side to detect counterfeit parts.

In various aspects, as mentioned above, the manufacturing facility 702 can comprise the plurality of manufacturing machines 704, and the manufactured part management system 102 can be owned by, operated by, or otherwise associated with the manufacturing facility 702. Accordingly, in various instances, the manufactured part management system 102 can be leveraged to ferret out counterfeiting for the manufacturing facility 702.

For instance, suppose that the manufactured part 106 is returned to the manufacturing facility 702 by a customer facility 1302. In various aspects, the customer facility 1302 can be any suitable industrial factory that uses or otherwise relies upon parts fabricated by the manufacturing facility 702 (e.g., the customer facility 1302 can be an industrial power plant whose power-generating equipment is constructed from parts fabricated by the manufacturing facility 702). Furthermore, suppose that an owner, operator, or technician of the customer facility 1302 asserts, alleges, or otherwise purports that the manufactured part 106 was purchased from the manufacturing facility 702 and requests a discount or refund for the manufactured part 106.

In various cases, the manufactured part management system 102 can be leveraged to determine which, if any, of the plurality of manufacturing machines 704 fabricated the manufactured part 106. In situations where the deep learning neural network 202 is configured as a classifier, the fabrication source classification label 308 can directly or explicitly indicate (e.g., via the manufacturing machine indicator 314) which, if any, of the plurality of manufacturing machines 704 actually fabricated the manufactured part 106. In other situations where the deep learning neural network 202 is instead configured as an encoder, the fabrication signature embedding 402 can be compared to fabrication signature embeddings of reference manufactured parts that are known to have been fabricated by respective ones of the plurality of manufacturing machines 704, and the degrees of similarity or dissimilarity between the fabrication signature embedding 402 and those other embeddings can indicate which, of any, of the plurality of manufacturing machines 704 actually fabricated the manufactured part 106.

If the manufactured part management system 102 (e.g., via the analysis component 114) determines that the manufactured part 106 was indeed fabricated by one of plurality of the manufacturing machines 704, the electronic alert 206, which can be transmitted to any suitable computing device of the manufacturing facility 702, can indicate that the manufactured part 106 is authentic (e.g., was indeed fabricated by the manufacturing facility 702) and that the discount or refund for the manufactured part 106 should thus be processed.

In contrast, if the manufactured part management system 102 (e.g., via the analysis component 114) determines that the manufactured part 106 was not fabricated by any of plurality of the manufacturing machines 704, the electronic alert 206 can instead indicate that the manufactured part 106 is counterfeit (e.g., was not fabricated by the manufacturing facility 702) and that the discount or refund for the manufactured part 106 should thus not be processed.

Figure 14:
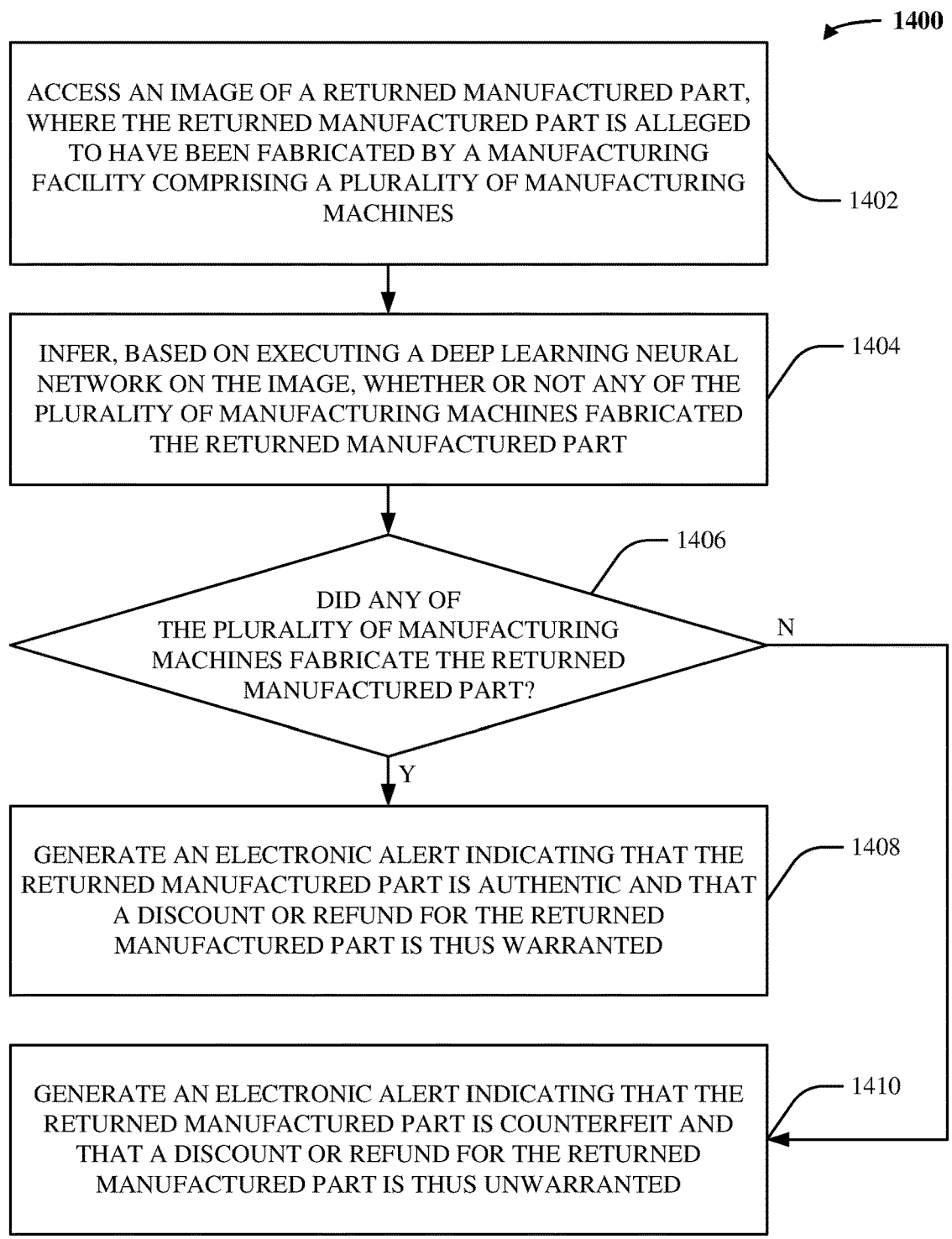
FIG. 14 illustrates a flow diagram of an example, non-limiting computer-implemented method that can facilitate manufacturing-side detection of counterfeit parts.

FIG. 14 illustrates a flow diagram of an example, non-limiting computer-implemented method 1400 that can facilitate manufacturing-side detection of counterfeit parts. In various cases, the manufactured part management system 102 can facilitate the computer-implemented method 1400.

In various embodiments, act 1402 can include accessing, by a device (e.g., via 112) operatively coupled to a processor (e.g., 108), an image (e.g., 104) of a returned manufactured part (e.g., 106). In various cases, the returned manufactured part can be alleged to have been fabricated by a manufacturing facility (e.g., 702) comprising a plurality of manufacturing machines (e.g., 704).

In various aspects, act 1404 can include inferring, by the device (e.g., via 114) and based on executing a deep learning neural network (e.g., 202) on the image, whether or not any of the plurality of manufacturing machines fabricated the returned manufactured part (e.g., can be indicated by 314, or can be derived from 402).

In various instances, act 1406 can include determining, by the device (e.g., via 114), whether any of the plurality of manufacturing machines fabricated the returned manufactured part. If so, the computer-implemented method 1400 can proceed to act 1408. In not, the computer-implemented method 1400 can instead proceed to act 1410.

In various cases, act 1408 can include generating, by the device (e.g., via 116), an electronic alert (e.g., 206) indicating that the returned manufactured part is authentic and that the discount or refund for the returned manufactured part is thus warranted.

In various aspects, act 1410 can include generating, by the device (e.g., via 116), an electronic alert (e.g., 206) indicating that the returned manufactured part is counterfeit and that the discount or refund for the returned manufactured part is thus unwarranted.

Figure 15:
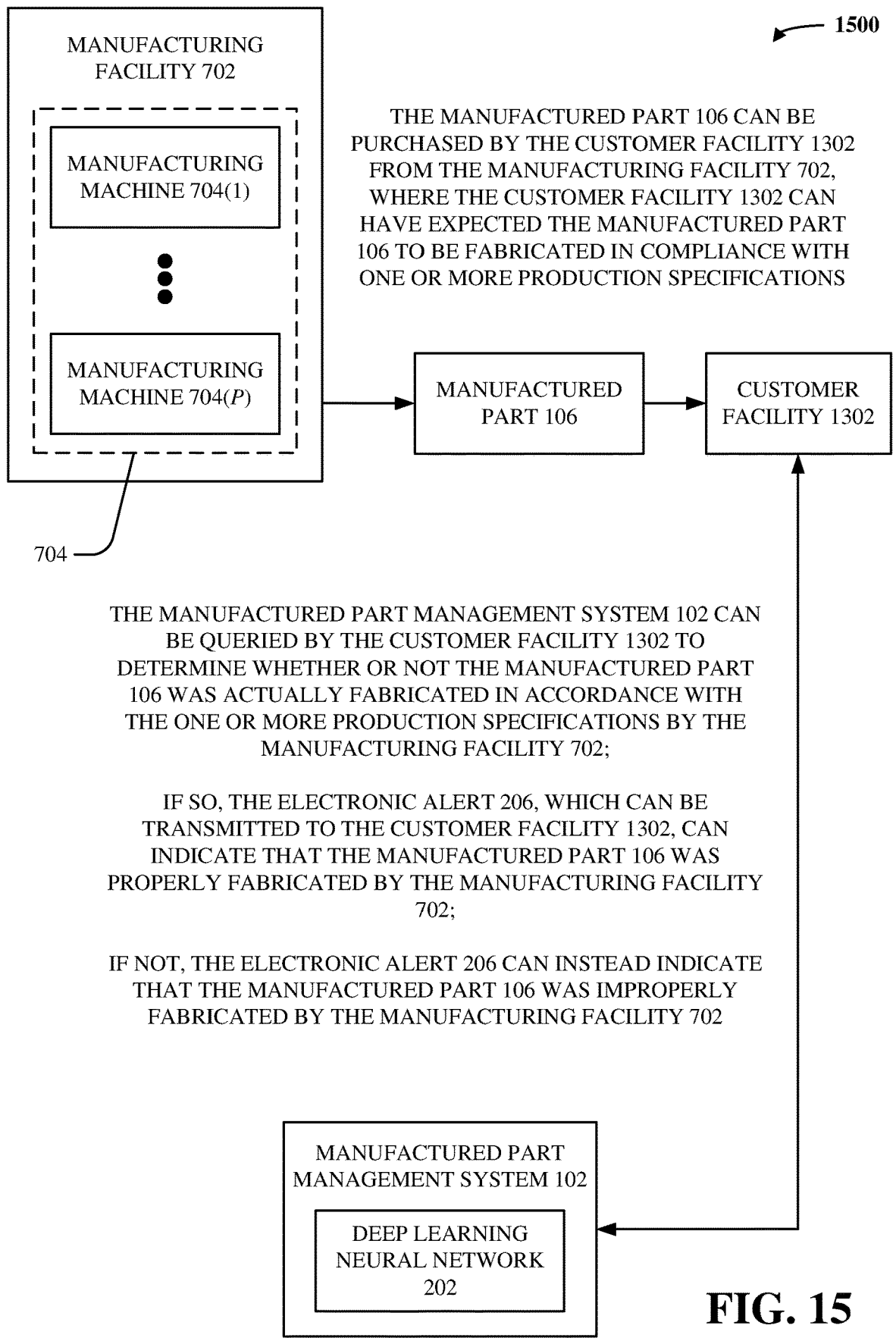
FIG. 15 illustrates an example, non-limiting block diagram showing how various embodiments described herein can be implemented customer-side to verify production requirement compliance.

FIG. 15 illustrates an example, non-limiting block diagram 1500 showing how various embodiments described herein can be implemented customer-side to verify production requirement compliance.

In various aspects, the manufacturing facility 702 can comprise the plurality of manufacturing machines 704, and the manufacturing facility 702 can provide parts to the customer facility 1302. In various instances, rather than being owned by, operated by, or otherwise associated with the manufacturing facility 702, the manufactured part management system 102 can instead be owned by, operated by, or otherwise associated with the customer facility 1302. Accordingly, in various cases, the manufactured part management system 102 can be leveraged to perform production requirement verification or compliance checks for the customer facility 1302.

For instance, suppose that the manufactured part 106 is purchased from the manufacturing facility 702 by the customer facility 1302. Furthermore, suppose that an owner, operator, or technician of the customer facility 1302 purchased the manufactured part 106 with the expectation that the manufactured part 106 would be fabricated in accordance or compliance with one or more production specifications. As a non-limiting example, the one or more production specifications can be that the manufactured part 106 was supposed to be fabricated from raw materials originating from a particular country of origin, that the manufactured part 106 was supposed to be fabricated by a particular one of the plurality of manufacturing machines 704, or that the manufactured part 106 was supposed to be fabricated according to particular operating parameters (e.g., using a particular injection speed, using a particular pressurization time). In some cases, the manufacturing facility 702 can even be contractually or legally obligated to comply with the one or more production specifications.

In various aspects, the manufactured part management system 102 can be leveraged to determine whether or not the manufacturing facility 702 fabricated the manufactured part 106 in compliance with the one or more production specifications. In situations where the deep learning neural network 202 is configured as a classifier, the fabrication source classification label 308 can directly or explicitly indicate whether or not such production specifications were applied to the manufactured part 106. In other situations where the deep learning neural network 202 is instead configured as an encoder, the fabrication signature embedding 402 can be compared to fabrication signature embeddings of reference manufactured parts that are known to have been fabricated in compliance with the one or more production specifications, and the degree of similarity or dissimilarity between the fabrication signature embedding 402 and those other embeddings can indicate whether or not the manufactured part 106 was fabricated in compliance with the one or more production specifications.

If the manufactured part management system 102 (e.g., via the analysis component 114) determines that the manufactured part 106 was indeed fabricated in compliance with the one or more production specifications, the electronic alert 206, which can be transmitted to any suitable computing device of the customer facility 1302, can indicate that the manufactured part 106 was properly fabricated by the manufacturing facility 702.

In contrast, if the manufactured part management system 102 (e.g., via the analysis component 114) determines that the manufactured part 106 was not fabricated in compliance with the one or more production specifications, the electronic alert 206 can instead indicate that the manufactured part 106 was not properly fabricated by the manufacturing facility 702.

Figure 16:
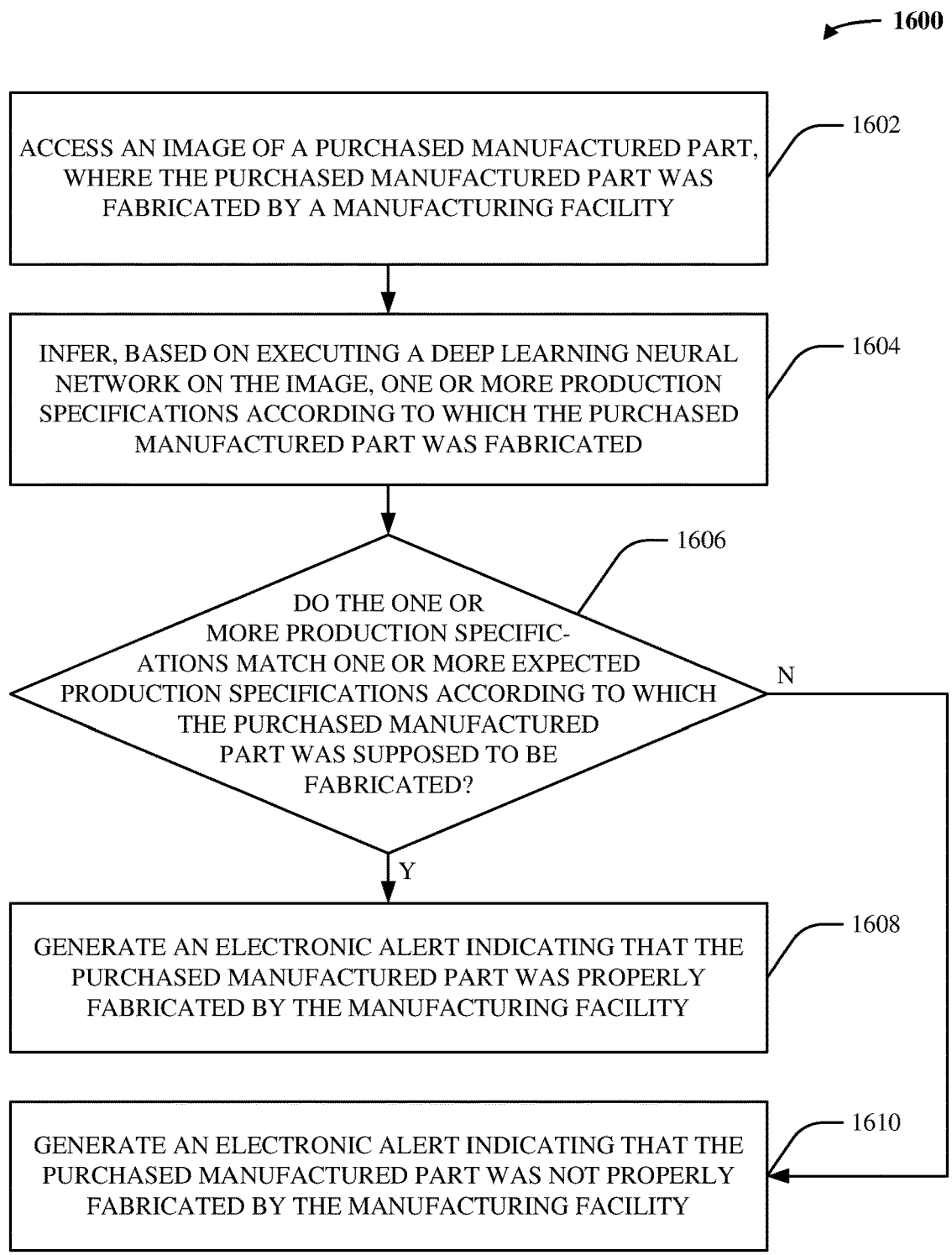
FIG. 16 illustrates a flow diagram of an example, non-limiting computer-implemented method that can facilitate customer-side verification of production requirement compliance.

FIG. 16 illustrates a flow diagram of an example, non-limiting computer-implemented method 1600 that can facilitate customer-side verification of production requirement compliance. In various cases, the manufactured part management system 102 can facilitate the computer-implemented method 1600.

In various embodiments, act 1602 can include accessing, by a device (e.g., via 112) operatively coupled to a processor (e.g., 108), an image (e.g., 104) of a purchased manufactured part (e.g., 106). In various cases, the purchased manufactured part can be or have been fabricated by a manufacturing facility (e.g., 702).

In various aspects, act 1604 can include inferring, by the device (e.g., via 114) and based on executing a deep learning neural network (e.g., 202) on the image, one or more production specifications according to which the purchased manufactured part was fabricated (e.g., can be indicated by 308, or can be derived from 402).

In various instances, act 1606 can include determining, by the device (e.g., via 114), whether the one or more production specifications match one or more expected production specifications according to which the purchased manufactured part was supposed to be fabricated. If so, the computer-implemented method 1600 can proceed to act 1608. In not, the computer-implemented method 1600 can instead proceed to act 1610.

In various cases, act 1608 can include generating, by the device (e.g., via 116), an electronic alert (e.g., 206) indicating that the purchased manufactured part was properly fabricated by the manufacturing facility.

In various aspects, act 1610 can include generating, by the device (e.g., via 116), an electronic alert (e.g., 206) indicating that the purchased manufactured part was not properly fabricated by the manufacturing facility.

FIG. 17 illustrates an example, non-limiting block diagram 1700 showing how various embodiments described herein can be implemented customer-side to identify likely-to-fail parts.

In various aspects, as mentioned above, the manufactured part management system 102 can be owned by, operated by, or otherwise associated with the customer facility 1302. Accordingly, in various cases, the manufactured part management system 102 can be leveraged to search for parts used by the customer facility 1302 that are likely to fail or be defective.

For instance, suppose that the manufactured part 106 is currently being used or deployed by the customer facility 1302. As a non-limiting example, the customer facility 1302 can be an industrial power plant, and the manufactured part 106 can be currently installed or integrated into a power generator of the customer facility 1302. Furthermore, suppose that the customer facility 1302 has or possesses a defective manufactured part 1702. In various cases, the defective manufactured part 1702 can be any suitable part that is known by the owner, operator, or technician of the customer facility 1302 to have some sort of defect, to have already failed, or to otherwise be likely to fail.

In various cases, the manufactured part management system 102 can be leveraged to determine whether or not the manufactured part 106 has the same (or similar) fabrication source as the defective manufactured part 1702. In situations where the deep learning neural network 202 is configured as a classifier, the fabrication source classification label 308 can directly or explicitly indicate how or where the manufactured part 106 was fabricated, and the deep learning neural network 202 can be leveraged to generate an analogous fabrication source classification label for the defective manufactured part 1702 (e.g., by being executed on an image of the defective manufactured part 1702). In other situations where the deep learning neural network 202 is instead configured as an encoder, the fabrication signature embedding 402 can be compared to a fabrication signature embedding of the defective manufactured part 1702, and the degree of similarity or dissimilarity between those embeddings can indicate whether or not the manufactured part 106 has the same (or similar enough, as defined by any suitable threshold margin) fabrication source as the defective manufactured part 1702.

If the manufactured part management system 102 (e.g., via the analysis component 114) determines that the manufactured part 106 does indeed have the same (or similar enough) fabrication source as the defective manufactured part 1702, the electronic alert 206, which can be transmitted to any suitable computing device of the customer facility 1302, can indicate such. Furthermore, in some cases, the electronic alert 206 can further indicate that the manufactured part 106 is likely to be defective or to fail in the same way as the defective manufactured part 1702. Accordingly, the electronic alert 206 can recommend or suggest that the manufactured part 106 be no longer used by the customer facility 1302, or can recommend or suggest that the manufactured part 106 undergo any suitable risk analyses, such as a likelihood-of-failure analysis or a remaining-useful-life analysis.

Figure 18:
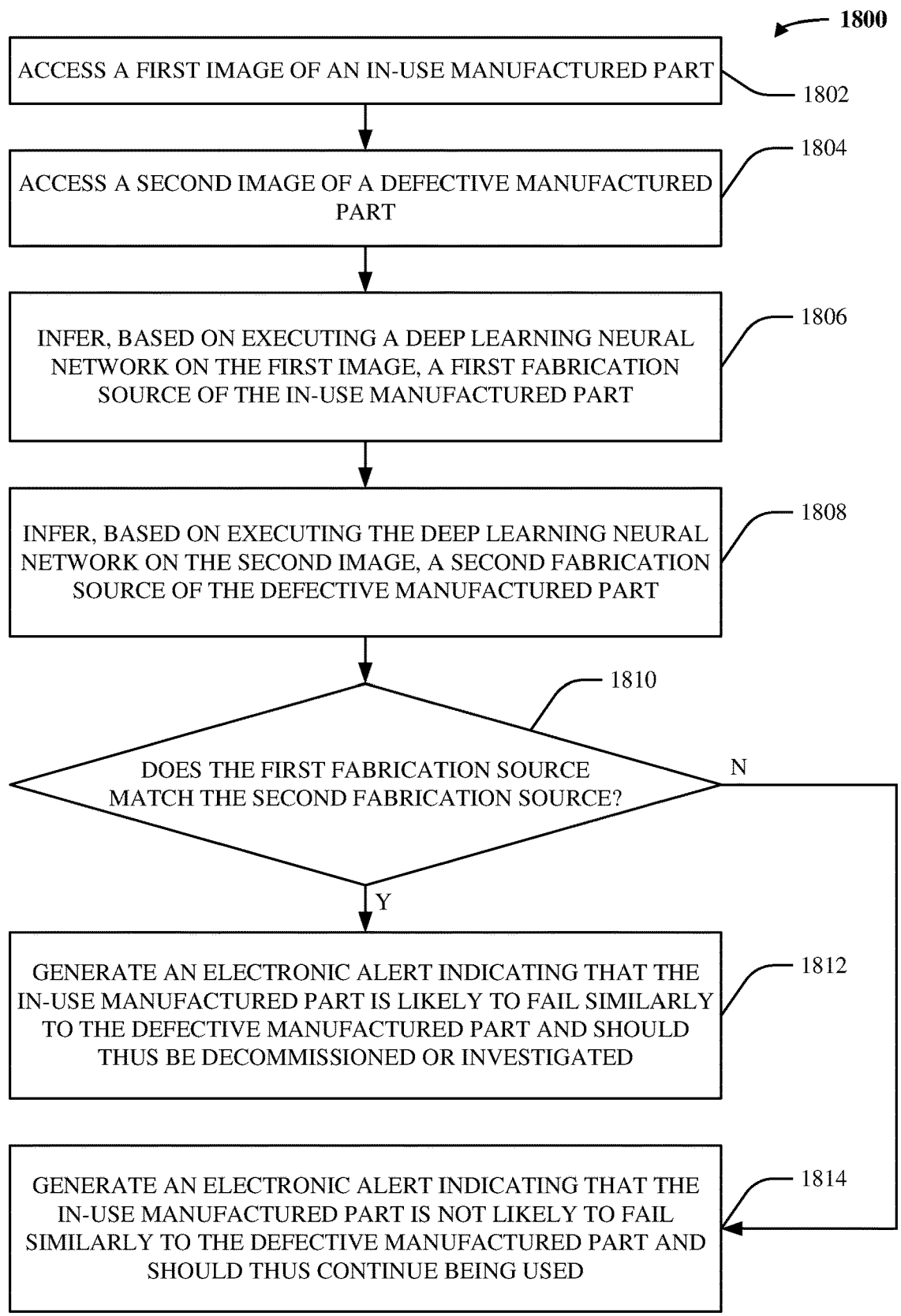
FIG. 18 illustrates a flow diagram of an example, non-limiting computer-implemented method that can facilitate customer-side identification of likely-to-fail parts.

FIG. 18 illustrates a flow diagram of an example, non-limiting computer-implemented method 1800 that can facilitate customer-side identification of likely-to-fail parts. In various cases, the manufactured part management system 102 can facilitate the computer-implemented method 1800.

In various embodiments, act 1802 can include accessing, by a device (e.g., via 112) operatively coupled to a processor (e.g., 108), a first image (e.g., 104) of an in-use manufactured part (e.g., 106).

In various aspects, act 1804 can include accessing, by the device (e.g., via 112), a second image of a defective manufactured part (e.g., 1702).

In various instances, act 1806 can include inferring, by the device (e.g., via 114) and based on executing a deep learning neural network (e.g., 202) on the first image, a first fabrication source of the in-use manufactured part (e.g., can be indicated by 308, or can be implicitly represented by 402).

In various cases, act 1808 can include inferring, by the device (e.g., via 114) and based on executing the deep learning neural network on the second image, a second fabrication source of the defective manufactured part (e.g., can be indicated by a classification label like 308, or can be implicitly represented by an embedding like 402).

In various aspects, act 1810 can include determining, by the device (e.g., via 114), whether the first fabrication source matches (e.g., is within any suitable threshold margin of similarity to) the second fabrication source. If so, the computer-implemented method 1800 can proceed to act 1812. If not, the computer-implemented method 1800 can instead proceed to act 1814.

In various instances, act 1812 can include generating, by the device (e.g., via 116), an electronic alert (e.g., 206) indicating that the in-use manufactured part is likely to fail similarly to the defective manufactured part and should thus be decommissioned or investigated.

In various cases, act 1814 can include generating, by the device (e.g., via 116), an electronic alert (e.g., 206) indicating that the in-use manufactured part is not likely to fail similarly to the defective manufactured part and should thus continue being used.

FIG. 19 illustrates an example, non-limiting block diagram 1900 showing how various embodiments described herein can be implemented customer-side to identify suitable replacement parts.

In various aspects, as mentioned above, the manufactured part management system 102 can be owned by, operated by, or otherwise associated with the customer facility 1302. Accordingly, in various cases, the manufactured part management system 102 can be leveraged to search for suitable replacement parts for the customer facility 1302.

For instance, suppose that the manufactured part 106 was previously being used or deployed by the customer facility 1302 but is now depleted or no longer suitable for continued use or deployment. As a non-limiting example, the customer facility 1302 can be an industrial power plant, the manufactured part 106 can be currently installed or integrated into a power generator of the customer facility 1302, and the manufactured part 106 can be depleted such that the power generator is no longer able to operate fully or properly. Furthermore, suppose that the customer facility 1302 has or possesses a spare manufactured part 1902. In various cases, the spare manufactured part 1902 can be any suitable part that is desired or intended by the owner, operator, or technician of the customer facility 1302 to replace the manufactured part 106.

In various cases, the manufactured part management system 102 can be leveraged to determine whether or not the manufactured part 106 has the same (or similar) fabrication source as the spare manufactured part 1902. In situations where the deep learning neural network 202 is configured as a classifier, the fabrication source classification label 308 can directly or explicitly indicate how or where the manufactured part 106 was fabricated, and the deep learning neural network 202 can be leveraged to generate an analogous fabrication source classification label for the spare manufactured part 1902 (e.g., by being executed on an image of the spare manufactured part 1902). In other situations where the deep learning neural network 202 is instead configured as an encoder, the fabrication signature embedding 402 can be compared to a fabrication signature embedding of the spare manufactured part 1902, and the degree of similarity or dissimilarity between those embeddings can indicate whether or not the manufactured part 106 has the same (or similar enough, as defined by any suitable threshold margin) fabrication source as the spare manufactured part 1902.

If the manufactured part management system 102 (e.g., via the analysis component 114) determines that the manufactured part 106 does indeed have the same (or similar enough) fabrication source as the spare manufactured part 1902, the electronic alert 206, which can be transmitted to any suitable computing device of the customer facility 1302, can indicate that the manufactured part 106 is compatible with the spare manufactured part 1902 and can thus be replaced by the spare manufactured part 1902.

In contrast, if the manufactured part management system 102 (e.g., via the analysis component 114) determines that the manufactured part 106 does not have the same (or similar enough) fabrication source as the spare manufactured part 1902, the electronic alert 206 can instead indicate that the manufactured part 106 is not compatible with the spare manufactured part 1902 and thus cannot be replaced by the spare manufactured part 1902.

Figure 20:
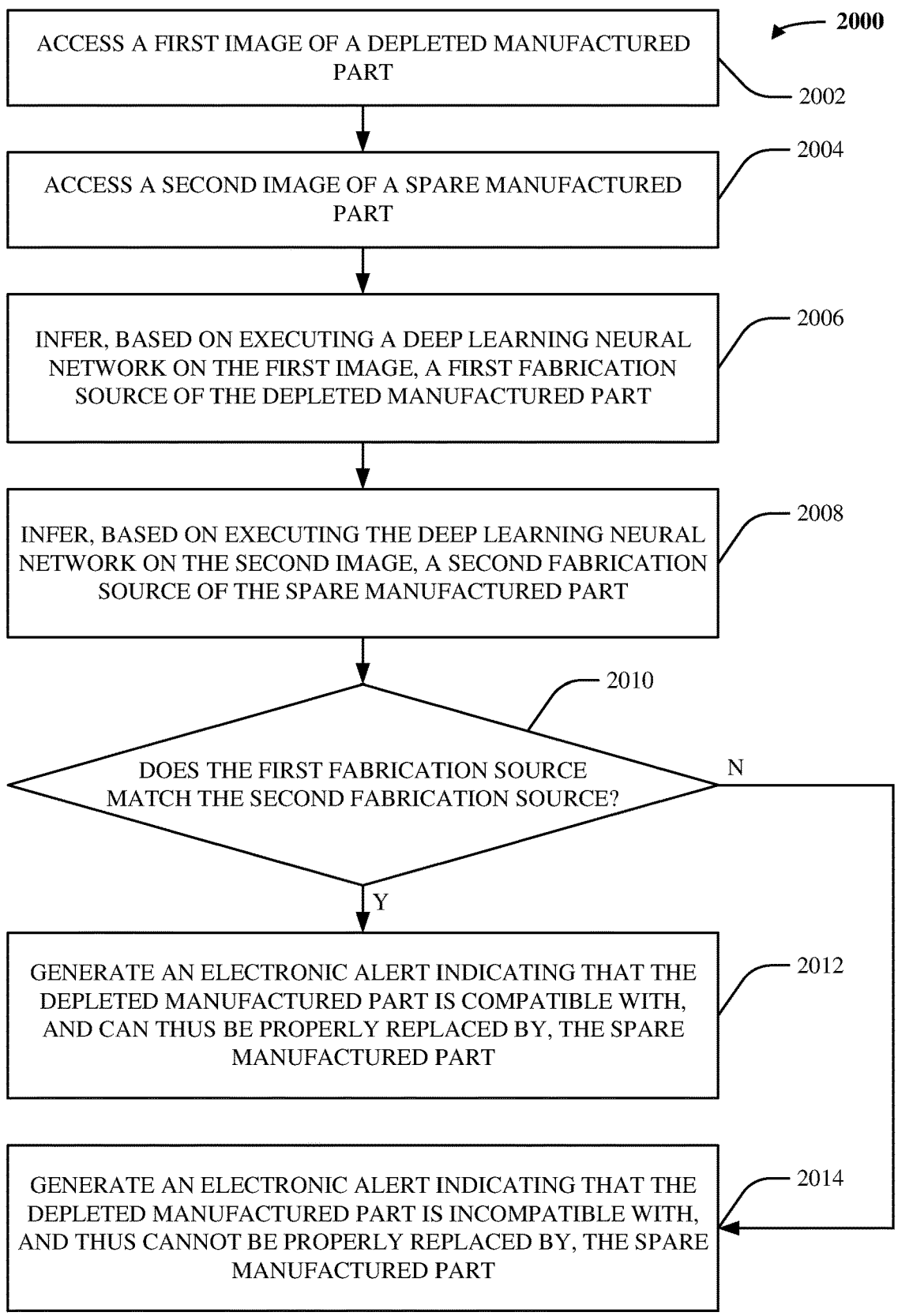
FIG. 20 illustrates a flow diagram of an example, non-limiting computer-implemented method that can facilitate customer-side identification of suitable replacement parts.

FIG. 20 illustrates a flow diagram of an example, non-limiting computer-implemented method 2000 that can facilitate customer-side identification of suitable replacement parts. In various cases, the manufactured part management system 102 can facilitate the computer-implemented method 2000.

In various embodiments, act 2002 can include accessing, by a device (e.g., via 112) operatively coupled to a processor (e.g., 108), a first image (e.g., 104) of a depleted manufactured part (e.g., 106).

In various aspects, act 2004 can include accessing, by the device (e.g., via 112), a second image of a spare manufactured part (e.g., 1902).

In various instances, act 2006 can include inferring, by the device (e.g., via 114) and based on executing a deep learning neural network (e.g., 202) on the first image, a first fabrication source of the depleted manufactured part (e.g., can be indicated by 308, or can be implicitly represented by 402).

In various cases, act 2008 can include inferring, by the device (e.g., via 114) and based on executing the deep learning neural network on the second image, a second fabrication source of the spare manufactured part (e.g., can be indicated by a classification label like 308, or can be implicitly represented by an embedding like 402).

In various aspects, act 2010 can include determining, by the device (e.g., via 114), whether the first fabrication source matches (e.g., is within any suitable threshold margin of similarity to) the second fabrication source. If so, the computer-implemented method 2000 can proceed to act 2012. If not, the computer-implemented method 2000 can instead proceed to act 2014.

In various instances, act 2012 can include generating, by the device (e.g., via 116), an electronic alert (e.g., 206) indicating that the depleted manufactured part is compatible with, and can thus be properly replaced by, the spare manufactured part.

In various cases, act 2014 can include generating, by the device (e.g., via 116), an electronic alert (e.g., 206) indicating that the depleted manufactured part is incompatible with, and thus cannot be properly replaced by, the spare manufactured part.

Figure 21:
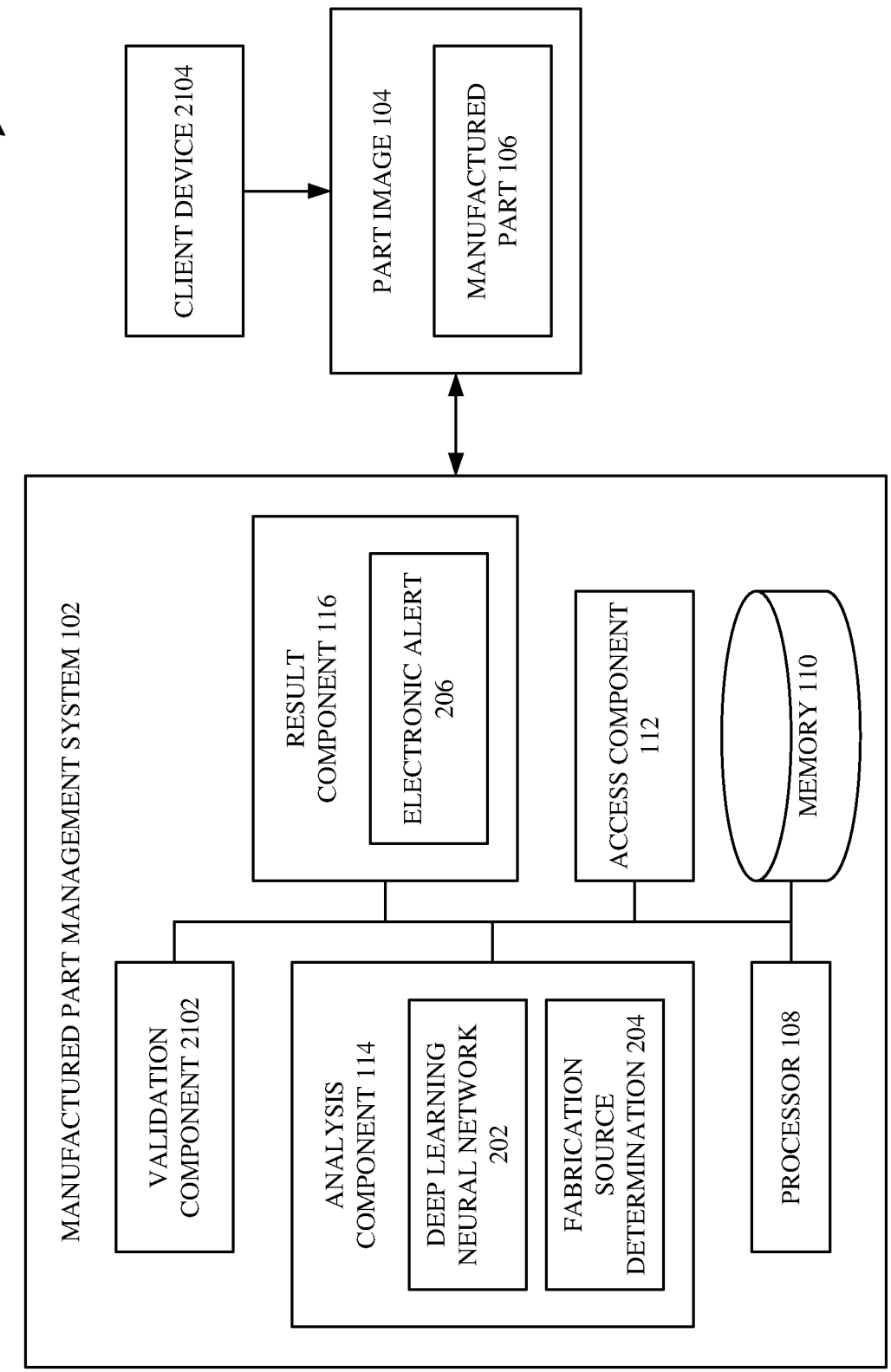
FIG. 21 illustrates a block diagram of an example, non-limiting system including a validation component that can facilitate management or tracking of manufactured parts via deep learning in accordance with one or more embodiments described herein.

FIG. 21 illustrates a block diagram of an example, non-limiting system 2100 including a validation component that can facilitate management or tracking of manufactured parts via deep learning in accordance with one or more embodiments described herein. As shown, the system 2100 can, in various cases, comprise the same components as the system 200, and can further comprise a validation component 2102 and a client device 2104.

In various embodiments, the manufactured part management system 102 can be considered as a cloud-computing server or a cloud-based server which can offer fabrication source identification as a service to the client device 2104. In various aspects, the client device 2104 can be any suitable computing device that is remote from the manufactured part management system 102 but that can nevertheless electronically communicate with the manufactured part management system 102. As some non-limiting examples, the client device 2104 can be a desktop computer, a laptop computer, a smart phone, a smart watch, smart glasses, a tablet device, or a vehicle-integrated computer. In some instances, the client device 2104 can be associated with the manufacturing facility 702. In other instances, the client device 2104 can instead be associated with the customer facility 1302. In even other instances, the client device 2104 can be associated with any other suitable third-party (e.g., with a government entity, with an end-user-retail consumer). In any case, the client device 2104 can electronically transmit the part image 104 to the manufactured part management system 102. In various instances, such transmission can be considered or interpreted as an electronic request to identify the fabrication source of the manufactured part 106.

In various aspects, the validation component 2102 can electronically verify whether or not the client device 2104 has permission, authorization, or a license to access the fabrication source identification service provided by the manufactured part management system 102. In various instances, the validation component 2102 can facilitate such verification via any suitable credential checking technique. If the validation component 2102 concludes that the client device 2104 has permission, authorization, or a license to access the fabrication source identification service provided by the manufactured part management system 102, the validation component 2102 can accordingly permit or instruct: the analysis component 114 to generate the fabrication source determination 204; and the result component 116 to transmit the electronic alert 206 to the client device 2104. On the other hand, if the validation component 2102 concludes that the client device 2104 lacks permission, authorization, or a license to access the fabrication source identification service provided by the manufactured part management system 102, the validation component 2102 can instead prohibit or prevent: the analysis component 114 from generating the fabrication source determination 204; and the result component 116 from transmitting the electronic alert 206 to the client device 2104.

In this way, the manufactured part management system 102 can be considered as functioning as a cloud service that is licensable to third-parties.

Figure 22:
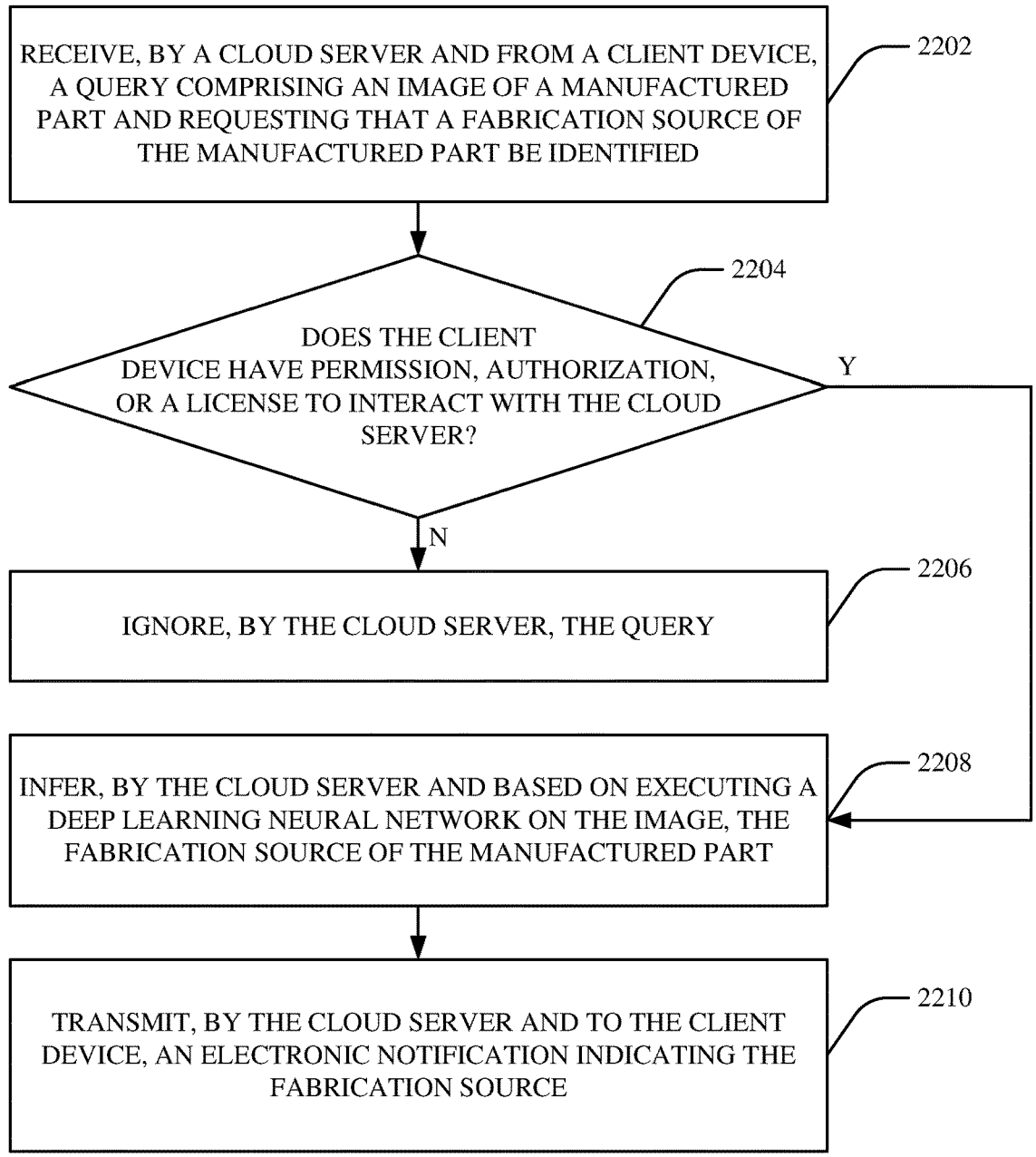
FIG. 22 illustrates a flow diagram of an example, non-limiting computer-implemented method that can facilitate cloud-based fabrication source identification in accordance with one or more embodiments described herein.

FIG. 22 illustrates a flow diagram of an example, non-limiting computer-implemented method 2200 that can facilitate cloud-based fabrication source identification in accordance with one or more embodiments described herein. In various cases, the manufactured part management system 102 can facilitate the computer-implemented method 2200.

In various embodiments, act 2202 can include receiving, by a cloud server (e.g., via 112 of 102) and from a client device (e.g., 2104), a query comprising an image (e.g., 104) of a manufactured part (e.g., 106). In various cases, the query can be considered as requesting that a fabrication source of the manufactured part be identified by the cloud server.

In various aspects, act 2204 can include determining, by the cloud server (e.g., via 2102 of 102), whether the client device has permission, authorization, or a license to interact with the cloud server. If not, the computer-implemented method 2200 can proceed to act 2206. If so, the computer-implemented method 2200 can instead proceed to act 2208.

In various instances, act 2206 can include ignoring, by the cloud server (e.g., via 2102 of 102), the query. Alternatively, act 2206 can include returning, by the cloud server (e.g., via 116 of 102), an error message indicating that the client device lacks permission, authorization, or a license to interact with the cloud server.

In various cases, act 2208 can include inferring, by the cloud server (e.g., via 114 of 102) and based on executing a deep learning neural network (e.g., 202) on the image, the fabrication source of the manufactured part.

In various aspects, act 2210 can include transmitting, by the cloud sever (e.g., via 116 of 102), an electronic notification (e.g., 206) indicating the fabrication source.

In order for the fabrication source determination 204 to be accurate or reliable (e.g., in order for 308 or 402 to be accurate or reliable), the deep learning neural network 202 can first undergo training, as described with respect to FIGS. 23-27.

Figure 23:
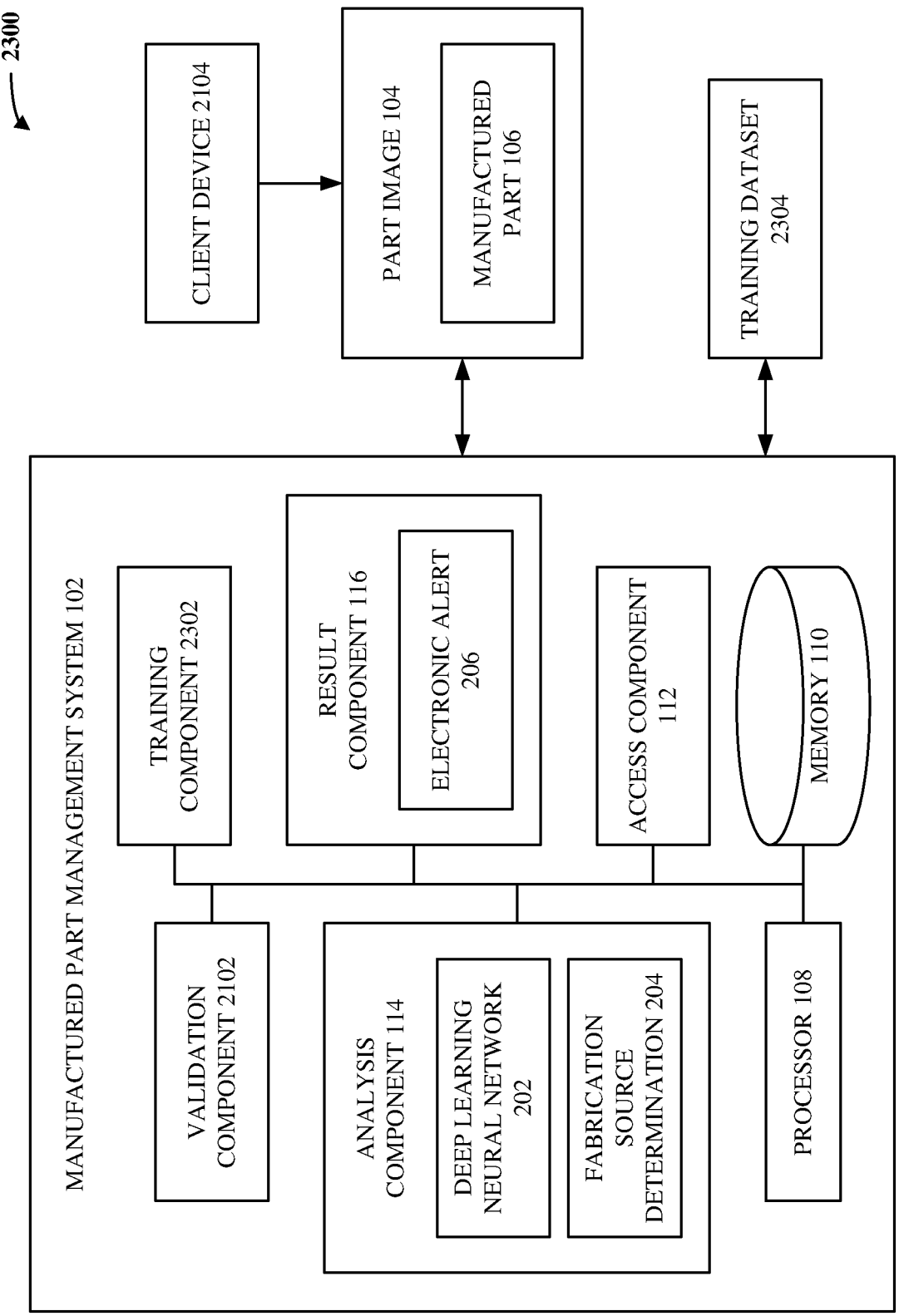
FIG. 23 illustrates a block diagram of an example, non-limiting system including a training component and a training dataset that can facilitate management or tracking of manufactured parts via deep learning in accordance with one or more embodiments described herein.

FIG. 23 illustrates a block diagram of an example, non-limiting system 2300 including a training component and a training dataset that can facilitate management or tracking of manufactured parts via deep learning in accordance with one or more embodiments described herein. As shown, the system 2300 can, in some cases, comprise the same components as the system 2100, and can further comprise a training component 2302 and a training dataset 2304.

In various embodiments, the access component 112 can electronically receive, retrieve, or otherwise access, from any suitable source, the training dataset 2304, and the training component 2302 can electronically train the deep learning neural network 202 on the training dataset 2304. In some cases, such training can be in supervised fashion, as described with respect to FIGS. 24-25. In other cases, such training can instead be in unsupervised fashion, as described with respect to FIGS. 26-27.

Figure 24:
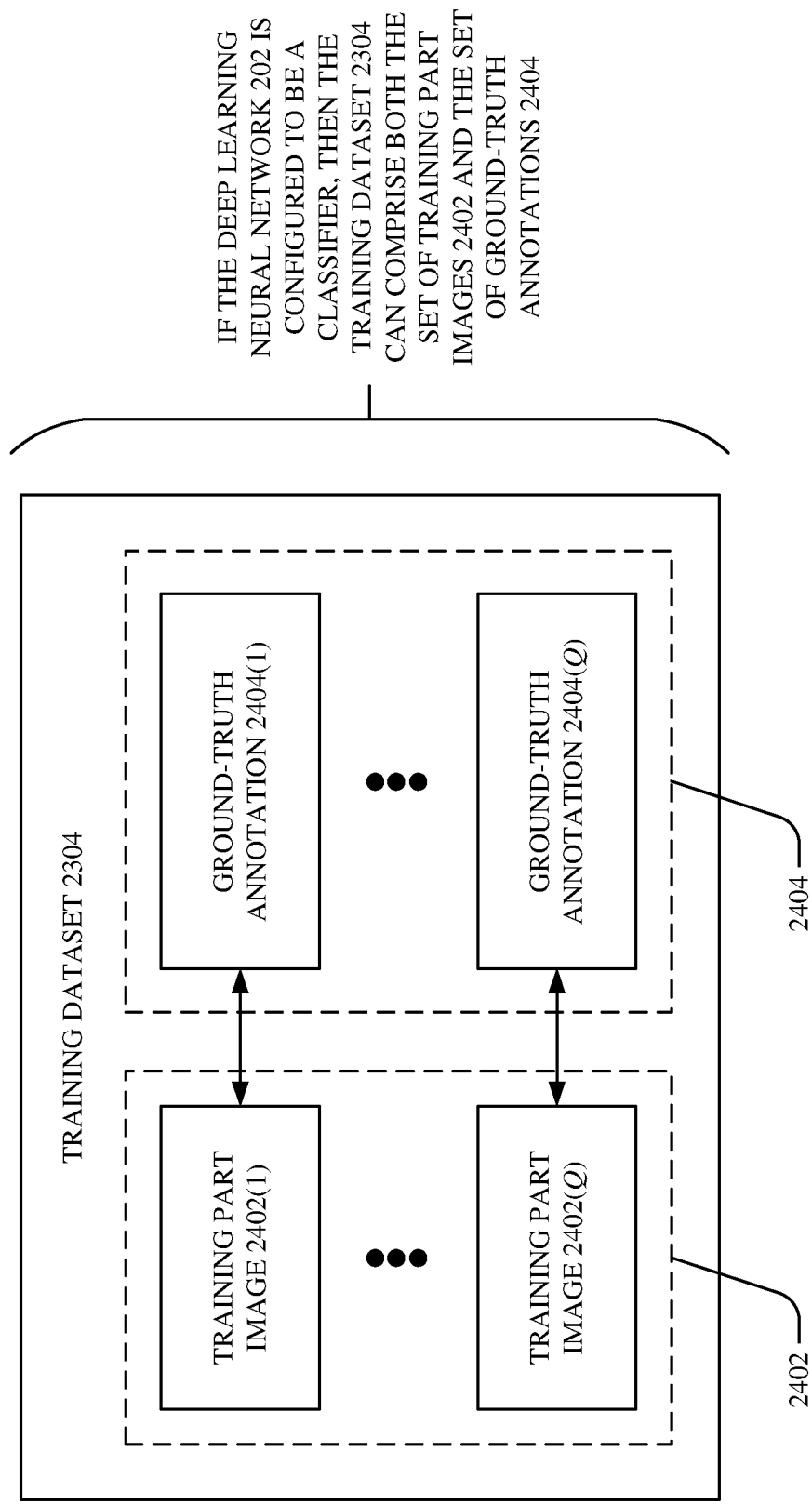
FIGS. 24-25 illustrate example, non-limiting block diagrams showing how a deep learning neural network can be trained in supervised fashion in accordance with one or more embodiments described herein.
Figure 25:
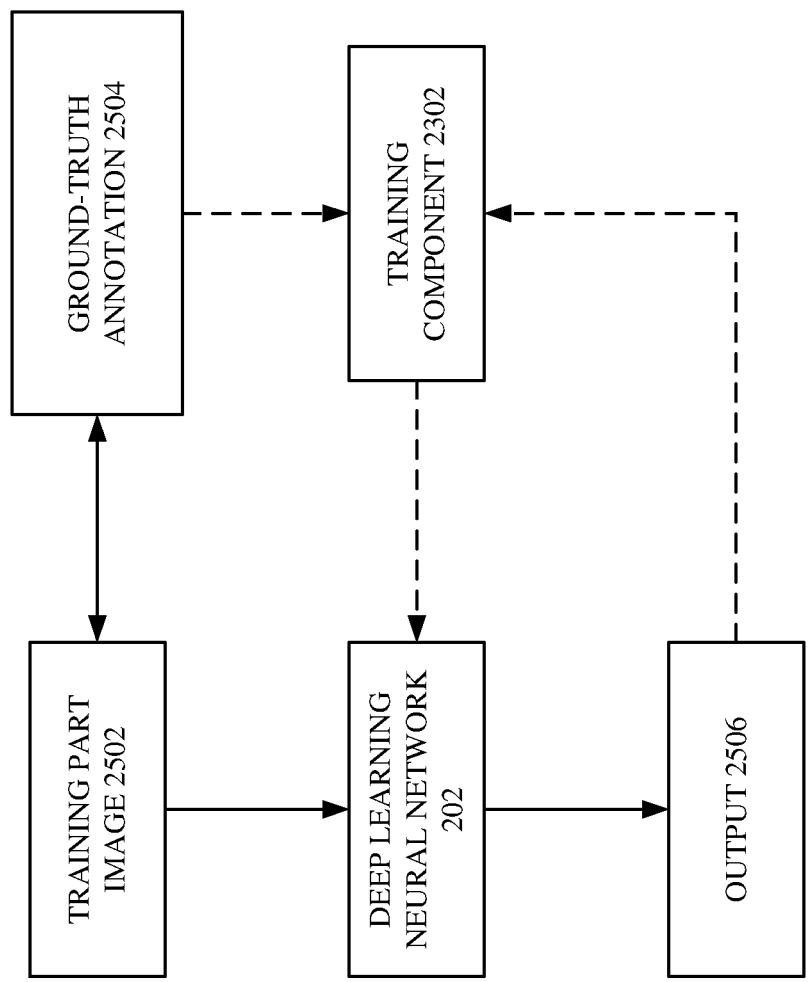

FIGS. 24-25 illustrate example, non-limiting block diagrams showing how the deep learning neural network 202 can be trained in supervised fashion in accordance with one or more embodiments described herein.

First, consider FIG. 24. As shown, FIG. 24 illustrates an example, non-limiting block diagram 2400 of the training dataset 2304.

In various aspects, as shown, the training dataset 2304 can comprise a set of training part images 2402. In various instances, the set of training part images 2402 can comprise q images, for any suitable positive integer q: a training part image 2402(1) to a training part image 2402(q). In various instances, each of the set of training part images 2402 can exhibit the same format, size, or dimensionality as the part image 104. As a non-limiting example, suppose that the part image 104 is an x-by-y pixel array. In such case, each of the set of training part images 2402 can likewise be an x-by-y pixel array. As another non-limiting example, suppose that the part image 104 is an x-by-y-by-z voxel array. In such case, each of the set of training part images 2402 can likewise be an x-by-y-by-z voxel array. In various aspects, each of the set of training part images 2402 can depict or illustrate (entirely or not entirely) a respective manufactured part.

In various instances, when the deep learning neural network 202 is configured as a classifier, the training dataset 2304 can further comprise a set of ground-truth annotations 2404. In various aspects, the set of ground-truth annotations 2404 can respectively correspond (e.g., in one-to-one fashion) with the set of training part images 2402. Accordingly, since the set of training part images 2402 can comprise q images, the set of ground-truth annotations 2404 can comprise q annotations: a ground-truth annotation 2404(1) to a ground-truth annotation 2404(q). In various cases, each of the set of ground-truth annotations 2404 can have the same format, size, or dimensionality as the fabrication source classification label 308. In other words, each of the set of ground-truth annotations 2404 can be, indicate, or otherwise represent whatever correct or accurate fabrication source classification label is known or deemed to correspond to a respective one of the set of training part images 2402. As a non-limiting example, the ground-truth annotation 2404(1) can correspond to the training part image 2402(1). Accordingly, the ground-truth annotation 2404(1) can be considered as the correct or accurate fabrication source classification label that is known or deemed to correspond to the training part image 2402(1). As another non-limiting example, the ground-truth annotation 2404(q) can correspond to the training part image 2402(q). So, the ground-truth annotation 2404(q) can be considered as the correct or accurate fabrication source classification label that is known or deemed to correspond to the training part image 2402(q).

Although not explicitly shown in FIG. 24, note that each of the set of training part images 2402 can be accompanied by respective supplemental part metadata (e.g., like 302), in embodiments where the deep learning neural network 202 is configured to receive such metadata as an auxiliary input.

Now, consider FIG. 25. FIG. 25 illustrates an example, non-limiting block diagram 2500 showing how the deep learning neural network 202 can be trained in supervised fashion in accordance with one or more embodiments described herein.

In various embodiments, the training component 2302 can train the deep learning neural network 202 in supervised fashion on the training dataset 2304, as follows.

Prior to such training, the training component 2302 can initialize in any suitable fashion (e.g., random initialization) the trainable internal parameters (e.g., weight matrices, bias vectors, convolutional kernels) of the deep learning neural network 202.

In various aspects, the training component 2302 can select from the training dataset 2304 any suitable training part image and any suitable corresponding ground-truth annotation. These can be respectively referred to as a training part image 2502 and a ground-truth annotation 2504.

In various instances, the training component 2302 can electronically execute the deep learning neural network 202 on the training part image 2502, and such execution can yield an output 2506. More specifically, the training component 2302 can feed the training part image 2502 (concatenated with respective supplemental part metadata, if applicable) to the input layer of the deep learning neural network 202, the training part image 2502 can complete a forward pass through the hidden layers of the deep learning neural network 202, and the output layer of the deep learning neural network 202 can compute the output 2506, based on activation maps or feature maps provided by the one or more hidden layers.

Note that the format, size, or dimensionality of the output 2506 can be dictated by the number, arrangement, sizes, or other characteristics of the neurons, convolutional kernels, or other internal parameters of the output layer (or of any other layers) of the deep learning neural network 202. Accordingly, the output 2506 can be forced to have any suitable or desired format, size, or dimensionality, by adding, removing, or otherwise adjusting neurons or other internal parameters or characteristics of the output layer (or of any other layers) of the deep learning neural network 202. Thus, the output 2506 can be considered as the predicted or inferred fabrication source classification label that the deep learning neural network 202 believes should correspond to the training part image 2502. On the other hand, the ground-truth annotation 2504 can be the correct or accurate fabrication source classification label that is known or deemed to correspond to the training part image 2502. In various cases, if the deep learning neural network 202 has so far undergone no or little training, then the output 2506 can be highly inaccurate (e.g., can be very different from the ground-truth annotation 2504).

In various aspects, the training component 2302 can compute, via any suitable error or objective function (e.g., MAE, MSE, cross-entropy), a loss or error between the output 2506 and the ground-truth annotation 2504. In various instances, the training component 2302 can update the trainable internal parameters of the deep learning neural network 202, by performing backpropagation (e.g., stochastic gradient descent) driven by such computed loss or error.

In various aspects, the above-described training procedure can be repeated for any suitable number of training part images (e.g., for each training part image in the training dataset 2304). Such training can ultimately cause the trainable internal parameters of the deep learning neural network 202 to become iteratively optimized for accurately or correctly generating fabrication source classification labels for inputted part images. In various cases, the training component 2302 can implement any suitable training termination criterion, any suitable training objective functions, or any suitable training batch sizes when training the deep learning neural network 202.

Figure 26:
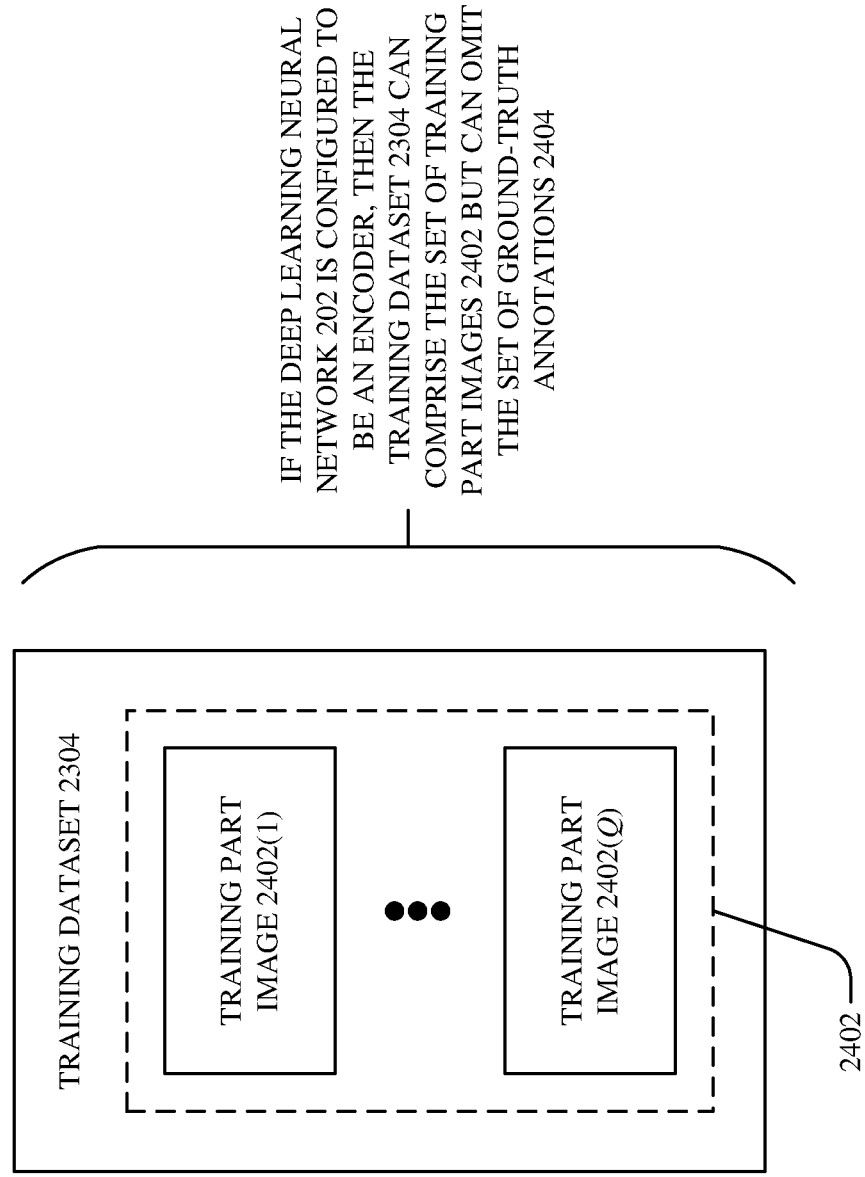
FIGS. 26-27 illustrate example, non-limiting block diagrams showing how a deep learning neural network can be trained in unsupervised fashion in accordance with one or more embodiments described herein.
Figure 27:
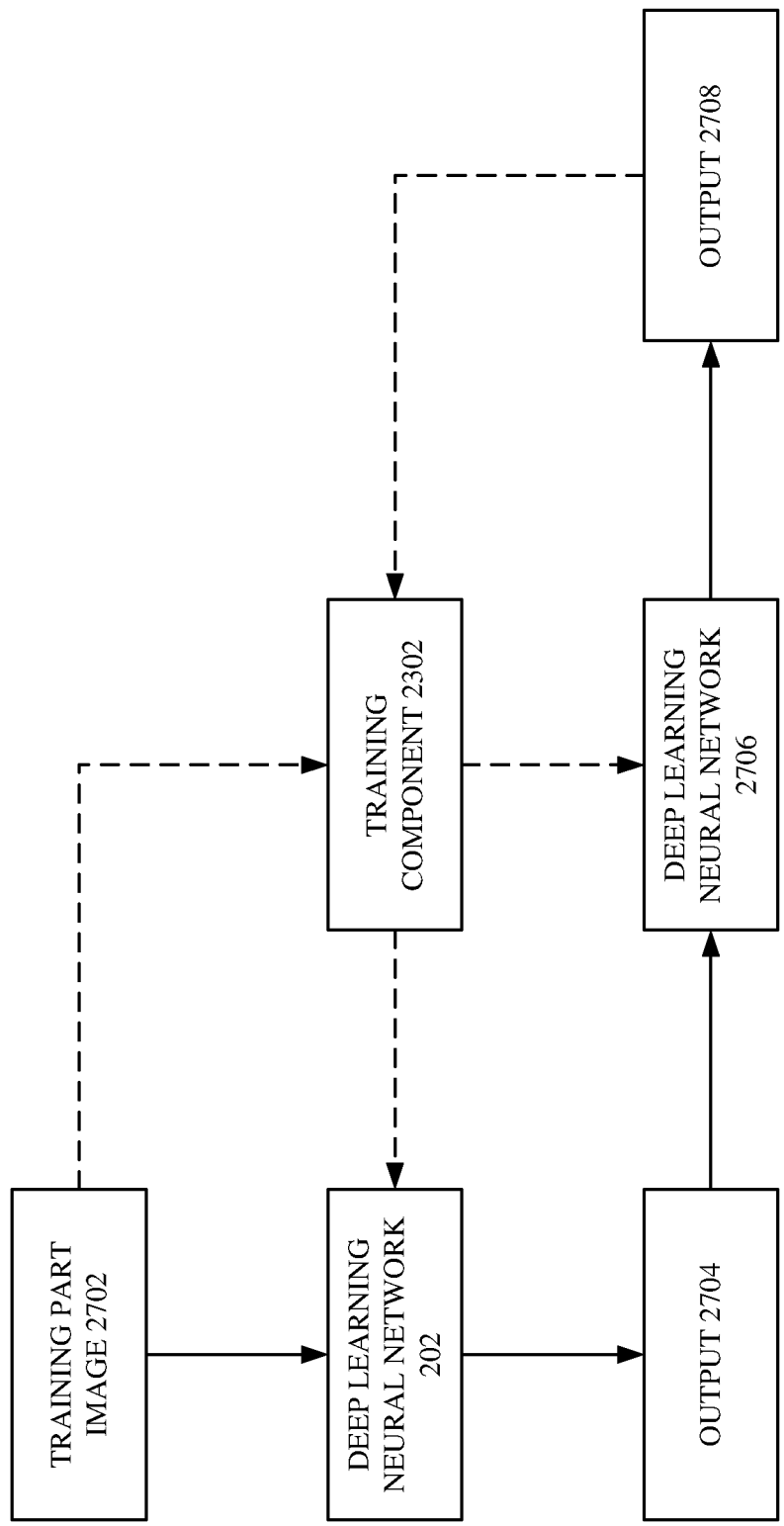

FIGS. 26-27 illustrate example, non-limiting block diagrams showing how the deep learning neural network 202 can be trained in unsupervised fashion in accordance with one or more embodiments described herein.

First, consider FIG. 26. As shown, FIG. 26 illustrates an example, non-limiting block diagram 2600 of the training dataset 2304.

In various aspects, as mentioned above, the training dataset 2304 can comprise the set of training part images 2402. Also as mentioned above, if the deep learning neural network 202 is configured as a classifier, then the training dataset 2304 can further comprise the set of ground-truth annotations 2404. However, if the deep learning neural network 202 is instead configured as an encoder, then the training dataset 2304 can, in various instances, omit or lack the set of ground-truth annotations 2404, as shown.

Now, consider FIG. 27. FIG. 27 illustrates an example, non-limiting block diagram 2700 showing how the deep learning neural network 202 can be trained in unsupervised fashion in accordance with one or more embodiments described herein. For any of the embodiments herein, a neural network or other type of machine learning model may be trained in a supervised fashion, an unsupervised fashion, or in a fashion that combines supervised and unsupervised training.

In various embodiments, there can be a deep learning neural network 2706. In various aspects, the deep learning neural network 2706 can be any suitable artificial neural network that can have or otherwise exhibit any suitable internal architecture. For instance, the deep learning neural network 2706 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As even another example, any of such input layer, one or more hidden layers, or output layer can be long short-term memory (LSTM) layers, whose learnable or trainable parameters can be input-state weight matrices or hidden-state weight matrices. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of its internal architecture, the deep learning neural network 2706 can be configured to perform an inverse function as the deep learning neural network 202. That is, while the deep learning neural network 202 can be configured as an encoder to generate fabrication signature embeddings from inputted part images, the deep learning neural network 2706 can instead be configured to generate part images based on inputted fabrication signature embeddings.

In various embodiments, the training component 2302 can leverage the deep learning neural network 2706 so as to train the deep learning neural network 202 in unsupervised fashion on the training dataset 2304, as follows.

Prior to such training, the training component 2302 can initialize in any suitable fashion (e.g., random initialization) the trainable internal parameters (e.g., weight matrices, bias vectors, convolutional kernels) of the deep learning neural network 202 and of the deep learning neural network 2706.

In various aspects, the training component 2302 can select from the training dataset 2304 any suitable training part image. This can be referred to as a training part image 2702.

In various instances, the training component 2302 can electronically execute the deep learning neural network 202 on the training part image 2702, and such execution can yield an output 2704. More specifically, the training component 2302 can feed the training part image 2702 (concatenated with respective supplemental part metadata, if applicable) to the input layer of the deep learning neural network 202, the training part image 2702 can complete a forward pass through the hidden layers of the deep learning neural network 202, and the output layer of the deep learning neural network 202 can compute the output 2704, based on activation maps or feature maps provided by the one or more hidden layers of the deep learning neural network 202.

Note that, in various cases, the format, size, or dimensionality of the output 2704 can be controlled or otherwise determined by the number, arrangement, or sizes of neurons or of other internal parameters (e.g., convolutional kernels) that are contained in or that otherwise make up the output layer (or any other layers) of the deep learning neural network 202. Thus, the output 2704 can be forced to have any desired format, size, or dimensionality by adding, removing, or otherwise adjusting neurons or other internal parameters to, from, or within the output layer (or any other layers) of the deep learning neural network 202. Accordingly, in various aspects, the output 2704 can be forced to have a smaller (e.g., in some cases, one or more orders of magnitude smaller) format, size, or dimensionality than the training part image 2702. In such case, the output 2704 can be considered as a fabrication signature embedding that the deep learning neural network 202 has predicted or inferred corresponds to the training part image 2702.

Additionally, note that, if the deep learning neural network 202 has so far undergone no or little training, then the output 2704 can be highly inaccurate. In other words, the output 2704 can fail to properly encode or represent the substantive visual content of the training part image 2702 (e.g., can fail to correctly or properly capture or represent whatever unique physical or chemical part attributes, properties, or characteristics are visually depicted in the training part image 2702).

In various aspects, the training component 2302 can execute the deep learning neural network 2706 on the output 2704. In various instances, this can cause the deep learning neural network 2706 to produce an output 2708. In particular, the training component 2302 can feed the output 2704 to an input layer of the deep learning neural network 2706. In various cases, the output 2704 can complete a forward pass through one or more hidden layers of the deep learning neural network 2706. Accordingly, an output layer of the deep learning neural network 2706 can compute or calculate the output 2708 based on activation maps or feature maps produced by the one or more hidden layers of the deep learning neural network 2706.

As above, note that the format, size, or dimensionality of the output 2708 can be controlled or otherwise determined by the number, arrangement, or sizes of neurons or other internal parameters (e.g., convolutional kernels) that are contained in or that otherwise make up the output layer (or any other layers) of the deep learning neural network 2706. Thus, the output 2708 can be forced to have any desired format, size, or dimensionality by adding, removing, or otherwise adjusting neurons or other internal parameters to, from, or within the output layer (or any other layers) of the deep learning neural network 2706. Accordingly, in various aspects, the output 2708 can be forced to have the same format, size, or dimensionality as the training part image 2702. In such case, the output 2708 can be considered as an approximation or recreation of the training part image 2702, as predicted or inferred by the deep learning neural network 2706.

Additionally, and just as above, note that, if the deep learning neural network 2706 has so far undergone no or little training, then the output 2708 can be highly inaccurate. That is, the output 2708 can be very different from the training part image 2702.

In various aspects, the training component 2302 can compute an error or loss (e.g., MAE, MSE, cross-entropy error) between the output 2708 and the training part image 2702. In various instances, as shown, the training component 2302 can incrementally update the trainable internal parameters of both the deep learning neural network 202 and the deep learning neural network 2706, by performing backpropagation (e.g., stochastic gradient descent) driven by the computed error or loss. In other words, the deep learning neural network 202 and the deep learning neural network 2706 can be considered as collectively forming an encoder-decoder deep learning pipeline. In such pipeline, the deep learning neural network 202 can be considered as the encoder, whereas the deep learning neural network 2706 can be considered as the decoder.

In various cases, the training component 2302 can repeat the above-described training procedure for any suitable number of training part images (e.g., for all of the training part images in the training dataset 2304). This can ultimately cause the trainable internal parameters of the deep learning neural network 202 to become iteratively optimized for accurately generating fabrication signature embeddings based on inputted part images, and this can also ultimately cause the trainable internal parameters of the deep learning neural network 2706 to become iteratively optimized for accurately recreating part images based on inputted fabrication signature embeddings. In various aspects, the training component 2302 can implement any suitable training batch sizes, any suitable training termination criterion, or any suitable error, loss, or objective function when training the deep learning neural network 202 and the deep learning neural network 2706.

It should be appreciated that FIGS. 24-27, and their associated descriptions, are mere non-limiting examples of ways in which the deep learning neural network 202 can be trained so as to facilitate fabrication source identification based on inputted part images. In various embodiments, any other suitable training techniques or training paradigms can be implemented to train the deep learning neural network 202. As a non-limiting example, any suitable reinforcement learning technique can be implemented to train the deep learning neural network 202. As another non-limiting example, any suitable federated learning or distributed learning technique can be implemented to train the deep learning neural network 202.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)$=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 28:
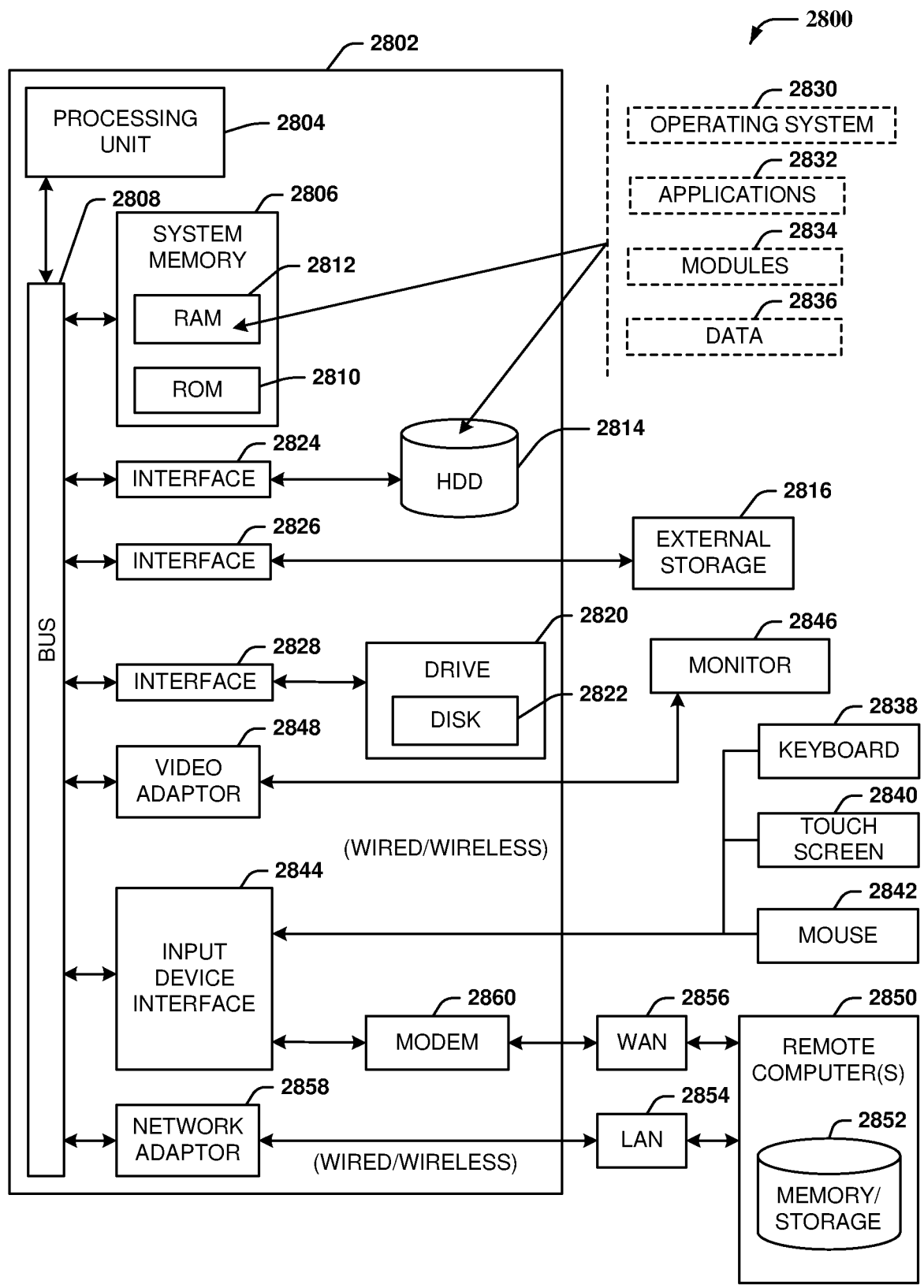
FIG. 28 illustrates a block diagram of an example, non-limiting operating environment in which one or more embodiments described herein can be facilitated.

In order to provide additional context for various embodiments described herein, FIG. 28 and the following discussion are intended to provide a brief, general description of a suitable computing environment 2800 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 28, the example environment 2800 for implementing various embodiments of the aspects described herein includes a computer 2802, the computer 2802 including a processing unit 2804, a system memory 2806 and a system bus 2808. The system bus 2808 couples system components including, but not limited to, the system memory 2806 to the processing unit 2804. The processing unit 2804 can be any of various commercially available processors. Dual microprocessors and other multi-processor architectures can also be employed as the processing unit 2804.

The system bus 2808 can be any of several types of bus structure that can further interconnect to a memory bus (with or without a memory controller), a peripheral bus, and a local bus using any of a variety of commercially available bus architectures. The system memory 2806 includes ROM 2810 and RAM 2812. A basic input/output system (BIOS) can be stored in a non-volatile memory such as ROM, erasable programmable read only memory (EPROM), EEPROM, which BIOS contains the basic routines that help to transfer information between elements within the computer 2802, such as during startup. The RAM 2812 can also include a high-speed RAM such as static RAM for caching data.

The computer 2802 further includes an internal hard disk drive (HDD) 2814 (e.g., EIDE, SATA), one or more external storage devices 2816 (e.g., a magnetic floppy disk drive (FDD) 2816, a memory stick or flash drive reader, a memory card reader, etc.) and a drive 2820, e.g., such as a solid state drive, an optical disk drive, which can read or write from a disk 2822, such as a CD-ROM disc, a DVD, a BD, etc. Alternatively, where a solid state drive is involved, disk 2822 would not be included, unless separate. While the internal HDD 2814 is illustrated as located within the computer 2802, the internal HDD 2814 can also be configured for external use in a suitable chassis (not shown). Additionally, while not shown in environment 2800, a solid state drive (SSD) could be used in addition to, or in place of, an HDD 2814. The HDD 2814, external storage device(s) 2816 and drive 2820 can be connected to the system bus 2808 by an HDD interface 2824, an external storage interface 2826 and a drive interface 2828, respectively. The interface 2824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2812, including an operating system 2830, one or more application programs 2832, other program modules 2834 and program data 2836. All or portions of the operating system, applications, modules, or data can also be cached in the RAM 2812. The systems and methods described herein can be implemented utilizing various commercially available operating systems or combinations of operating systems.

Computer 2802 can optionally comprise emulation technologies. For example, a hypervisor (not shown) or other intermediary can emulate a hardware environment for operating system 2830, and the emulated hardware can optionally be different from the hardware illustrated in FIG. 28. In such an embodiment, operating system 2830 can comprise one virtual machine (VM) of multiple VMs hosted at computer 2802. Furthermore, operating system 2830 can provide runtime environments, such as the Java runtime environment or the .NET framework, for applications 2832. Runtime environments are consistent execution environments that allow applications 2832 to run on any operating system that includes the runtime environment. Similarly, operating system 2830 can support containers, and applications 2832 can be in the form of containers, which are lightweight, standalone, executable packages of software that include, e.g., code, runtime, system tools, system libraries and settings for an application.

Further, computer 2802 can be enable with a security module, such as a trusted processing module (TPM). For instance with a TPM, boot components hash next in time boot components, and wait for a match of results to secured values, before loading a next boot component. This process can take place at any layer in the code execution stack of computer 2802, e.g., applied at the application execution level or at the operating system (OS) kernel level, thereby enabling security at any level of code execution.

A user can enter commands and information into the computer 2802 through one or more wired/wireless input devices, e.g., a keyboard 2838, a touch screen 2840, and a pointing device, such as a mouse 2842. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2804 through an input device interface 2844 that can be coupled to the system bus 2808, but can be connected by other interfaces, such as a parallel port, an IEEE 1394 serial port, a game port, a USB port, an IR interface, a BLUETOOTH® interface, etc.

A monitor 2846 or other type of display device can be also connected to the system bus 2808 via an interface, such as a video adapter 2848. In addition to the monitor 2846, a computer typically includes other peripheral output devices (not shown), such as speakers, printers, etc.

The computer 2802 can operate in a networked environment using logical connections via wired or wireless communications to one or more remote computers, such as a remote computer(s) 2850. The remote computer(s) 2850 can be a workstation, a server computer, a router, a personal computer, portable computer, microprocessor-based entertainment appliance, a peer device or other common network node, and typically includes many or all of the elements described relative to the computer 2802, although, for purposes of brevity, only a memory/storage device 2852 is illustrated. The logical connections depicted include wired/wireless connectivity to a local area network (LAN) 2854 or larger networks, e.g., a wide area network (WAN) 2856. Such LAN and WAN networking environments are commonplace in offices and companies, and facilitate enterprise-wide computer networks, such as intranets, all of which can connect to a global communications network, e.g., the Internet.

When used in a LAN networking environment, the computer 2802 can be connected to the local network 2854 through a wired or wireless communication network interface or adapter 2858. The adapter 2858 can facilitate wired or wireless communication to the LAN 2854, which can also include a wireless access point (AP) disposed thereon for communicating with the adapter 2858 in a wireless mode.

When used in a WAN networking environment, the computer 2802 can include a modem 2860 or can be connected to a communications server on the WAN 2856 via other means for establishing communications over the WAN 2856, such as by way of the Internet. The modem 2860, which can be internal or external and a wired or wireless device, can be connected to the system bus 2808 via the input device interface 2844. In a networked environment, program modules depicted relative to the computer 2802 or portions thereof, can be stored in the remote memory/storage device 2852. It will be appreciated that the network connections shown are example and other means of establishing a communications link between the computers can be used.

When used in either a LAN or WAN networking environment, the computer 2802 can access cloud storage systems or other network-based storage systems in addition to, or in place of, external storage devices 2816 as described above, such as but not limited to a network virtual machine providing one or more aspects of storage or processing of information. Generally, a connection between the computer 2802 and a cloud storage system can be established over a LAN 2854 or WAN 2856 e.g., by the adapter 2858 or modem 2860, respectively. Upon connecting the computer 2802 to an associated cloud storage system, the external storage interface 2826 can, with the aid of the adapter 2858 or modem 2860, manage storage provided by the cloud storage system as it would other types of external storage. For instance, the external storage interface 2826 can be configured to provide access to cloud storage sources as if those sources were physically connected to the computer 2802.

The computer 2802 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 29:
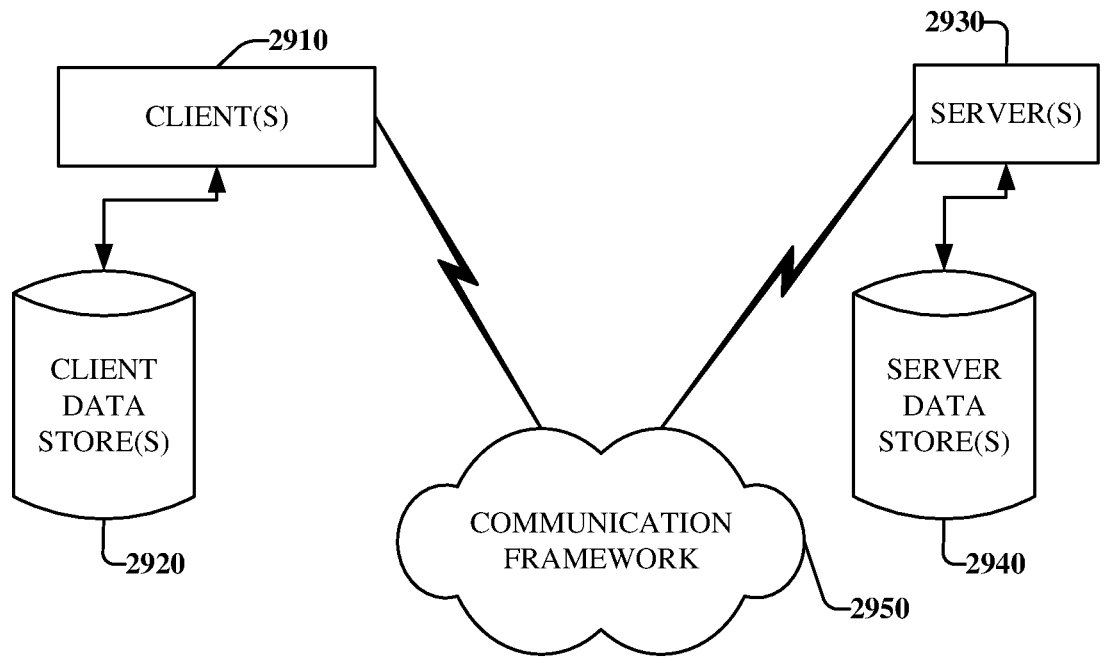
FIG. 29 illustrates an example networking environment operable to execute various implementations described herein.

FIG. 29 is a schematic block diagram of a sample computing environment 2900 with which the disclosed subject matter can interact. The sample computing environment 2900 includes one or more client(s) 2910. The client(s) 2910 can be hardware or software (e.g., threads, processes, computing devices). The sample computing environment 2900 also includes one or more server(s) 2930. The server(s) 2930 can also be hardware or software (e.g., threads, processes, computing devices). The servers 2930 can house threads to perform transformations by employing one or more embodiments as described herein, for example. One possible communication between a client 2910 and a server 2930 can be in the form of a data packet adapted to be transmitted between two or more computer processes. The sample computing environment 2900 includes a communication framework 2950 that can be employed to facilitate communications between the client(s) 2910 and the server(s) 2930. The client(s) 2910 are operably connected to one or more client data store(s) 2920 that can be employed to store information local to the client(s) 2910. Similarly, the server(s) 2930 are operably connected to one or more server data store(s) 2940 that can be employed to store information local to the servers 2930.

Figure 30A:
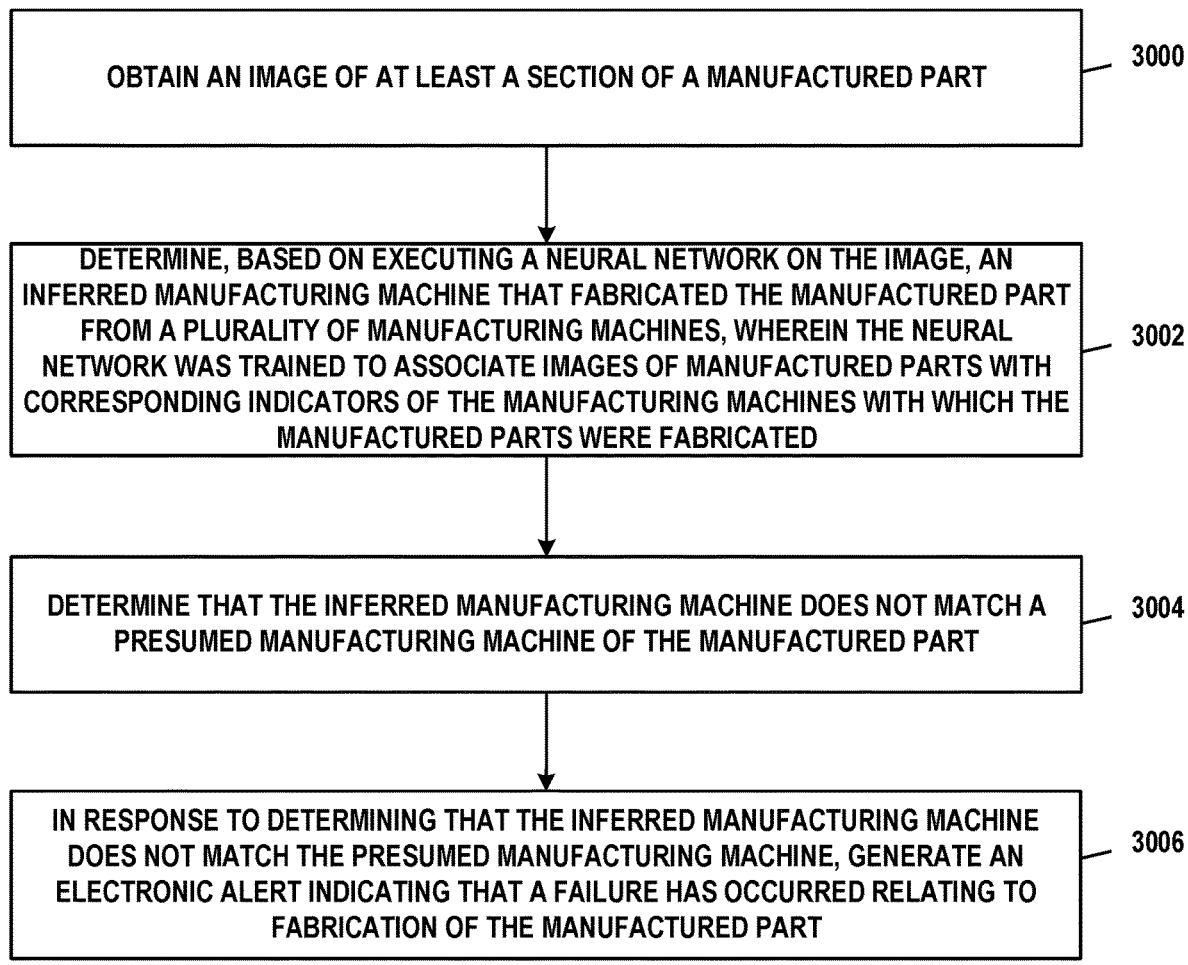
FIGS. 30A-30E illustrate flow diagrams of example embodiments described herein.

FIG. 30A is a flow diagram illustrating an example embodiment. The process illustrated by FIG. 30A may be carried out by a computing system, such as manufactured part management system 102 and/or environment 2800. However, the process can be carried out by other suitable arrangements of devices or device subsystems. The embodiments of FIG. 30A may be simplified by the removal of any one or more of the features shown therein. Further, these embodiments may be combined with features, aspects, and/or implementations of any of the previous figures or otherwise described herein.

Block 3000 may involve obtaining an image of at least a section of a manufactured part. Block 3002 may involve determining, based on executing a neural network on the image, an inferred manufacturing machine that fabricated the manufactured part from a plurality of manufacturing machines, wherein the neural network was trained to associate images of manufactured parts with corresponding indicators of the manufacturing machines with which the manufactured parts were fabricated. Block 3004 may involve determining that the inferred manufacturing machine does not match a presumed manufacturing machine of the manufactured part. Block 3006 may involve, in response to determining that the inferred manufacturing machine does not match the presumed manufacturing machine, generating an electronic alert indicating that a failure has occurred relating to fabrication of the manufactured part.

In some implementations, the manufactured part was fabricated in a manufacturing facility comprising the plurality of manufacturing machines, wherein the electronic alert indicates that the failure has occurred at the manufacturing facility.

In some implementations, determining the inferred manufacturing machine comprises identifying one or more inferred operating parameters employed by the inferred manufacturing machine to fabricate the manufactured part, wherein determining that the inferred manufacturing machine does not match the presumed manufacturing machine comprises determining that the one or more inferred operating parameters do not match one or more expected operating parameters that are supposed to be employed to fabricate the manufactured part.

In some implementations, the neural network comprises an encoder that produces, based on pixels or voxels in the image, a fabrication signature vector embedding that numerically represents physical features of the manufactured part.

In some implementations, determining the inferred manufacturing machine that fabricated the manufactured part comprises: comparing the fabrication signature vector embedding of the manufactured part with one or more other fabrication signature vector embeddings of one or more reference manufactured parts that are known to be fabricated by the inferred manufacturing machine; determining that a distance between the fabrication signature vector embedding and at least one of the one or more other fabrication signature vector embeddings is less than a predetermined threshold value; and, based on the distance being greater than the predetermined threshold value, concluding that the manufactured part was fabricated by the inferred manufacturing machine.

In some implementations, the neural network comprises a classifier that produces, based on pixels or voxels in the image, a classification label that relates to the inferred manufacturing machine.

In some implementations, the image depicts a zoomed-view of a machined surface or edge of the manufactured part.

In some implementations, the image comprises: a visible-spectrum photograph of the manufactured part, a two-dimensional scan of the manufactured part, a three-dimensional scan of the manufactured part, an X-ray scanned image of the manufactured part, or a spectroscopic scanned image of the manufactured part.

In some implementations, the neural network receives as input the image of the manufactured part and difference-from-target metadata pertaining to the manufactured part, wherein the difference-from-target metadata represents known differences between actual measurements of the manufactured part and target measurements for the manufactured part, and wherein determining that the inferred manufacturing machine does not match the presumed manufacturing machine is also based on the difference-from-target metadata.

Figure 30B:
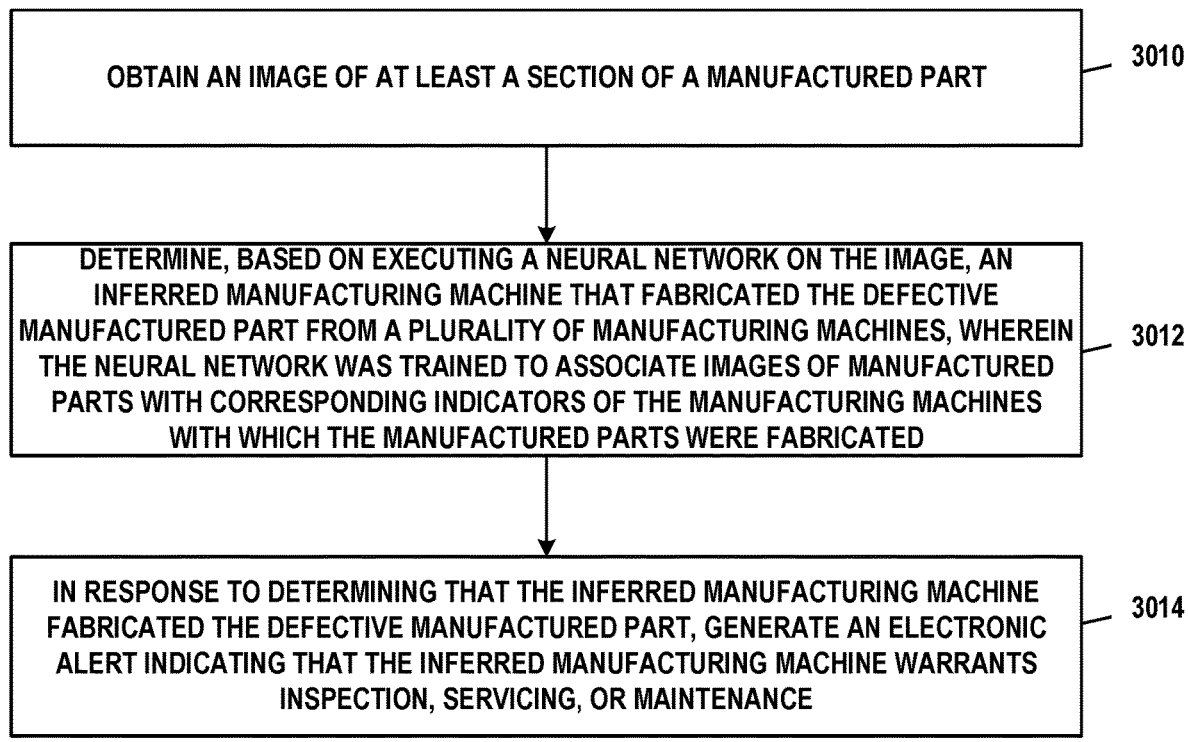

FIG. 30B is a flow diagram illustrating an example embodiment. The process illustrated by FIG. 30B may be carried out by a computing system, such as manufactured part management system 102 and/or environment 2800. However, the process can be carried out by other suitable arrangements of devices or device subsystems. The embodiments of FIG. 30B may be simplified by the removal of any one or more of the features shown therein. Further, these embodiments may be combined with features, aspects, and/or implementations of any of the previous figures or otherwise described herein.

Block 3010 may involve obtaining an image of at least a section of a defective manufactured part. Block 3012 may involve determining, based on executing a neural network on the image, an inferred manufacturing machine that fabricated the defective manufactured part from a plurality of manufacturing machines, wherein the neural network was trained to associate images of manufactured parts with corresponding indicators of the manufacturing machines with which the manufactured parts were fabricated. Block 3014 may involve, in response to determining that the inferred manufacturing machine fabricated the defective manufactured part, generating an electronic alert indicating that the inferred manufacturing machine warrants inspection, servicing, or maintenance.

In some implementations, determining the inferred manufacturing machine that fabricated the defective manufactured part comprises: determining one or more inferred operating parameters employed by the inferred manufacturing machine to fabricate the defective manufactured part; and determining that the one or more inferred operating parameters do not match one or more expected operating parameters that are supposed to be employed to fabricate the defective manufactured part, wherein the electronic alert also indicates that a defect of the defective manufactured part is due to improper operating parameters.

In some implementations, the neural network comprises an encoder that produces, based on pixels or voxels in the image, a fabrication signature vector embedding that numerically represents physical features of the defective manufactured part.

In some implementations, determining that the inferred manufacturing machine fabricated the defective manufactured part comprises: comparing the fabrication signature vector embedding of the defective manufactured part with one or more other fabrication signature vector embeddings of one or more reference manufactured parts that are known to be fabricated by the inferred manufacturing machine; determining that a distance between the fabrication signature vector embedding and at least one of the one or more other fabrication signature vector embeddings is less than a predetermined threshold value; and based on the distance being less than the predetermined threshold value, concluding that the defective manufactured part was fabricated by the inferred manufacturing machine.

In some implementations, the neural network comprises a classifier that produces, based on pixels or voxels in the image, a classification label that relates to the inferred manufacturing machine.

In some implementations, the image depicts a zoomed-view of a machined surface or edge of the defective manufactured part.

In some implementations, the image comprises: a visible-spectrum photograph of the defective manufactured part, a two-dimensional scan of the manufactured part, a three-dimensional scan of the manufactured part, an X-ray scanned image of the defective manufactured part, or a spectroscopic scanned image of the defective manufactured part.

In some implementations, the neural network receives as input the image of the defective manufactured part and difference-from-target metadata pertaining to the defective manufactured part, wherein the difference-from-target metadata represents known differences between actual measurements of the defective manufactured part and target measurements for the defective manufactured part, and wherein determining the inferred manufacturing machine that fabricated the defective manufactured part is also based on the difference-from-target metadata.

Figure 30C:
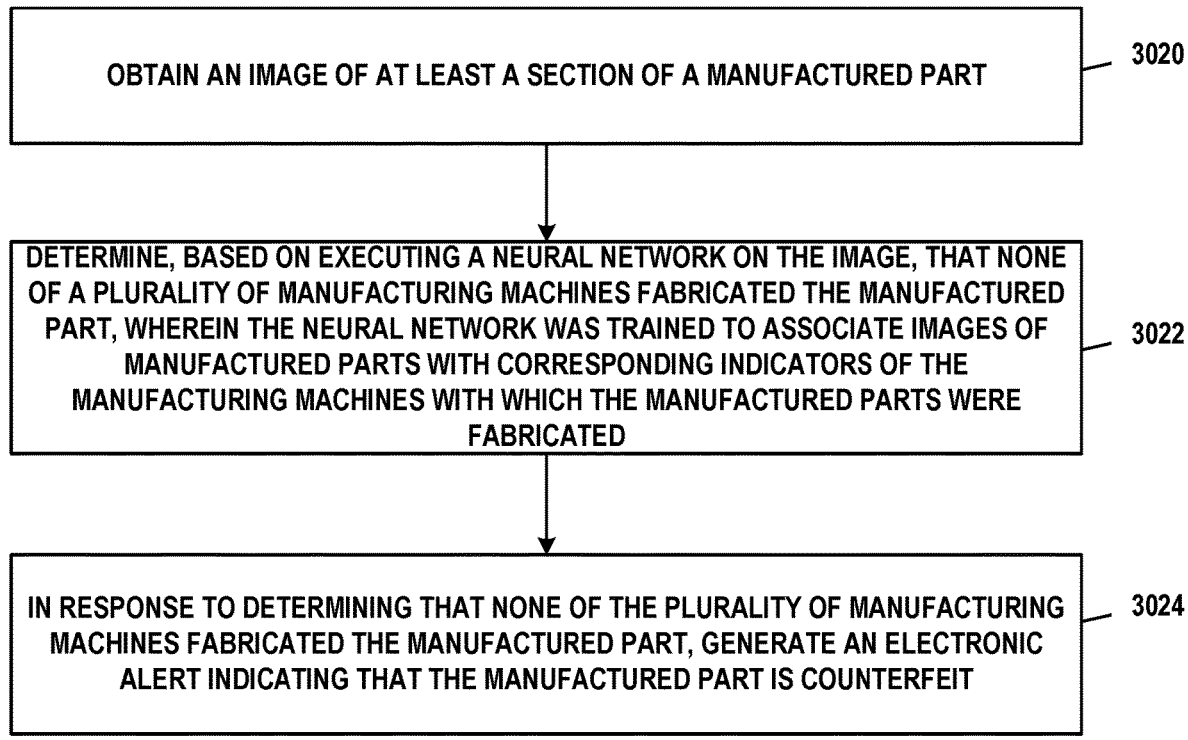

FIG. 30C is a flow diagram illustrating an example embodiment. The process illustrated by FIG. 30C may be carried out by a computing system, such as manufactured part management system 102 and/or environment 2800. However, the process can be carried out by other suitable arrangements of devices or device subsystems. The embodiments of FIG. 30C may be simplified by the removal of any one or more of the features shown therein. Further, these embodiments may be combined with features, aspects, and/or implementations of any of the previous figures or otherwise described herein.

Block 3020 may involve obtaining an image of at least a section of a manufactured part. Block 3022 may involve determining, based on executing a neural network on the image, that none of a plurality of manufacturing machines fabricated the manufactured part, wherein the neural network was trained to associate images of manufactured parts with corresponding indicators of the manufacturing machines with which the manufactured parts were fabricated. Block 3024 may involve, in response to determining that none of the plurality of manufacturing machines fabricated the manufactured part, generating an electronic alert indicating that the manufactured part is counterfeit.

In some implementations, the neural network comprises an encoder that produces, based on pixels or voxels in the image, a fabrication signature vector embedding that numerically represents physical features of the manufactured part, wherein determining that none of the plurality of manufacturing machines fabricated the manufactured part comprises: comparing the fabrication signature vector embedding of the defective manufactured part with one or more other fabrication signature vector embeddings of one or more reference manufactured parts that are known to be fabricated by the plurality of manufacturing machines; determining that a distance between the fabrication signature vector embedding and at least one of the one or more other fabrication signature vector embeddings is greater than a predetermined threshold value; and, based on the distance being greater than the predetermined threshold value, concluding that none of the plurality of manufacturing machines fabricated the manufactured part.

In some implementations, the neural network comprises a classifier that produces, based on pixels or voxels in the image, a classification label that indicates that none of the plurality of manufacturing machines fabricated the manufactured part.

Figure 30D:
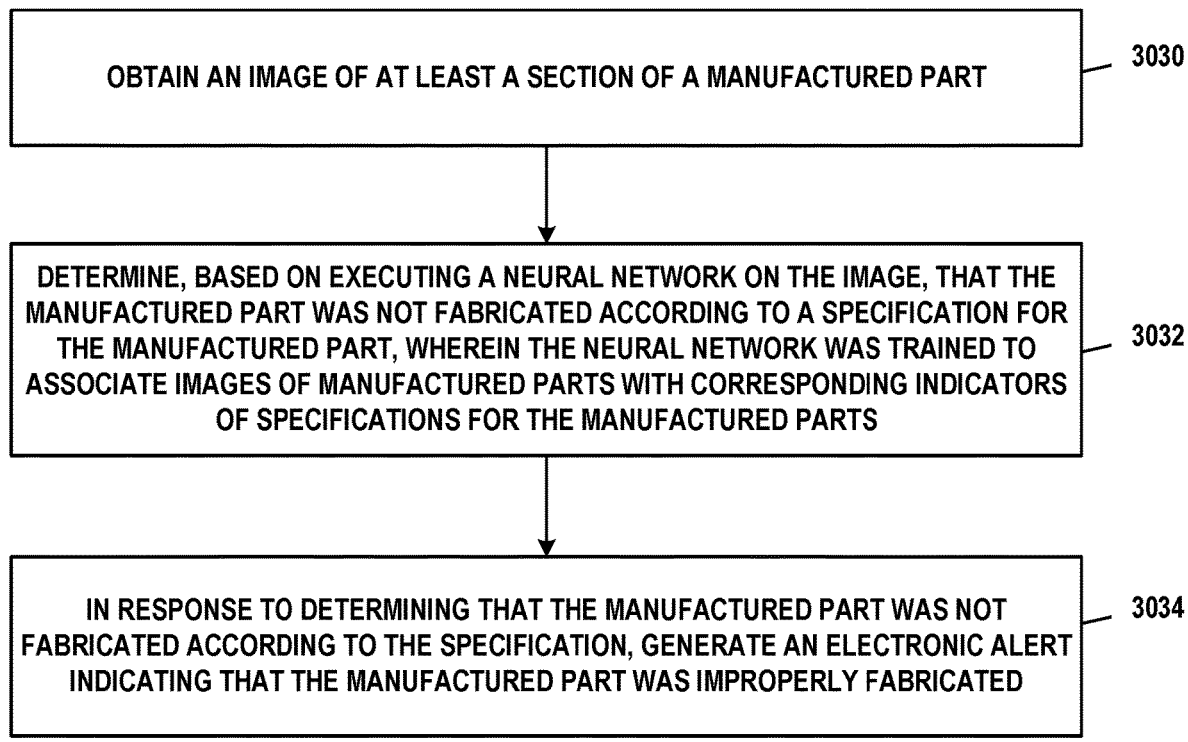

FIG. 30D is a flow diagram illustrating an example embodiment. The process illustrated by FIG. 30D may be carried out by a computing system, such as manufactured part management system 102 and/or environment 2800. However, the process can be carried out by other suitable arrangements of devices or device subsystems. The embodiments of FIG. 30D may be simplified by the removal of any one or more of the features shown therein. Further, these embodiments may be combined with features, aspects, and/or implementations of any of the previous figures or otherwise described herein.

Block 3030 may involve obtaining an image of at least a section of a manufactured part. Block 3032 may involve determining, based on executing a neural network on the image, that the manufactured part was not fabricated according to a specification for the manufactured part, wherein the neural network was trained to associate images of manufactured parts with corresponding indicators of specifications for the manufactured parts. Block 3034 may involve in response to determining that the manufactured part was not fabricated according to the specification, generating an electronic alert indicating that the manufactured part was improperly fabricated.

In some implementations, the manufactured part was fabricated within a manufacturing facility, and wherein the electronic alert further indicates that the manufactured part was improperly fabricated by the manufacturing facility.

In some implementations, the neural network comprises an encoder that produces, based on pixels or voxels in the image, a fabrication signature vector embedding that numerically represents physical features of the manufactured part.

In some implementations, determining that the manufactured part was not fabricated according to the specification comprises: comparing the fabrication signature vector embedding of the manufactured part with one or more other fabrication signature vector embeddings of one or more reference manufactured parts that are known to be fabricated according to the specification, wherein the indicators of the specifications comprise the one or more other fabrication signature vector embeddings; determining that a distance between the fabrication signature vector embedding and at least one of the one or more other fabrication signature vector embeddings is greater than a predetermined threshold value; and, based on the distance being greater than the predetermined threshold value, concluding that the manufactured part was not fabricated according to the specification.

In some implementations, the neural network comprises a classifier that produces, based on pixels or voxels in the image, a classification label that relates to an inferred specification according to which the manufactured part was fabricated, and wherein the indicators of the specifications comprise classification labels for the images of the manufactured parts including the classification label.

In some implementations, determining that the manufactured part was not fabricated according to the specification comprises determining that the inferred specification is different from the specification.

In some implementations, the image comprises one or more of: a visible-spectrum photograph of the manufactured part, a two-dimensional scan of the manufactured part, a three-dimensional scan of the manufactured part, an X-ray scan of the manufactured part, or a spectroscopic scan of the manufactured part.

In some implementations, the image depicts a zoomed-view of a machined surface or edge of the manufactured part.

In some implementations, the manufactured part was fabricated in a manufacturing facility and the computing system is disposed within a facility of an entity that has obtained the manufactured part from the manufacturing facility.

Some implementations further involve: obtaining a second image of at least a second section of a second manufactured part; determining, based on executing the neural network on the second image, that the second manufactured part was fabricated according to a second specification for the second manufactured part; and, in response to determining that the second manufactured part was fabricated according to the second specification, generating a second electronic alert indicating that the second manufactured part was properly fabricated.

In some implementations, the neural network comprises an encoder that produces, based on pixels or voxels in the second image, a fabrication signature vector embedding that numerically represents physical features of the second manufactured part, wherein determining that the second manufactured part was fabricated according to the second specification comprises: comparing the fabrication signature vector embedding of the second manufactured part with one or more other fabrication signature vector embeddings of one or more reference manufactured parts that are known to be fabricated according to the specification, wherein the indicators of the specification comprise the one or more other fabrication signature vector embeddings; determining that a distance between the fabrication signature vector embedding and at least one of the one or more other fabrication signature vector embeddings is less than a predetermined threshold value; and, based on the distance being less than the predetermined threshold value, concluding that the manufactured part was fabricated according to the specification.

In some implementations, the one or more other fabrication signature vector embeddings include two or more other fabrication signature vector embeddings, and wherein determining that the distance is less than the predetermined threshold value comprises determining that the distance is less than the predetermined threshold value for all of the two or more other fabrication signature vector embeddings.

In some implementations, the neural network comprises a classifier that produces, based on pixels or voxels in the second image, a classification label that relates to an inferred specification according to which the second manufactured part was fabricated, wherein the indicators of the specifications comprise classification labels for the images of the manufactured parts including the classification label, and wherein determining that the manufactured part was fabricated according to the specification comprises determining that the inferred specification is identical to the specification.

In some implementations, the neural network receives as input the image of the manufactured part and difference-from-target metadata pertaining to the manufactured part, wherein the difference-from-target metadata represents known differences between actual measurements of the manufactured part and target measurements for the manufactured part, and wherein determining that the manufactured part was not fabricated according to the specification comprises is also based on the difference-from-target metadata.

In some implementations, determining that the manufactured part was not fabricated according to the specification comprises: generating, by the neural network, a first fabrication signature vector embedding of the manufactured part; and determining that the first fabrication signature vector embedding is within a predetermined threshold distance of a second fabrication signature vector embedding of a known defective manufactured part, wherein the electronic alert also indicates that the manufactured part was fabricated by a same manufacturing machine as the known defective manufactured part.

Some implementations further involve: obtaining a second image of at least a second section of a second manufactured part; wherein determining that the manufactured part was not fabricated according to the specification comprises: generating, by the neural network, a fabrication signature vector embedding of the manufactured part and a second fabrication signature vector embedding of the second manufactured part; determining that the fabrication signature vector embedding is not within a predetermined threshold distance of the second fabrication signature vector embedding; and wherein the electronic alert also indicates that the second manufactured part is not compatible with the manufactured part.

In some implementations, the manufactured part is a depleted part and the second manufactured part is a spare part.

In some implementations, the electronic alert recommends that the manufactured part be decommissioned, the electronic alert recommends that a risk analysis be performed on the manufactured part, or the electronic alert recommends that a remaining-useful-life analysis be performed on the manufactured part.

Figure 30E:
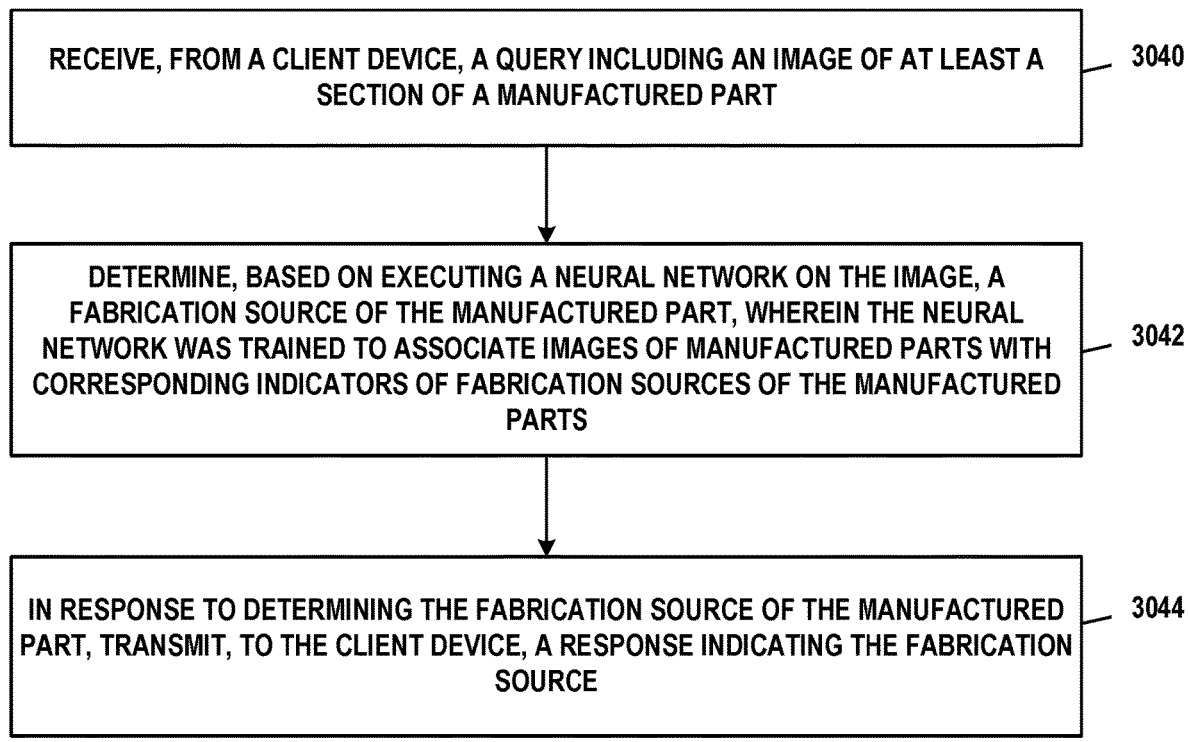

FIG. 30E is a flow diagram illustrating an example embodiment. The process illustrated by FIG. 30E may be carried out by a computing system, such as manufactured part management system 102 and/or environment 2800. However, the process can be carried out by other suitable arrangements of devices or device subsystems. The embodiments of FIG. 30E may be simplified by the removal of any one or more of the features shown therein. Further, these embodiments may be combined with features, aspects, and/or implementations of any of the previous figures or otherwise described herein.

Block 3040 may involve receiving, from a client device, a query including an image of at least a section of a manufactured part. Block 3042 may involve determining, based on executing a neural network on the image, a fabrication source of the manufactured part, wherein the neural network was trained to associate images of manufactured parts with corresponding indicators of fabrication sources of the manufactured parts. Block 3044 may involve in response to determining the fabrication source of the manufactured part, transmitting, to the client device, a response indicating the fabrication source.

In some implementations, the neural network comprises an encoder that produces, based on pixels or voxels in the image, a fabrication signature vector embedding of the manufactured part, and wherein determining the fabrication source of the manufactured part comprises: determining to which cluster of known fabrication signature vector embeddings the fabrication signature vector embedding is a closest cluster; and identifying the fabrication source as that which is associated with the closest cluster.

In some implementations, determining to which cluster of known fabrication signature vector embeddings the fabrication signature vector embedding is the closest cluster comprises: determining distances between the fabrication signature vector embedding and centroids of each of a plurality of clusters of the known fabrication signature vector embeddings; and identifying the closest cluster as being associated with a smallest of the distances.

In some implementations, the fabrication signature vector embedding is disposed within boundaries that define the closest cluster.

In some implementations, the neural network is a classifier that produces, based on pixels or voxels in the image, a classification label that explicitly indicates the fabrication source.

In some implementations, the fabrication source specifies: a country in which the manufactured part was fabricated, a state or province in which the manufactured part was fabricated, a manufacturing facility in which the manufactured part was fabricated, a manufacturing machine in the manufacturing facility that fabricated the manufactured part, or one or more operating parameters implemented by the manufacturing machine that fabricated the manufactured part.

In some implementations, the computing system refrains from determining the fabrication source of the manufactured part until after verifying that the client device has permission or a license to interact with the computing system.

In some implementations, the client device is associated with a parts manufacturer or a parts obtainer.

In some implementations, the neural network was trained in federated fashion by multiple parties such that the neural network was trained with the images of manufactured parts and the corresponding indicators of fabrication sources of the manufactured parts for each party privately by that party.

In some implementations, the image comprises one or more of: a visible-spectrum photograph of the manufactured part, a two-dimensional scan of the manufactured part, a three-dimensional scan of the manufactured part, an X-ray scan of the manufactured part, or a spectroscopic scan of the manufactured part.

In some implementations, the image depicts a zoomed-view of a machined surface or edge of the manufactured part.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For case of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system comprising:
one or more processors; and
memory storing program instructions that, upon execution by the one or more processors, cause the computing system to perform operations comprising:
   obtaining an image of at least a section of a manufactured part;
   determining, based on executing a neural network on the image, that the manufactured part was not fabricated according to a specification for the manufactured part, wherein the neural network was trained to associate images of manufactured parts with corresponding indicators of specifications for the manufactured parts, wherein determining that the manufactured part was not fabricated according to the specification comprises:
      generating, by the neural network, a first fabrication signature vector embedding of the manufactured part, and
      determining that the first fabrication signature vector embedding is within a predetermined threshold distance of a second fabrication signature vector embedding of a known defective manufactured part; and
   in response to determining that the manufactured part was not fabricated according to the specification, generating an electronic alert indicating that the manufactured part was improperly fabricated, wherein the electronic alert also indicates that the manufactured part was fabricated by a same manufacturing machine as the known defective manufactured part.

2. The computing system of claim 1, wherein the manufactured part was fabricated within a manufacturing facility, and wherein the electronic alert further indicates that the manufactured part was improperly fabricated by the manufacturing facility.

3. The computing system of claim 1, wherein the neural network comprises an encoder that produces, based on pixels or voxels in the image, a fabrication signature vector embedding that numerically represents physical features of the manufactured part.

4. The computing system of claim 3, wherein determining that the manufactured part was not fabricated according to the specification comprises:
   comparing the fabrication signature vector embedding of the manufactured part with one or more other fabrication signature vector embeddings of one or more reference manufactured parts that are known to be fabricated according to the specification, wherein the indicators of the specifications comprise the one or more other fabrication signature vector embeddings;
   determining that a distance between the fabrication signature vector embedding and at least one of the one or more other fabrication signature vector embeddings is greater than a predetermined threshold value; and
   based on the distance being greater than the predetermined threshold value, concluding that the manufactured part was not fabricated according to the specification.

5. The computing system of claim 1, wherein the neural network comprises a classifier that produces, based on pixels or voxels in the image, a classification label that relates to an inferred specification according to which the manufactured part was fabricated, and wherein the indicators of the specifications comprise classification labels for the images of the manufactured parts including the classification label.

6. The computing system of claim 5, wherein determining that the manufactured part was not fabricated according to the specification comprises determining that the inferred specification is different from the specification.

7. The computing system of claim 1, wherein the image comprises one or more of: a visible-spectrum photograph of the manufactured part, a two-dimensional scan of the manufactured part, a three-dimensional scan of the manufactured part, an X-ray scan of the manufactured part, or a spectroscopic scan of the manufactured part.

8. The computing system of claim 1, wherein the image depicts a zoomed-view of a machined surface or edge of the manufactured part.

9. The computing system of claim 1, wherein the manufactured part was fabricated in a manufacturing facility and the computing system is disposed within a facility of an entity that has obtained the manufactured part from the manufacturing facility.

10. The computing system of claim 1, the operations further comprising:
    obtaining a second image of at least a second section of a second manufactured part;
    determining, based on executing the neural network on the second image, that the second manufactured part was fabricated according to a second specification for the second manufactured part; and
    in response to determining that the second manufactured part was fabricated according to the second specification, generating a second electronic alert indicating that the second manufactured part was properly fabricated.

11. The computing system of claim 10, wherein the neural network comprises an encoder that produces, based on pixels or voxels in the second image, a fabrication signature vector embedding that numerically represents physical features of the second manufactured part, and wherein determining that the second manufactured part was fabricated according to the second specification comprises:
    comparing the fabrication signature vector embedding of the second manufactured part with one or more other fabrication signature vector embeddings of one or more reference manufactured parts that are known to be fabricated according to the specification, wherein the indicators of the specification comprise the one or more other fabrication signature vector embeddings;
    determining that a distance between the fabrication signature vector embedding and at least one of the one or more other fabrication signature vector embeddings is less than a predetermined threshold value; and
    based on the distance being less than the predetermined threshold value, concluding that the manufactured part was fabricated according to the specification.

12. The computing system of claim 11, wherein the one or more other fabrication signature vector embeddings include two or more other fabrication signature vector embeddings, and wherein determining that the distance is less than the predetermined threshold value comprises determining that the distance is less than the predetermined threshold value for all of the two or more other fabrication signature vector embeddings.

13. The computing system of claim 10, wherein the neural network comprises a classifier that produces, based on pixels or voxels in the second image, a classification label that relates to an inferred specification according to which the second manufactured part was fabricated, wherein the indicators of the specifications comprise classification labels for the images of the manufactured parts including the classification label, and wherein determining that the manufactured part was fabricated according to the specification comprises determining that the inferred specification is identical to the specification.

14. The computing system of claim 1, wherein the neural network receives as input the image of the manufactured part and difference-from-target metadata pertaining to the manufactured part, wherein the difference-from-target metadata represents known differences between actual measurements of the manufactured part and target measurements for the manufactured part, and wherein determining that the manufactured part was not fabricated according to the specification comprises is also based on the difference-from-target metadata.

15. The computing system of claim 1, the operations further comprising:
    obtaining a second image of at least a second section of a second manufactured part; and
    wherein determining that the manufactured part was not fabricated according to the specification comprises:
        generating, by the neural network, a fabrication signature vector embedding of the manufactured part and a second fabrication signature vector embedding of the second manufactured part;
        determining that the fabrication signature vector embedding is not within a predetermined threshold distance of the second fabrication signature vector embedding; and
        wherein the electronic alert also indicates that the second manufactured part is not compatible with the manufactured part.

16. The computing system of claim 15, wherein the manufactured part is a depleted part and the second manufactured part is a spare part.

17. The computing system of claim 1, wherein the electronic alert recommends that the manufactured part be decommissioned, the electronic alert recommends that a risk analysis be performed on the manufactured part, or the electronic alert recommends that a remaining-useful-life analysis be performed on the manufactured part.

18. A computer-implemented method comprising:
    obtaining an image of at least a section of a manufactured part;
    determining, based on executing a neural network on the image, that the manufactured part was not fabricated according to a specification for the manufactured part, wherein the neural network was trained to associate images of manufactured parts with corresponding indicators of specifications for the manufactured parts, wherein determining that the manufactured part was not fabricated according to the specification comprises:
        generating, by the neural network, a first fabrication signature vector embedding of the manufactured part, and
        determining that the first fabrication signature vector embedding is within a predetermined threshold distance of a second fabrication signature vector embedding of a known defective manufactured part; and
    in response to determining that the manufactured part was not fabricated according to the specification, generating an electronic alert indicating that the manufactured part was improperly fabricated, wherein the electronic alert also indicates that the manufactured part was fabricated by a same manufacturing machine as the known defective manufactured part.

19. The computer-implemented method of claim 18, wherein the electronic alert recommends that the manufactured part be decommissioned, the electronic alert recommends that a risk analysis be performed on the manufactured part, or the electronic alert recommends that a remaining-useful-life analysis be performed on the manufactured part.

20. A non-transitory computer-readable medium storing program instructions that, when executed by one or more processors of a computing system, cause the computing system to perform operations comprising:
    obtaining an image of at least a section of a manufactured part;
    determining, based on executing a neural network on the image, that the manufactured part was not fabricated according to a specification for the manufactured part, wherein the neural network was trained to associate images of manufactured parts with corresponding indicators of specifications for the manufactured parts, wherein determining that the manufactured part was not fabricated according to the specification comprises:
        generating, by the neural network, a first fabrication signature vector embedding of the manufactured part, and
        determining that the first fabrication signature vector embedding is within a predetermined threshold distance of a second fabrication signature vector embedding of a known defective manufactured part; and
    in response to determining that the manufactured part was not fabricated according to the specification, generating an electronic alert indicating that the manufactured part was improperly fabricated, wherein the electronic alert also indicates that the manufactured part was fabricated by a same manufacturing machine as the known defective manufactured part.

* * * * *